US011435884B1

(12) United States Patent
Morrell et al.

(10) Patent No.: US 11,435,884 B1
(45) Date of Patent: *Sep. 6, 2022

(54) IMPACTOR, IMPACTOR MITIGATOR, AND ENTITY STRUCTURE GRAPHICAL OBJECT VISUALIZATION SYSTEM AND CORRESPONDING METHODS

(71) Applicant: MagMutual Intermediate Holding Company, Atlanta, GA (US)

(72) Inventors: Neil Morrell, Atlanta, GA (US); Sallie Graves, Atlanta, GA (US)

(73) Assignee: MagMutual Intermediate Holding Company, Atlanta, GA (US)

( * ) Notice: Subject to any disclaimer, the term of this patent is extended or adjusted under 35 U.S.C. 154(b) by 478 days.

This patent is subject to a terminal disclaimer.

(21) Appl. No.: 16/566,673

(22) Filed: Sep. 10, 2019

(51) Int. Cl.
*G06F 3/04842* (2022.01)
*G06F 3/04815* (2022.01)
*G06T 15/00* (2011.01)
*G06F 17/18* (2006.01)
*G06T 13/20* (2011.01)
*G06Q 40/08* (2012.01)

(52) U.S. Cl.
CPC ...... *G06F 3/04842* (2013.01); *G06F 3/04815* (2013.01); *G06F 17/18* (2013.01); *G06Q 40/08* (2013.01); *G06T 13/20* (2013.01); *G06T 15/005* (2013.01); *G06T 2213/12* (2013.01)

(58) Field of Classification Search
CPC ........... G06Q 10/00–50/00; G06F 1/00–40/00; G06T 1/00–19/00
USPC ................................................ 705/7.11–7.42
See application file for complete search history.

(56) References Cited

U.S. PATENT DOCUMENTS

| 6,307,576 | B1 | 10/2001 | Rosenfeld |
| 6,611,278 | B2 | 8/2003 | Rosenfeld |
| D503,179 | S | 3/2005 | Kolawa et al. |
| 7,308,388 | B2 * | 12/2007 | Beverina ................ G06Q 50/26 703/2 |
| D602,027 | S | 10/2009 | Queric |
| D602,028 | S | 10/2009 | Queric |
| D602,034 | S | 10/2009 | Vu et al. |

(Continued)

OTHER PUBLICATIONS

US 10,192,005 B2, 01/2019, Yeager et al. (withdrawn)

(Continued)

*Primary Examiner* — Alan S Miller
(74) *Attorney, Agent, or Firm* — Philip H. Burrus, IV

(57) ABSTRACT

A visualization system includes one or more processors defining one or more process engines, a communications device in communication with at least one terminal device, and one or more memory devices. The one or more processors present, at the terminal device, a first visualization including one or more animated impactor graphical objects interacting with one or both of an entity type graphical object or one or more impactor mitigator graphical objects as a function of a confidence level index. In response to requested changes to the one or more impactor mitigator graphical objects, an entity visualization renderer can generate one or more alternate impactor mitigator graphical objects. A second visualization is then presented where the animated impactor graphical objects interact with one or both of the entity type graphical object or the one or more alternate impactor mitigator graphical objects as a function of the confidence level index.

30 Claims, 27 Drawing Sheets

(56) References Cited

U.S. PATENT DOCUMENTS

| | | | |
|---|---|---|---|
| D612,861 S | 3/2010 | Lee | |
| D664,983 S | 8/2012 | Moreau et al. | |
| D667,423 S | 9/2012 | Nagamine | |
| D696,680 S | 12/2013 | Bae et al. | |
| D697,932 S | 1/2014 | Lee et al. | |
| D703,690 S | 4/2014 | MacCubbin et al. | |
| D709,517 S | 7/2014 | Meegan et al. | |
| D766,268 S | 9/2016 | Katz | |
| D777,181 S | 1/2017 | Hoard et al. | |
| D788,813 S | 6/2017 | Tursi et al. | |
| D791,781 S | 7/2017 | Donarski et al. | |
| D791,815 S | 7/2017 | Dzjind et al. | |
| D797,777 S | 9/2017 | Ochocinski et al. | |
| D807,378 S | 1/2018 | Imamura et al. | |
| D809,531 S | 2/2018 | Ayvazian et al. | |
| 9,978,033 B1* | 5/2018 | Payne | G06Q 10/067 |
| D821,411 S | 6/2018 | McNeil et al. | |
| 10,021,138 B2* | 7/2018 | Gill | H04L 63/20 |
| 10,121,281 B2 | 11/2018 | Matjasko et al. | |
| 10,127,583 B2 | 11/2018 | Sundaresan et al. | |
| 10,140,386 B2 | 11/2018 | Kagan et al. | |
| 10,180,933 B2 | 1/2019 | Chavoustie et al. | |
| 10,223,760 B2 | 3/2019 | Ananthanpillai et al. | |
| 10,235,027 B2 | 3/2019 | Trauth | |
| 10,248,631 B2 | 4/2019 | Amacker | |
| 10,248,962 B2 | 4/2019 | Mitchell et al. | |
| 10,255,335 B2 | 4/2019 | Ding | |
| 10,262,466 B2 | 4/2019 | Guo et al. | |
| D848,450 S | 5/2019 | Peeten et al. | |
| D849,049 S | 5/2019 | Niven et al. | |
| D849,776 S | 5/2019 | Bassett et al. | |
| 10,282,786 B1* | 5/2019 | Osborne | A63F 13/822 |
| D851,109 S | 6/2019 | Gualtieri | |
| D872,121 S | 1/2020 | Einspahr et al. | |
| 10,529,028 B1 | 1/2020 | Davis et al. | |
| D902,220 S | 11/2020 | Mitti | |
| D902,229 S | 11/2020 | Chitalia et al. | |
| D910,055 S | 2/2021 | Becker et al. | |
| D910,065 S | 2/2021 | Lim | |
| D910,073 S | 2/2021 | Lim | |
| D910,700 S | 2/2021 | Lim | |
| 11,164,260 B1* | 11/2021 | Morrell | G06Q 10/0635 |
| 2001/0027388 A1* | 10/2001 | Beverina | G06Q 50/26 703/22 |
| 2003/0158466 A1* | 8/2003 | Lynn | A61B 5/00 600/300 |
| 2005/0065754 A1 | 3/2005 | Schaf et al. | |
| 2006/0106637 A1* | 5/2006 | Johnson | G06Q 10/10 705/7.11 |
| 2011/0050730 A1* | 3/2011 | Ranford | G06F 3/0485 345/184 |
| 2012/0150570 A1* | 6/2012 | Samad-Khan | G06Q 40/06 705/4 |
| 2013/0238365 A1* | 9/2013 | Nepomuceno | G06Q 30/0208 434/69 |
| 2014/0208241 A1 | 7/2014 | Charles et al. | |
| 2014/0365389 A1 | 12/2014 | Cheek et al. | |
| 2015/0052441 A1 | 2/2015 | Degioanni | |
| 2015/0058179 A1 | 2/2015 | Pu et al. | |
| 2015/0170288 A1* | 6/2015 | Harton | G06Q 40/08 705/4 |
| 2017/0161859 A1 | 6/2017 | Baumgartner et al. | |
| 2018/0089272 A1 | 3/2018 | Bath et al. | |
| 2019/0294719 A1 | 9/2019 | Beringer et al. | |
| 2020/0334638 A1* | 10/2020 | Hu | G06Q 40/08 |

OTHER PUBLICATIONS

Holbrow, Katherine, "Notice of Allowance", U.S. Appl. No. 29/705,230, filed Sep. 10, 2019; dated Apr. 6, 2021.
Holbrow, Katherine, "Notice of Allowance", U.S. Appl. No. 29/705,233, filed Sep. 10, 2019; dated Apr. 6, 2021.
Robinson, Kito, "NonFinal OA", U.S. Appl. No. 16/566,677; filed Sep. 10, 2019; dated Mar. 17, 2021.
Robinson, Kito R., "Notice of Allowance", U.S. Appl. No. 16/566,677; filed Sep. 10, 2019; dated Aug. 5, 2021.
Sugars, E.G, "Selected Results from a Risk-Theoretic Simulation of an Insurance Company", Published 1974; Abstract; Journal of Risk Insurance (Pre-1986), 41(2), 221; Retrieved from https://dialog.prequest.com/prefessional/docview/235099702?accountid= 131444 on Jul. 28, 2021.
"Gamma Distribution—Wikipedia", Viewed online Feb. 5, 2019 at https://en.wikipedia.org/wiki/Gamma_distribution; As published Jan. 20, 2019.
"How normal distribution is different from gamma distribution? In theory and practice?", Published Jun. 2, 2012 at Mathematics Stack Exchange; Viewed online Feb. 5, 2019 at https://math.stackexchange.com/questions/53606/how-normal-distribution-is-different-from-gamma-distribution-in-theory-and-prac.
"Poisson Distribution", Wikipedia; As published Jan. 13, 2019 Viewed online Feb. 5, 2019 at https://en.wikipedia.org/wiki/Poisson_distribution.
"Rpois function", RDocumentation; Viewed online Feb. 5, 2019 at https://www.rdocumentation.org/packages/compositions/versions/1.40-2/topics/rpois.
"The Gamma Distribution", Publication date unknown but prior to Feb. 5, 2019; Viewed online Feb. 5, 2019 at http://astrostatistics.psu.edu/su07/R/html/stats/html/GammaDist.html.
Holbrow, Katherine, "NonFinal Office Action", U.S. Appl. No. 29/705,230, filed Sep. 10, 2019; dated Jan. 12, 2021.
Holbrow, Katherine, "NonFinal Office Action", U.S. Appl. No. 29/705,233, filed Sep. 10, 2019.
Holbrow, Katherine, "Notice of Allowance", U.S. Appl. No. 29/705,234, filed Sep. 10, 2019; dated Jan. 13, 2021.
Holbrow, Katherine A., "Notice of Allowance", U.S. Appl. No. 29/705,229, filed Sep. 10, 2019; dated Jan. 13, 2021.
Holbrow, Katherine A., "Notice of Allowance", U.S. Appl. No. 29/705,232, filed Sep. 10, 2019; dated Jan. 13, 2021.

\* cited by examiner ured States Patent US 11,435,884 B1

IMPACTOR, IMPACTOR MITIGATOR, AND ENTITY STRUCTURE GRAPHICAL OBJECT VISUALIZATION SYSTEM AND CORRESPONDING METHODS

BACKGROUND

Technical Field

This disclosure relates generally to systems and methods for the visual representation and presentation of probabilistic data graphical objects, and more particularly to the visual representation and animated presentation of uncertain adverse impactor graphical objects with one or more impact mitigation graphical objects as a function of confidence level that no greater adverse impactor is probable.

Background Art

Uncertain risk. As related to entities operating within systems or environments, visualizing the concept, likelihood, and effects of uncertain risk is incredibly difficult. One reason it is difficult to visualize such risk is that it is uncertain. Loss impactors adversely affect entities at random times. Even when the random times can be modeled probabilistically, it is frequently the case that the vast nature of the number and type of adverse impactors can easily outweigh the human mind's comprehension. Moreover, the effect of loss impactors can vary, with some impactors significantly affecting an entity while the effects of other impactors are minimal. This varying effect, combined with the random nature can make analysis of how an entity operating within a system may be cumulatively affected as a function of its operations.

Compounding the basic difficulty of visualizing the concept, likelihood, and effects of uncertain risk is that many humans suffer from bias. For example, many individuals suffer from optimism bias in the sense that they think they will never be harmed and will not incur losses. When analyzing uncertain risk that may affect an entity operating in a system under study, they may transfer such biases, which further increases the difficulty of understanding true loss risk that may be incurred by that entity.

Regardless of the reason, existing data presentation systems fail to provide an adequate visual analysis tool that provides comprehensive visual analysis of cumulative adverse impacts suffered by an entity operating within a system. It would be advantageous to have improved systems and methods for simulating and presenting uncertain risk potentially affecting entities under study that allow for a simplified visual analysis by a viewer.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
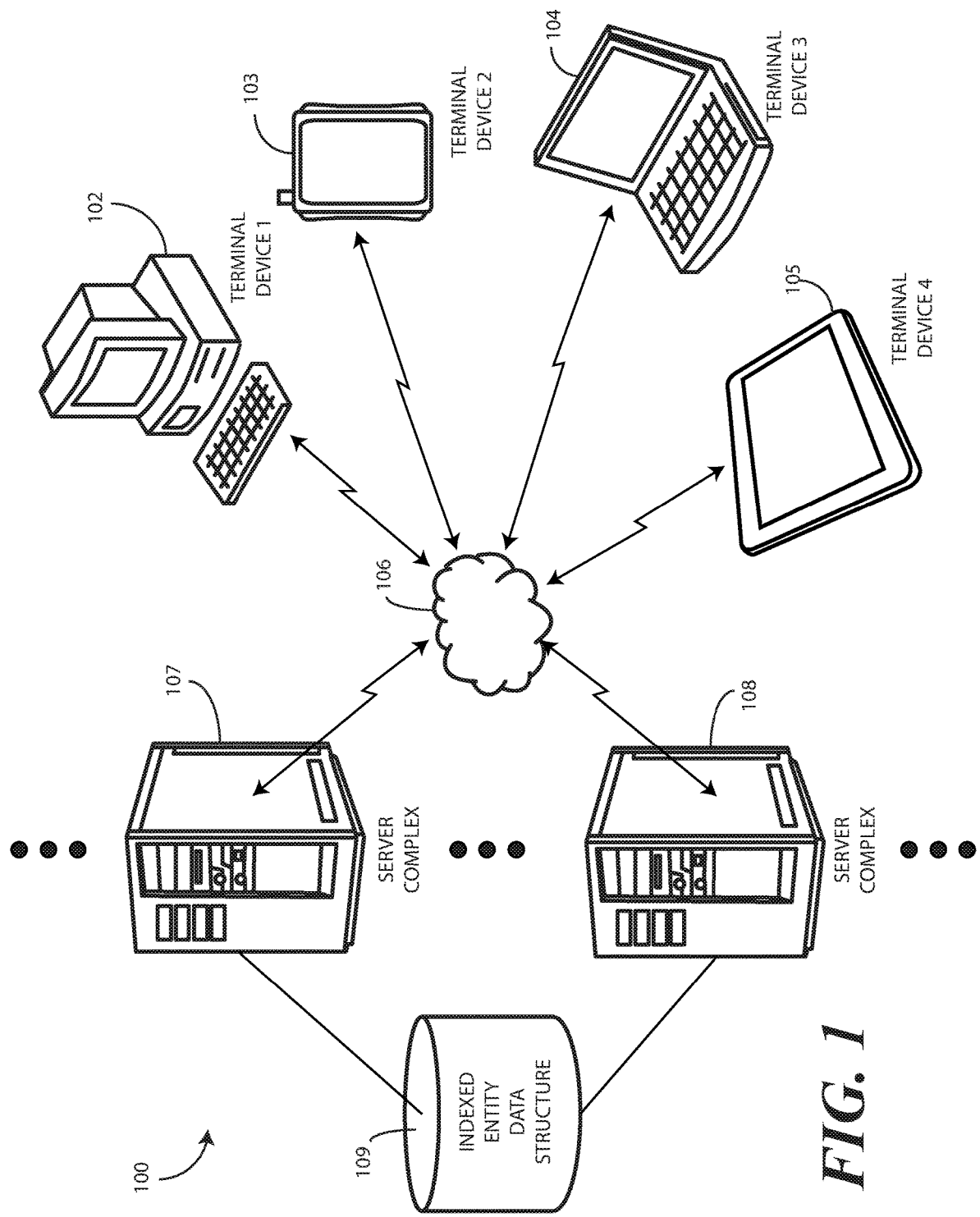
FIG. 1 illustrates one explanatory system in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to the generation, presentation, animation, and interaction of system, entity, impactor, and impactor mitigation visualizations configured as graphical objects presented on a display in response to terminal device interaction events and/or data retrieved from one or more indexed entity data structures. Any process descriptions or blocks in flow charts should be understood as representing modules, segments, or portions of code that include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method, nor do they apply a known business process to the particular technological environment of the Internet. Nor do they perform data processing and other operations in the practice, administration, or management of a financial product or service. Nor do embodiments of the disclosure describe only mathematical concepts, methods of organizing human activity, or mental processes. Embodiments of the disclosure do not merely automate human activities either. Nor do embodiments of the disclosure perform data processing and other operations in the practice, administration, or management of a financial product or service. Moreover, embodiments of the disclosure do not generate or alter contractual relations using generic computer functions and conventional network operations.

To the contrary, methods and processes described below use a combined order of specific method steps occurring in accordance with applied rules that render entity information, impactor information, and impactor mitigation information, as well as the interaction of these elements, into a specific format that is then used and applied to generate desired results: a sequence of synchronized, animated graphical elements that allow a user to visualize how impactors adversely affect an entity operating within a system, where that entity is at least partially insulated from the impactors by impactor mitigators.

In one or more embodiments, these animated graphical elements are presented not as a function of time, but rather as a function of a confidence level below which no more adverse impactor is expected after the application of one or more probabilistic model rules. Moreover, embodiments of the disclosure can present the effects upon both entity and impactor mitigators across confidence level.

Embodiments of the disclosure apply these specific rules to integrate the methods described herein into practical applications that allow users to quickly, easily, and simply visualize probabilistic effects upon entities and impactor mitigators to determine what adverse effects the entity will sustain, the frequency at which the entity will sustain these adverse effects, the entity depletion results stemming from these adverse effects, and how these statistical data can be changed when an entity is protected by alternate impactor mitigators. Heretofore, no known method or system has been capable of accurately conveying all of these aspects into a concise, efficient, data visualization tool, particularly in an intuitive sense that is easily understood by an untrained individual.

In so doing, the methods and processes impose meaningful limits on the usages of the rules selected and applied herein, thereby confirming that the claims set forth below are far more than a drafting effort designed to monopolize the use of such rules. Moreover, the rules and corresponding methods are integrated into their corresponding systems, signals, and devices to improve their functioning by allowing them to present complex, probabilistic data, not as a function of time, but rather as a function of confidence level, thereby allowing the untrained individual to better understand the tradeoffs of acquiring or developing impactor mitigators in view of expected impactor interactions across a predefined number of time periods in an intuitive manner. This results in an improvement to the hardware technology upon which the systems and methods may be implemented, as well as integrating the methods and applied rules to particular machines, which are integral to the claims set forth below.

It is noted that while these visualizations are presented as still or animated graphical objects on user interfaces of electronic devices referred to as terminal devices, patentability thereof includes no requirement that a method be tied to a machine or transform an article. While the selected and applied rules described below allow visualization of impactor and impactor mitigator data graphical objects to occur in a manner never before seen, a review of the claims below confirm that the selected and applied rules in no way preempt the presentation of such data in traditional formats. Nor do they preempt the usage of such rules in other applications.

This is confirmed by the fact that the claims presented below require that the various applied rules be rendered in a specific way: to randomize large and uncorrelated impactor data points to achieve realistic, but randomized, impactor data for a given entity type across a predefined number of time periods, but with that impactor data presented as a function of confidence level rather that time. The generation of adverse impact visualization models, in one or more embodiments, occurs as a function of impactor mitigation properties, including impact resistance, impact absorption limits, impact mitigation actuation triggers, impact absorption frequency. The generation of impactor visualization models illustrates an amount of adverse impact, a frequency of impactor operation, and type of impactor, as well as a weight with which each impactor interacts with an entity or impactor mitigator. In one or more embodiments, this information is visually expressed through interactions that occur as a function of confidence level rather that chronological time, as will be described in more detail below.

The specific structure of the rules applied in the claims below therefore would prevent broad preemption of all rules-based means of presenting impactor and impactor mitigator data. This is true because the limits of the rules themselves are not broad enough to preclude all possible approaches to presenting impactor and impactor mitigator data. While other approaches likely will be inferior to the ones described herein, there is no requirement that the rules-based visualization, presentation, animation, and interaction be used to impactor and impactor mitigator data in ways other than those claimed below.

By incorporating the specific features of the rules as claim limitations, it becomes clear that embodiments of the disclosure are limited to specific processes for automatically generating, presenting, an animating impactor data interacting with an entity visualization model that includes one or more impactor mitigators using particular information and techniques, which therefore does not preempt approaches that use rules of a different structure or different techniques. Moreover, the claims set forth below are directed to patentable, technological improvements over the existing impactor and impactor mitigator data visualization and presentation techniques. The claims use limited rules in a process specifically designed to achieve an improved technological result in conventional industry practice.

It will be appreciated that embodiments of the disclosure described herein may be comprised of one or more conventional processors and unique stored program instructions that control the one or more processors to implement, in conjunction with certain non-processor circuits, some, most, or all of the functions of generating, presenting, and animating graphical objects representing entity structures and corresponding impactor mitigators, as well as randomized, but entity specific, impactors as a function of confidence level, as described herein. The non-processor circuits may include, but are not limited to, communication circuits, touch-sensitive displays, user interface technologies such as organic light emitting diode or other display technologies, signal drivers, clock circuits, power source circuits, and user input devices. As such, these functions may be interpreted as steps of a method to perform the visualization of impactor occurrence events interacting with an entity structure as a function of a confidence level that, probabilistically, identify a probability beyond which no greater impactor will affect a particular entity structure above an expressed confidence level.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within 10 percent, in another embodiment within 5 percent, in another embodiment within 1 percent and in another embodiment within 0.5 percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

As used herein, "confidence level" refers to a probabilistic threshold above which no impactor will affect a predefined entity or impactor mitigator with a greater severity. Illustrating by example, if the impact of an impactor at a ninety-nine percent confidence level adversely affects an entity or an impactor mitigator by 2.5 million units, there is a ninety-nine percent probability that a given entity structure will never experience an impactor causing an adverse effect of greater than 2.5 million units for a predefined data set of impactors selected as a function of entity type. Where the data set includes all known impactors for entity structures similar or the same as the given entity structure, there would be only a one percent chance that the given entity structure ever experiences an adverse impact measuring over 2.5 million units, and so forth.

As used herein, the term "impactor" refers to an object, activity, action, or entity that interacts with an entity or an impactor mitigator associated with an entity that adversely affects the state, operation, or functioning thereof. An "entity" is any object, thing, or structure that can be adversely affected when interacting with impactors. An "impactor mitigator" is an object, activity, action, or entity that reduces the effect of an impactor on an entity.

Illustrating these concepts by way of a simple example, in a system defined by a room that includes a glass bottle sitting on the floor that is defined as the entity of the system, a moving bowling ball would be an impactor in that if the moving bowling ball interacts with the entity, an adverse effect, e.g., the bottle breaking, will occur. However, padding placed about the glass bottle may define an impactor mitigator in that the padding may reduce the adverse impact by absorbing forces from the moving bowling ball and potentially preventing the glass bottle from breaking, and so forth. Similar entities, impactors, and impactor mitigators will be obvious to those of ordinary skill in the art having the benefit of this disclosure in other fields, including medicine, insurance, physics, chemistry, electronics, and other fields.

As used herein, directional terms such as "up," "down," "vertical," "horizontal," are intended to refer to the context of the particular visualization or graphical object being described. For example, an entity structure represented as a graphical object may be generated and oriented around defined X, Y, and Z axes. In those examples, the X-Y plane will define horizontal, with up being defined as the positive Z direction and down being defined as the negative Z direction, and so forth.

Embodiments of the disclosure contemplate that visualizing adverse impactor events and their cumulative effects on an entity or its impactor mitigators requires methods capable of showing representations of vast amounts of impactor data, specific impactor mitigator data (where appropriate), and probabilistic thresholds indicative of not at what time an impactor will affect an entity, but how likely it is that no impactor having a greater adverse effect than a predefined threshold. Moreover, embodiments of the disclosure contemplate that it is preferable to be able to demonstrate such complex probabilistic concepts, such as confidence level, as thresholds that change in a concise and efficient manner. As noted above, no known method is capable of accurately conveying all of these aspects associated with impactor and impactor mitigator data, particularly in an intuitive sense that is easily understood by an untrained individual.

Advantageously, embodiments of the disclosure provide a visualization system comprising one or more processors defining one or more process engines of the visualization system, a communications device, operable with the one or more processors and in communication with one or more terminal devices, and one or more memory devices operable with the one or more processors, and comprising an indexed entity data structure. In one or more embodiments, the one or more memory devices store computer-executable instructions that, when executed by the one or more processors, cause the one or more processors to perform operations.

In one or more embodiments, the operations comprise causing the presentation of an entity type graphical object on a user interface of at least one terminal device of the one or more terminal devices. The operations can also comprise causing presentation of one or more impactor graphical objects on the user interface of the at least one terminal device. In one or more embodiments, each impactor graphical object has an impactor magnitude associated therewith.

In one or more embodiments, the operations comprise causing presentation of one or more impactor mitigator graphical objects on the user interface of the at least one terminal device. In one or more embodiments, these operations comprise animating the one or more impactor graphical objects such that the one or more impactor graphical objects interact with one or both of the entity type graphical object or the one or more impactor mitigator graphical objects on the user interface of the at least one terminal device.

In one or more embodiments, this interaction occurs as a function of a confidence level. In one or more embodiments, the confidence levee defines a probabilistic threshold that the impactor magnitude of all subsequent impactor graphical objects interacting with the one or both of the entity type graphical object or the one or more impactor mitigator graphical objects will be below a predefined impactor magnitude threshold.

In one or more embodiments, this first visualization runs until the confidence level reaches 99.9 percent. Thereafter, in one or more embodiments a terminal device event detector receives one or more terminal device interaction events configured as computer-readable signal media transmitted from the at least one terminal device. In one or more embodiments, the terminal device interaction events comprise requests for changes to the one or more impactor mitigator graphical objects. Thereafter, in one or more embodiments the one or more processors, in response to the terminal device event detector receiving the terminal device interaction events, performing additional operations.

In one or more embodiments, the additional operations comprise repeating the causing the presentation of the entity type graphical object on the user interface of the at least one terminal device. In one or more embodiments, the additional operations comprise repeating the causing the presentation of the one or more impactor graphical objects on the user interface of the at least one terminal device. In one or more embodiments, the additional operations comprise causing presentation of one or more alternate impactor mitigator graphical objects on the user interface of the at least one terminal device.

In one or more embodiments, the additional operations comprise animating the one or more impactor graphical objects such that the one or more impactor graphical objects interact with one or both of the entity type graphical object or the one or more alternate impactor mitigator graphical objects on the user interface of the at least one terminal device as the function of the confidence level. In one or more embodiments, after this second visualization is complete, e.g., when the confidence level reaches 99.9 percent, the additional operations can further comprise causing simultaneous presentation of both the one or more impactor mitigator graphical objects and the one or more alternate impactor mitigator graphical objects on the user interface of the at least one terminal device.

In one or more embodiments, a method in an electronic device comprises retrieving, with one or more processors defining one or more process engines, a sample set of impactor data from an indexed entity data structure. In one or more embodiments, the method comprises applying, with sample rule set application engine, one or more rules to the sample set of impactor data to transform the sample set of impactor data to randomized impactor data.

In one or more embodiments, the method comprises applying, with a sample presentation visualization data generation engine, one or more modeling rules to the randomized impactor data to generate one or more impactor graphical objects. In one or more embodiments, the method comprises causing, by the one or more processors, presentation of the one or more impactor graphical objects with an entity type graphical object and one or more impactor mitigator graphical objects on a user interface of at least one terminal device in communication with the one or more processors.

In one or more embodiments, the method comprises animating the one or more impactor graphical objects to create a first visualization, thereby causing each impactor graphical object to interact with one or both of the entity type graphical object or the one or more impactor mitigator graphical objects as a function of a confidence level defining a probabilistic threshold that only impactor graphical objects having an impactor magnitude below a predefined magnitude threshold will interact with the one or both of the entity type graphical object or the one or more impactor mitigator graphical objects.

In one or more embodiments, a visualization system comprises one or more processors defining one or more process engines of the visualization system. In one or more embodiments, the visualization system comprises a communications device, operable with the one or more processors and in communication with at least one terminal device. In one or more embodiments, the visualization system comprises one or more memory devices operable with the one or more processors, and comprising an indexed entity data structure, the one or more memory devices storing computer-executable instructions that, when executed by the one or more processors, cause the one or more processors to perform operations.

In one or more embodiments, the operations comprise presenting, at the at least one terminal device, a first visualization comprising one or more animated impactor graphical objects interacting with one or both of an entity type graphical object or one or more impactor mitigator graphical objects as a function of a confidence level index for animation of the animated impactor graphical objects. In one or more embodiments, the operations then comprise receiving, from a terminal device event detector receiving terminal device interaction events configured as computer-readable signal media transmitted from the at least one terminal device, requested changes to the one or more impactor mitigator graphical objects.

In one or more embodiments, the operations comprise generating, with an entity visualization renderer in response to the requested changes to the one or more impactor mitigator graphical objects, one or more alternate impactor mitigator graphical objects. In one or more embodiments, the operations comprise presenting, at the at least one terminal device, a second visualization comprising the one or more animated impactor graphical objects interacting with one or both of the entity type graphical object or the one or more alternate impactor mitigator graphical objects as a function of the confidence level index.

It should be noted that various flow charts, block diagram schematics, electronic device components, computer-readable signal media, graphical objects, animations, and other system components are described below to illustrate various embodiments of the disclosure. These elements, e.g., the various flowcharts and block diagrams, serve to better illustrate the operation, functions, architecture, and various potential implementations of systems, methods, and computer program products configured in accordance with one or more embodiments of the disclosure. As such, those of ordinary skill in the art having the benefit of this disclosure will understand these elements can be representative of modules, segments, engines, renderers, detectors, extractors, or portions of code that comprise one or more executable instructions for implementing the specified logical function or functions. Moreover, with respect to these elements, it should further be noted that, in some alternative implementations, the functions noted in a block may occur out of the order noted in the drawings. For example, the functions of two blocks shown in succession may be executed substantially concurrently, or the functions of the blocks may sometimes be executed in the reverse order, depending upon the functionality involved.

Turning now to FIG. 1, illustrated therein is one explanatory visualization system 100 configured in accordance with one or more embodiments of the disclosure. As shown in FIG. 1, the visualization system 100 can comprise one or more of a network data processing system, computer network, or a distributed data processing system. In one or more embodiments, the visualization system 100 is implemented within such a computer network. Illustrating by example, in one or more embodiments the various components and modules of the visualization system 100, as well as the corresponding methods, may be implemented in, or communicated using, a computer network such as that illustratively shown in FIG. 1.

It should be noted that FIG. 1 is show for explanatory purposes. It is not intended to illustrate the only computer network upon which the various components and modules of the visualization system 100, as well as the corresponding methods, can be implemented. To the contrary, numerous other system architectures will be obvious to those of ordinary skill in the art having the benefit of this disclosure. For example, rather than being implemented upon the distributed data processing system of FIG. 1, in other embodiments the various components and modules of the visualization system 100, as well as the corresponding methods, can be implemented in a stand-alone computer, palm top computer, laptop computer, or mobile communication device.

In one or more embodiments, the visualization system 100 comprises a network of electronic devices. In the illustrative embodiment of FIG. 1, a server complex 101 is in communication with one or more terminal devices 102, 103, 104, 105 across a network 106. The server complex 101, which can comprise one or more servers 107, 108, is operable with an indexed entity data structure 109. The indexed entity data structure 109 can comprise a data storage device configured to store entity data, impactor data, impactor mitigator data, or other information required by the visualization system 100. In one or more embodiments, the indexed entity data structure can be configured as a content storage device. Examples of such content storage devices include one or more memory devices, disk arrays, or solid-state memory devices. These devices may be configured as a just a bunch of memories, as a redundant array of inexpensive disks, or in other architectures. Other architectures will be obvious to those of ordinary skill in the art having the benefit of this disclosure.

In one or more embodiments, data and program code can be stored in the one or more servers 107, 108, in the one or more terminal devices 102, 103, 104, 105, and/or in the indexed entity data structure 109. Data and program code can be stored in a persistent storage component, such as a computer recordable storage medium, of the indexed entity data structure 109 in one or more embodiments. Where so stored one or more of the servers 107, 108 and/or the terminal devices 102, 103, 104, 105 can comprise downloaded data and/or program code for use. Illustrating by example, in one or more embodiments, impactor data, entity structure data, impactor mitigator data, and corresponding program code may be stored in the indexed entity data structure 109 and downloaded to the one or more servers 107, 108 for use. The one or more servers 107, 108 may then perform operations such as generating entity structure and impactor mitigator models as graphical objects, generating impactor models as graphical objects, and causing the two to interact in an animated fashion as a function of a confidence level to demonstrate impactor susceptibility and impactor effect/risk via graphical object animation, which is interactive in one or more embodiments.

In one or more embodiments, network 106 can facilitate communication connections between the various devices of the visualization system 100. The network 106 can include connections such as wired communication couplings, wireless communication links, or alternative communication structures such as fiber optic cables. Other structures suitable for inclusion in the network 106 for transmitting and/or communicating data between the various devices will be obvious to those of ordinary skill in the art having the benefit of this disclosure.

The network 106 can comprise any of a number of networks. For instance, in one embodiment the network 106 comprises a wide area network. In another embodiment, the network 106 comprises a local area network. In still another embodiment, the network 106 comprises a peer-to-peer network. In yet another embodiment, the network 106 comprises a personal area network. Still other types of networks suitable for network 106 will be obvious to those of ordinary skill in the art having the benefit of this disclosure.

In one or more embodiments, the visualization system 100 is implemented across the Internet. Accordingly, in one or more embodiments the network 106 comprises a portal to a worldwide collection of networks and gateways that use the transmission control protocol/Internet protocol suite of protocols for communication. Accordingly, network 106 can comprise the various high-speed data communication lines that are coupled between major nodes or host computers of the Internet. Where this is the case, modeling data, graphical objects, impactor data, program code, and so forth may be routed across thousands of commercial, governmental, educational and other computer systems between the server complex 101 and the various terminal devices 102,103,104, 105. Moreover, the server complex 101 may be hosted in such computers, colloquially referred to as the "cloud." Where so configured, the server complex 101 and/or servers 107,108 may be referred to as cloud-computing nodes, while the terminal devices 102,103,104,105 may be referred to as cloud client devices, and so forth. Again, the illustrative embodiment of FIG. 1 is presented for illustrative purposes, and is not intended to define an architectural limitation for embodiments of the disclosure.

In the illustrative embodiment of FIG. 1, one or more servers 107,108 of the server complex 101 connect to the network 106. (One illustrative embodiment of a server complex 101 will be described in greater detail with reference to FIG. 2 below.) In the illustrative embodiment of FIG. 1, each server 107,108 is depicted as a server computer. However, other configurations for the servers 107,108 of the server complex will be obvious to those of ordinary skill in the art having the benefit of this disclosure. Illustrating by example, the one or more servers 107,108 could alternatively be configured as one or more personal computers, mobile devices coupled through routers, switches, and gates, or other networked-enabled electronic devices that may perform corresponding functions. Such devices, where separate, may communicate across electronic signal interconnections, including wired, wireless, optical, and other communication links.

Each of the one or more servers 107,108 is operable with the indexed entity data structure 109. While the indexed entity data structure 109 is illustrated as a single component serving multiple servers 107,108 in FIG. 1, it should be noted that the indexed entity data structure 109 could be configured in a distributed architecture in other embodiments, with one or more indexed entity data structure storage devices serving each server 107,108 as well. Other configurations for the indexed entity data structure 109 will be obvious to those of ordinary skill in the art having the benefit of this disclosure.

Similarly, one or more of the terminal devices 102,103, 104,105 can connect to the network 106 as well. The terminal devices 102,103,104,105 can comprise, for example, one or more personal computers, network computers, and/or mobile computing devices such as personal digital assistants (PDAs), smart phones, handheld gaming devices, wearable devices, and/or tablet computers, and the like. Other examples of terminal devices 102,103,104,105 will be obvious to those of ordinary skill in the art having the benefit if this disclosure.

In one or more embodiments, each terminal device 102, 103,104,105 comprises a data processing device, one example of which will be described in more detail below with reference to FIG. 3. In one or more embodiments, the server complex 101 hosts an application environment, while a selected terminal device receives terminal interaction events in the form of user input and renders outputs from the application environment hosted by the server complex 101. In one or more embodiments, the server complex 101 provides information, such as graphical user interfaces, graphical objects, entity models, impactor models, and application files to one or more of the terminal devices 102,103,104,105.

While frequently referred to herein as "terminal" devices, it should be noted that the terminal devices 102,103,104,105 may also be referred to as "client" electronic devices or as "clients" with respect to a server 107,108 of the server complex 101. It should also be noted that the illustrative visualization system of FIG. 1 may include more or fewer servers 107,108 and terminal devices 102,103,104,105, as well as other devices not shown.

The terminal devices 102,103,104,105 can take any number of a variety of forms. In the illustrative embodiment of FIG. 1, terminal device 102 is a desktop computer. Terminal device 103 is a smartphone. Terminal device 103 is a laptop computer. Terminal device 104 is a tablet computer. However, it will be obvious to those of ordinary skill in the art having the benefit of this disclosure that the terminal devices 102,103,104,105 may include other types of devices as well, including portable or non-portable electronic devices capable of wired or wireless communications and execution of software and firmware, and which include a user interface configured to receive input and a display capable of presenting content and graphical objects to a user.

In one or more embodiments, the terminal devices 102, 103,104,105 include additional features as well, such as voice communication technology, electronic mail capabilities, text and multimedia communication capability, Internet and other network accessing capabilities, and so forth. The terminal devices 102,103,104,105 may include media player capabilities, image capture capabilities, and/or navigation capabilities. In addition to being able to connect to the network 106, in one or more embodiments the terminal devices 102,103,104,105 may be able to connect to each other or to other devices through local area networks, peer-to-peer networks, near field communication, or through pico networks.

Figure 2:
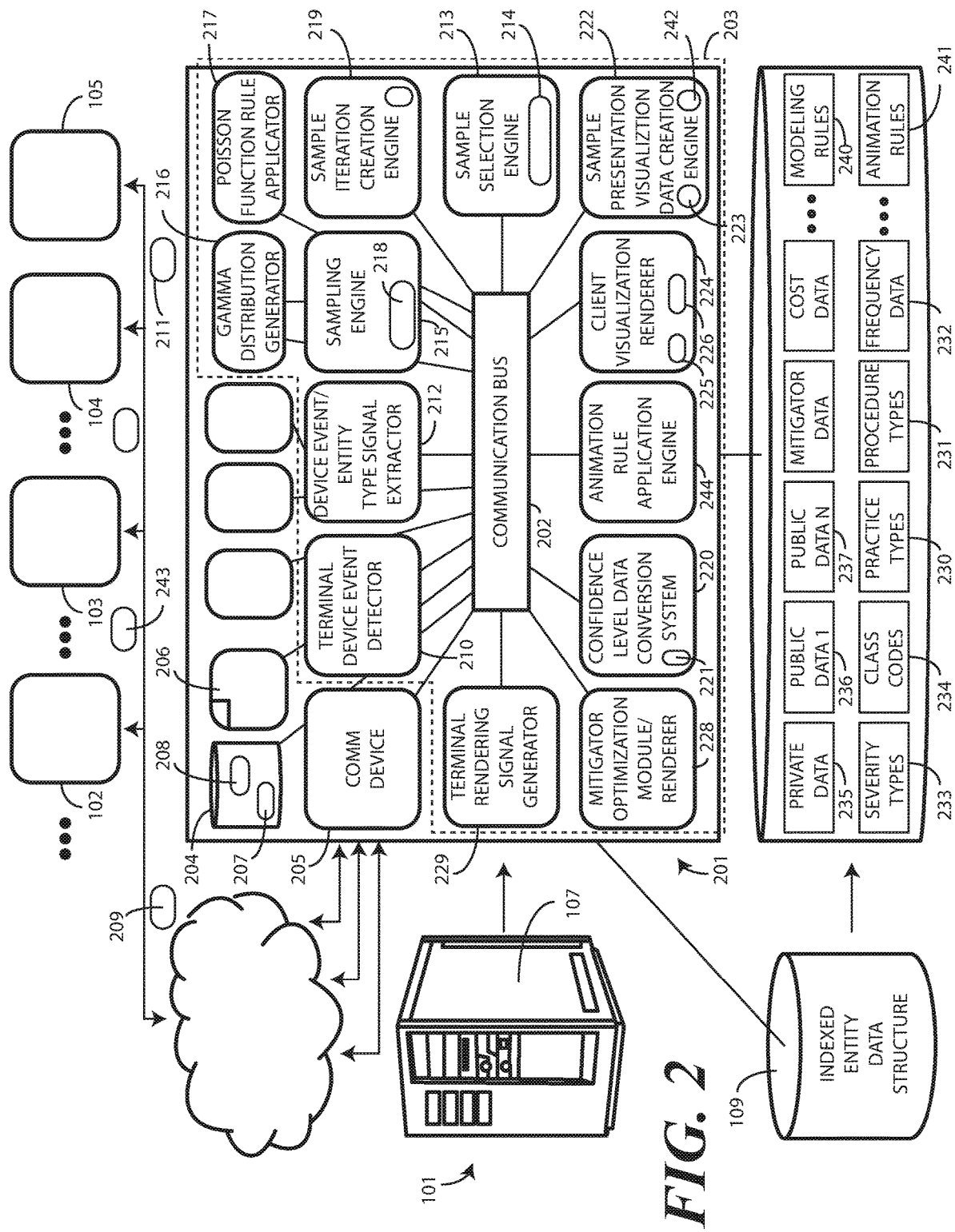
FIG. 2 illustrates one explanatory server complex in accordance with one or more embodiments of the disclosure.

Turning now to FIG. 2, illustrated therein is one explanatory sever complex 101 configured in accordance with one or more embodiments of the disclosure. A schematic block diagram 201 illustrates various components of the server complex 101, showing only those specific details that are pertinent to understanding the embodiments of the present disclosure so as not to obscure the disclosure with details that will be readily apparent to those of ordinary skill in the art having the benefit of the description herein. Accordingly, those of ordinary skill in the art having the benefit of this disclosure will recognize that other components may be included in a server complex 101 as well.

In the illustrative embodiment of FIG. 2, server 107 is an illustrative computing device suitable for implementing aspects of data visualization systems in accordance with the many embodiments of the disclosure. In one or more embodiments, the server 107 performs operations, configured as methods describe below, to display, animate, or allow interaction with graphical objects on one or more of the terminal devices 102,103,104,105.

In one or more embodiments, server 107 includes a communication bus 202. In one or more embodiments, the communication bus 202 comprises one or more buses, such as a system bus or an input/output bus. In one or more embodiments, the communication bus 202 may be implemented using any suitable type of architecture that provides for a transfer of data between different components or devices operatively coupled to the communication bus 202. Other communication bus structures will be obvious to those of ordinary skill in the art having the benefit of this disclosure.

In one or more embodiments, the communication bus 202 facilitates communications between one or more processors 203, one or more memory devices 204, persistent storage devices such as the indexed entity data structure 109, communication devices 205, and one or more user interface devices 206, which can include a display and data entry components. The one or more memory devices 204, indexed entity data structure 109, communication devices 205, and the one or more user interface devices 206 are illustrative examples of resources accessible by the one or more processors 203 via the communication bus 202.

In one or more embodiments, the one or more processors 203 are configured to execute operations in the form of computer readable instructions that may be stored in the one or more memory devices 204. The one or more processors 203 can include a single processor, a plurality of processors, a multi-processor core, or some other type of processor(s) in one or more embodiments.

In still other embodiments, the one or more processors 203 may comprise a number of heterogeneous processor systems that include an application processor and an auxiliary processor, which may be configured as separate devices or in a common chip. In still other embodiments, the one or more processors 203 may comprise a symmetric multi-processor system containing multiple processors of the same type. Still other configurations for the one or more processors 203 will be obvious to those of ordinary skill in the art having the benefit of this disclosure.

Illustrating by example, in one or more embodiments, the one or more processors 203 are configured as a hardware unit. In another embodiment, the one or more processors 203 are configured as a system of circuits. In still another embodiment, the one or more processors 203 are configured as an ASIC. In still another embodiment, the one or more processors 203 are configured as another type of hardware device capable of performing one or more computer-implemented operations.

For instance, in one or more embodiments the one or more processors 203 are configured as a programmable logic device. Where so configured, the programmable logic can be configured, then reconfigured, as the program instructions, data, or models, change. Where so configured, the program instructions can be configured in hardware, thereby omitting the need for program code.

In one or more embodiments, the one or more memory devices 204 may comprise data, program code, firmware, or other storage devices. As used herein, a "storage device" comprises a computer hardware component configured to store information, including but not limited to, data, program code in functional form, and other suitable information either on a temporary basis or a permanent basis. In one or more embodiments, the one or more memory devices 204 comprise one or more cache devices, such as that found in an interface and memory controller hub. Other configurations for the one or more memory devices 204 are described herein. Still others will be obvious to those of ordinary skill in the art having the benefit of this disclosure.

The one or more memory devices 204 may also be described as computer-readable storage devices in one or more embodiments. The one or more memory devices 204 may comprise for example, a random access memory or any other suitable volatile or non-volatile storage device. The one or more memory devices 204 may be configured in other ways as well, as will be obvious to those of ordinary skill in the art having the benefit of this disclosure.

Illustrating by example, the one or more memory devices 204 may comprise one or more components or devices, such as one or more disk arrays, one or more flash memory arrays, one or more rewritable optical disks, rewritable magnetic tapes, and/or combinations thereof. The one or more memory devices 204 may be fixed within a server 107 of the server complex 101, distributed among multiple servers of the server complex 101, or may be coupled to the server 107 and removable, such as when the one or more memory devices 204 are configured as removable hard drives configured for persistent data and program code storage.

The communication device 205, in one or more embodiments, facilitates electronic signal and data communication with other data processing systems or devices, such as the one or more terminal devices 102,103,104,105. In one or more embodiments, the communication device 205 is configured for wired or wireless communications with these devices, and can include a receiver and transmitter, or alternatively a transceiver. Where configured for wireless communication, the communication device 205 can include one or more antennas. Where included in a server 107, the communication device 205 can be configured as a network interface card.

In one or more embodiments, the communication device 205 is configured to facilitate input and output of data, instructions, and program code with other devices that may be connected to the server complex 101, including terminal devices 102,103,104,105. The communication device 205 can, in one or more embodiments, include an input/output device to perform these operations. The communication device 205 can optionally be configured to communicate with user interface devices 206 coupled to the server 107, including an optional keyboard, a mouse, and/or some other suitable input device. The communication device 205 can further be configured to deliver output to other user interface devices 206, such as sending output to a printer or presenting graphical indicia on a display.

In one or more embodiments, the communication device 205 can comprise a number of devices that transmit data, receive data, or both transmit and receive data. Illustrating by example, in one embodiment the communication device 205 comprises a modem or a network adapter. In other embodiments, the communication device 205 comprises two or more network adapters. Other configurations for the communication device 205 will be obvious to those of ordinary skill in the art having the benefit of this disclosure.

Program code, modules, and computer-readable instructions 207 for the one or more processors 203 may be located in the one or more memory devices 204, which are in communication with the one or more processors 203 through the communication bus 202. In one or more embodiments, such program code, modules, and computer-readable instructions 207 can be stored in a functional form on persistent storage in the one or more memory devices. This program code, modules, and computer-readable instructions 207 may be stored in the one or more memory devices 204 for execution by one or more processors 203.

The one or more processors 203 may execute and perform processes of the different embodiments of the methods described below using computer-implemented instructions, which may be located in a memory device, one example of which are the one or more memory devices 204. The computer-implementable instructions by which the one or more processors 203 perform the various methods described below can be referred to as program instructions, program code, computer usable program code, or computer-readable program code.

In one or more embodiments, these program code, modules, and computer-readable instructions 207 reside in the one or more memory devices 204 in a functional form so that they may be accessed and implemented by the one or more processors 203. In one or more embodiments, the program code, modules, and computer-readable instructions 207 combine to define an executable program code 208. This executable program code 208 may be stored on computer-readable storage media of the one or more memory devices 204.

In one or more embodiments, the computer-readable storage media of the one or more memory devices 204 comprises a physical or tangible storage device used to the executable program code 208, and not a medium that propagates or transmits the executable program code 208. The computer-readable storage media can thus be alternatively referred to as computer-readable tangible storage device(s) or computer-readable physical storage device(s). In one or more embodiments, the one or more memory devices 204 comprising the computer-readable storage media comprise physical storage devices that are can be installed, repaired, and/or replaced in the server 107.

In other embodiments, the program code, modules, and computer-readable instructions 207 may be downloaded over a network from another persistent storage device, such as the indexed entity data structure 109. The program code, modules, and computer-readable instructions 207 can also be downloaded over a network from another device or data processing system through computer-readable signal media 209 for use within the server complex.

In one or more embodiments, the computer-readable signal media 209 can comprise a propagated data signal comprising one of more of data and/or computer-executable program code. Illustrating by example, in one or more embodiments the computer-readable signal media 209 comprises an electromagnetic signal. In other embodiments, the computer-readable signal media 209 comprises an optical signal. Still other types of signals suitable for use as the computer-readable signal media 209 will be obvious to those of ordinary skill in the art having the benefit of this disclosure. In one or more embodiments, these signals may be transmitted over communications links, such as wireless communications links, optical fiber cable, coaxial cable, a wire, and/or any other suitable type of communications link. Accordingly, the communications link and/or the connection may be physical or wireless in accordance with various embodiments of the disclosure.

In one or more embodiments, the program code, modules, and computer-readable instructions 207 can be downloaded from the indexed entity data structure 109 for use by the one or more processors 203 of the server 107. The data processing system providing the program code, modules, and computer-readable instructions 207 may be another server, a client computer, or some other device capable of storing and transmitting the program code, modules, and computer-readable instructions 207.

The various components illustrated and described in FIG. 2 for the server complex 101 are illustrative only, and are not intended to define architectural limitations regarding the ways in which a server complex 101 in accordance with embodiments of the disclosure may be implemented. The various components may be configured in a server complex that includes components in addition to and/or in place of those illustrated in FIG. 2. Moreover, the server complex 101 may include other components than those shown in FIG. 2. Illustrating by example, in another embodiment the server complex 101 may be implemented using a different hardware structure capable of executing computer-readable instructions.

In one or more embodiments, the one or more processors 203 can define one or more process engines used in a visualization system. The process engines can perform portions of a method of generating entity type graphical objects, impactor mitigator graphical objects, and impactor graphical objects for a visualization system. The process engines can further apply rules when selecting, for example, impactor data to ensure that the impactor data is relevant to a particular entity type and structure, that the impactor data is representative of actual impactor data that a particular entity type may sustain, and to ensure that the impactor data is distributed with a randomness that replicates statistical models representing actual loss events.

In one or more embodiments, a terminal device event detector 210 receives terminal device interaction events 211, which can comprise user input occurring at a terminal device 102,103,104,105, and which are configured as computer-readable signal media 209 transmitted from at least one of the one or more terminal devices 102,103,104,105. In one or more embodiments, the terminal device interaction events 211 comprise user interactions with user interface devices occurring at terminal devices 102,103,104,105.

In one or more embodiments, the server complex 101 can prompt users at the terminal devices 102,103,104,105 for information related to one or more of entity structure and/or impactor mitigators currently in place at the entity structure. Such prompting may occur, for example, when this information is not currently stored in the indexed entity data structure 109.

In one or more embodiments, the terminal device interaction events 211 may indicate the type of entity, the location of the entity, the operations of the entity, the internal components of the entity, the number of operations of the entity, the frequency of operations of the entity, and so forth. If, for illustration by example, the entity were a medical practice, the terminal device interaction events 211 may include computer-readable signal media 209 identifying the state in which the practice was located, the type of practice, the county in which the practice was located, the number of beds at the location, the number of outpatient visits, the number of procedures, severity type of the procedures performed, and so forth. The terminal device interaction events 211 could also provide physician specialty, reimbursement providers, the number of physicians by specialty, and so forth. (Some examples of such entity identifying information will be described in more detail below with reference to FIG. 6.) For other entity types, of course, the terminal device interaction events 211 would provide computer-readable signal media 209 identifying other information. Accordingly, other types of terminal device interaction events 211 will be obvious to those of ordinary skill in the art having the benefit of this disclosure.

When the server complex 101 receives the computer-readable signal media 209 comprising the information entered during the terminal device interaction events 211, it can be stored in the one or more memory devices 204 in one or more embodiments. Alternatively, the computer-readable signal media 209 comprising the information entered during the terminal device interaction events 211 can be stored in persistent storage devices such as the indexed entity data structure 109 as stored entity type identification data 230, 231,232.

In one or more embodiments, entities can be pre-classified and arranged into one or more predefined class codes 234. These predefined class codes 234 can be stored in stored in persistent storage devices such as the indexed entity data structure 109 in one or more embodiments. Alternatively, the terminal device interaction events 211 can identify the predefined class codes 234 assigned to the entity as well.

In one or more embodiments, the predefined class codes 234 serve as a primary key identifier by which impactor data 235,236,237 is selected for the visualization simulation. Illustrating by example, if a universe of entities is classified in twenty-six predefined classes with codes A-Z, the one or more processors 203 of the server complex 101 may select a first subset of impactor data from the universe of impactor data 235,236,237 stored in the indexed entity data structure 109 for an entity classified in class code "A." By contrast, another entity, classified in class code "C," might have another subset of impactor data selected from the universe of impactor data 235,236,237, and so forth.

Using medical practices again as illustrative entities for which the visualization system (100) may be used, a class code of "1" may be associated with dentists engaged in oral surgery or operative dentistry on patients rendered unconscious through the administering of any anesthesia or analgesia, addictionology professionals, aerospace medicine professionals, pharmacology professionals, diabetes specialists, nutrition specialists, and pediatricians who do not perform surgery. A class code of "2" may be associated with ophthalmologists that perform surgery, hematologists that perform surgery, cardiovascular disease specialists that do not perform surgery, pulmonary disease specialists that do not perform surgery, gastroenterologists that perform minor surgery, intensive care medicine specialists, and radiation therapy specialists.

In one or more embodiments, a class code of "3" can include emergency medicine practitioners, and otorhinolaryngologists who perform non-cosmetic surgery, while a class code of "4" can correspond to endocrinologists that perform surgery, geriatric specialists that perform surgery, neoplastic disease specialists that perform surgery, nephrologists who perform surgery, professionals who perform oral maxillofacial surgery, ophthalmologists that perform surgery, professionals performing colo-rectal surgery, otorhinolaryngologists who perform cosmetic surgery, and dermatologists that perform surgery including liposuction.

In one or more embodiments, a class code of "6" can be associated with professionals performing cardiac surgery, thoracic surgery, vascular surgery, traumatic surgery, and limited neurological surgery of the back. In one or more embodiments, a class code of "7" corresponds to professionals performing obstetrics and gynecology surgery, while a class code of "8" corresponds to professionals performing neurological surgery.

In one or more embodiments, a class code of "1A" can be associated with professionals performing general preventative medicine without performing surgery, occupational medicine, physical medicine and rehabilitation, endocrinology including minor surgery, geriatrics medicine including minor surgery, gynecology including minor surgery, and rheumatology without performing surgery. The class code "1A" can also include radiology diagnostic practices without performing surgery, internal medicine without performing surgery, neoplastic disease practices or oncology including minor surgery, and nephrology including minor surgery. In one or more embodiments, class code "1A" can also include nuclear medicine, ophthalmology without performing surgery, otorhinolaryngology without performing surgery, general physicians that perform minor surgery, pediatricians that perform minor surgery, hospitalists that do not perform surgery, general practitioners that do not perform surgery, and ambulatory care workers that provide care in outpatient clinics without performing surgery.

In one or more embodiments, a class code of "2A" can be associated with infectious disease practitioners including the performance of minor surgery, neurologists including the performance of minor surgery, cardiovascular disease specialists including the performance of minor surgery, general practitioners, excluding obstetricians, including the performance of minor surgery, neonatal and perinatal medicine practitioners, and physicians normally assigned to a lower-rated specialty classification if they perform certain medical procedures. In one or more embodiments, a class code of "2B" can be associated with internal medicine practitioners including the performance of minor surgery, while class code "2C" can be associated with gastroenterologists including the performance of minor surgery, urologists including the performance of minor surgery, otorhinolaryngology including the performance of minor surgery, and physicians normally assigned a lower-rated specialty classification if they perform certain procedures.

In one or more embodiments, a class of "3A" can be associated with anesthesiologists, while a class code of "3B" can be associated with radiologists including the performance of minor surgery, physicians assisting in surgery on own patients, general practitioners, including obstetricians other than those performing Caesarian sections, and radiologists performing majorly invasive procedures. In one or more embodiments, a class of "4A" can be associated with general practitioners not primarily engaged in major surgery (which includes abortions in one or more embodiments), obstetricians performing procedures such as Caesarian sections and hysterectomies at rates less than five per month, and anesthesiologists who work less than three hours per week. In one or more embodiments, class "4A" can further be associates with orthopedic surgeons who perform procedures other than spinal surgery, endocrinologists, reproductive specialists, hand and foot surgeons, and physicians assisting in surgery (only) on patients of others.

In one or more embodiments, a class of "4A2" can be associated with podiatrists, while a class of "4B" can be applied to plastic surgeons. A class of "5" can be associated with general surgeons, abdominal surgeons, and gynecological surgeons, while a class of "5A" can be associated with weight reduction surgeons. A class of "5B" can be associated with orthopedic surgeons in one or more embodiments. It should be noted that these class codes are illustrative only, and serve as one explanatory example of how entity structures can be pre-classified with one or more predefined class codes 234 for use in visualization systems configured in accordance with embodiments of the disclosure. Other examples of predefined class codes 234 for other types of entities will be obvious to those of ordinary skill in the art having the benefit of this disclosure.

In one or more embodiments, the one or more processors 203 consider only predefined class code 234 when selecting impactor data 235,236,237 for the visualization system. Thus, if a medical practice was a class "5A," for example, the one or more processors 203, by way of the sample selection engine 213 described below, may select impactor data 235,236,237 only as a function of this predefined class code 234.

In one or more embodiments, the one or more processors 203 may consider information beyond the predefined class code 234. Embodiments of the disclosure contemplate that when additional entity identification data that is obtained, either from the stored entity type identification data 230, 231,232, or from terminal device interaction events 211 in the form of computer-readable signal media 209, the better—and more realistic—the selection of impactor data 235,236,237 for a particular entity will be. For instance, if the terminal device interaction events 211 received as computer-readable signal media 209 also indicate the state in which the medical practice is located, the sample selection engine 213 can select more relevant impactor data 235,236, 237 than it could using predefined class code 234 alone. Continuing this example, if a number of physicians, specialty type, number of procedures, number of beds, and number of outpatient visits is known, the sample selection engine 213 can select still impactor data 235,236,237 that is specifically associated with the type of practice, and so forth. Still, while it is desirable in many environments to obtain all possible entity identification data, in one or more embodiments the visualization system can function when only the predefined class code 234 associated with the entity is received.

Upon receipt of the terminal device interaction events 211 in the form of computer-readable signal media 209, a device event entity type signal extractor 212 can extract entity type and entity identifying information from the computer-readable signal media 209 received from the terminal device event detector 210. In one or more embodiments, the device event entity type signal extractor 212 can then store this information in one or more of the one or more memory devices 204, the indexed entity data structure 109, or combinations thereof.

A sample selection engine 213 then selects sample set 214 of impactor data from indexed entity data structure 109. In one or more embodiments, the sample selection engine 213 selects this sample set 214 of impactor data as a function of computer-readable signal media 209 identifying the entity type, the predefined class code 234, and/or entity type identification data 230,231,232 stored in the indexed entity data structure 109.

In one or more embodiments, the sample selection engine 213 selects sample set 214 of impactor data 235,236,237 as a function of the predefined class code 234 only. In other embodiments, the sample selection engine 213 selects sample set 214 of impactor data 235,236,237 as a function of predefined class code 234 and number of members operating within the entity. Using the medical practice entity structure again as an example, in one or more embodiments the sample selection engine 213 selects sample set 214 of impactor data 235,236,237 as a function of the number of medical professionals working for the entity and a frequency that impactors are expected to impact each doctor working for the medical entity.

The frequency of impactor impact can be determined in a variety of ways. In one embodiment, the frequency is determined from the predefined class code 234 and the type of entity that is classified within the predefined class code 234. Illustrating by example, if the predefined class code 234 is "5" and the entity is a general surgery practice with five doctors performing surgery, the one or more processors 203 can analyze the impactor data 235,236,237 to determine that each doctor should expect six impactors to impact the entity across a given time period, such as one year. Accordingly, in one such embodiment the frequency would be six for the member, and six times five doctors for the entity, or a frequency of thirty per year.

In one or more embodiments, the universe of impactor data 235,236,237 is analyzed and subdivided into impactors occurring as a function of predefined class code 234, type of practice or practice specialty within that predefined class code 234, and impactor type. These impactor data 235,236, 237 can then be analyzed to determine the quantity of impactors likely to impact a member of an entity across a given time frame, such as one year. Once this frequency is known, the sample selection engine 213 can select sample set 214 of impactor data 235,236,237, where the sample set 214 includes N samples, where N equals the number of members in the entity times the frequency of impactor.

It should be noted that the impactor data 235,236,237 data can be obtained from a variety of sources. Again using a medical practice as an illustrative example of an entity, in one or more embodiments the impactor data 235,236,237 can comprise loss data from professional liability claims made against the medical practice. Such impactor data 235,236,237 can be obtained from both public and private sources.

Illustrating by example, in one or more embodiments impactor data 235 comprises private impactor data. Such private impactor data can be obtained from insurance companies, reinsurance companies, and other entities. An insurance company employing the visualization system (100) for example, may store claims it has processed as the private impactor data 235. This private impactor data can further be classified by one or more entity identifiers that will be described in more detail below with reference to FIG. 6. Moreover, the private impactor data can be classified in accordance with the predefined class codes 234 described above.

In other embodiments, the impactor data 236,237 can comprise public impactor data. Continuing with the medical practice example, sources for such public impactor data 236 can include data from service providers such as Definitive Health Care™, Iqvia™, the National Practitioner Data Bank™ (NPDB), the Florida Claims Data Submission database, or other sources. As with the private impactor data, the public impactor data can be classified in accordance with the predefined class codes 234 described above.

Using such private and public impactor data as the stored impactor data 235,236,237 from which the sample selection engine 213 can select, vast troves of impactor data can be collected. In one illustrative embodiment in a medical practice application, the impactor data 235,236,237 can comprise over fifty thousand healthcare liability claims. In one or more embodiments, in addition to identifying the severity type 233 of the impactor, the impactor data 235,236,237 also identifies location, specialty, practice type and other entity-specific markers. As will be described in more detail below, from these impactor data 235,236,237 the sample selection engine 213 then generates a universe of impactor potential for a given entity type. In one or more embodiments, these impactor data 235,236,237 define all potential impactors that may affect a given entity, including those the entity has never experienced. Embodiments of the disclosure advantageously generating very accurate interpretations of impactor potential, which allows the entity to make better impactor mitigator integration decisions moving forward.

In addition to being classified by predefined class code 234, the impactor data 235,236,237 can also be classified by severity type 233. Embodiments of the disclosure contemplate that some impactors will be low severity impactors that have less adverse impact upon an entity when occurring. By contrast, other impactors will be high-severity impactors, and will have a greater adverse impact upon the entity when occurring. Continuing the medical practice illustration, severity types 233 related to impactors may refer to injury type sustained by a patient when injured. Illustrating by example, in one or more embodiments the severity types 233 may comprise grave permanent injury, major permanent injury, significant permanent injury, death, minor permanent injury, major temporary injury, minor temporary injury, emotional injury, and insignificant injury. Other examples of severity types 233 will be obvious to those of ordinary skill in the art having the benefit of this disclosure.

In one or more embodiments, the sample selection engine 213 initially selects the sample set 214 impactor data from the impactor data 235,236,237 stored in the indexed entity data structure 109 independent of any entity identifying information. This is in contrast to situations in which the sample selection engine 213 selects from the impactor data 235,236,237 as a function of predefined class code 234, predefined class code 234 and severity type 233, and/or predefined class code 234, severity type 233, and other entity identifying factors. Operating in this mode improves the way that the one or more processors 203 store and retrieve impactor data 235,236,237 from the indexed entity data structure 109 by increasing the speed at which the sample selection engine 213 can select the sample set 214 for a give entity.

Recall from above that in one or more embodiments, the sample selection engine 213 can select from the impactor data 235,236,237 as a function of many different entity identifiers, including a number of physicians, specialty type, number of procedures, number of beds, and number of outpatient visits is known. This takes processing power and processing time. However, experimental testing demonstrated that the average severity type 233 of impactor is effectively the same across predefined class code 234, as well as predefined class code 234 in combination with one or more of these factors.

Accordingly, upon determining the number of impactors to select, in one or more embodiments the sample selection engine 213 ignores associations between the entity type and any of the impactors, and instead selects from the universe of impactors stored in the impactor data 235,236,237 independent of any entity identifying information. Experimental testing has demonstrated that this modification in how the server complex 101 operates thereby provides a specific improvement to the way the servers 107 of the server complex 101 operate, which is embodied in the way the sample selection engine 213 selects impactors from the impactor data 235,236,237. Advantageously, the fact that this process is the opposite of prior art processes performed results in superior performance.

Regardless of whether the impactors are selected from the impactor data 235,236,237 as a function of markers specifically identifying an entity type or structure, or by ignoring such markers to improve the way the server complex 101 stores and retrieves data from memory devices, embodiments of the disclosure do contemplate, however, that the sample selection engine 213 should select impactors from the impactor data 235,236,237 randomly. To ensure that this occurs, a sample rule set application engine 215 can be included to work in conjunction with the sample selection engine 213.

Prior to discussing the sample rule set application engine 215, it should be noted that, as will be described in more detail below, before preparing and presenting the visualization models, a sample iteration generation engine 219 causes a predefined number of simulations to occur, where each simulation that models impactors impacting an entity and/or its impact mitigators across a predefined time interval, with the predefined number of simulations representing a predefined number of those time intervals. Using a medical practice as an illustrative entity, with professional liability losses as one type of impactor, and insurance coverage as one type of impactor mitigator, the sample iteration generation engine 219 may cause the predefined number of simulations to represent those impactors occurring across a predefined number of years. In one or more embodiments, the predefined number of years is ten years. In another embodiment, the predefined number of years is one hundred years. In still another embodiment, the predefined number of years is one thousand years. Still other numbers of years will be obvious to those of ordinary skill in the art having the benefit of this disclosure.

In one or more embodiments, the sample rule set application engine 215 ensures that each simulation of this number of simulations is randomized from each other simulation in the number of simulations by applying one or more rules by which the sample rule set application engine 215 must comply when selecting impactors from the impactor data 235,236,237. These rules ensure that the impactors selected from the impactor data 235,236,237 are realistic in that they vary from time period to time period, in number, severity, and frequency, while at the same time ensuring that a desired frequency is the mean across the plurality of time periods.

In one or more embodiments, the sample rule set application engine 215 works with a gamma distribution generator 216 and a Poisson function rule applicator 217 to achieve this goal of randomizing from time period to time period across a plurality of time periods, while achieving a desired frequency per time period, or other metric, across the plurality of time periods. While the sample rule set application engine 215 uses gamma distributions and Poisson functions in the application of these rules, it should be noted that they are being used in a limited application to generate one or more predefined rules for the sample selection engine 213 to select impactors from the impactor data 235,236,2376 to ensure that the impactor data is representative of actual impactors that a particular entity type may sustain, while ensuring the impactor data is distributed with a randomness that replicates statistical models representing actual impactors across a predefined number of time periods, and retaining a desired mean frequency or other metric for the plurality of time periods.

Accordingly, while the sample rule set application engine 215 selects and applies such rules using gamma and Poisson distributions, to improve the realism of the information presented by the visualization system in a manner never before seen, it should again be noted that the selected and applied rules in no way preempt the presentation of such impactor visualization data in traditional, prior art formats. Nor do they preempt the usage of such rules in other applications. This is confirmed by the fact that the applied rules cause the impactors selected from the impactor data

235,236,237 to be selected in a specific way that randomizes the selected impactors to achieve realistic, but randomized, impactor data. The specific application of these rules thus ensures that no broad preemption of all rules-based means of presenting impactor and impactor mitigator data is occurring. This is true because the limits of the rules themselves are not broad enough to preclude all possible approaches to presenting impactor and impactor mitigator data. While other approaches likely will be inferior to the ones described herein, there is no requirement that the rules-based visualization, presentation, animation, and interaction be used to impactor and impactor mitigator data in ways other than those claimed below.

For the following illustrative discussion, presume the sample iteration generation engine 219 will cause a predefined number of simulations to occur, where each simulation that models impactors impacting an entity and/or its impact mitigators across a predefined time interval, with the time interval being a period of one year. Now presume that the sample iteration generation engine 219 causes the predefined number of simulations to be one thousand, thereby representing one thousand years of impactor data that will be selected by the sample selection engine 213 as the sample set 214 for a particular entity.

In one or more embodiments, to achieve the necessary realism and randomization across the thousand years, the gamma distribution generator 216 generates an array of one thousand gamma factors that have a mean equal to one. In so doing, the gamma distribution generator 216 generates a distribution of factors to scale the desired frequency of impactors occurring in any given year so that the frequency differs from year to year, but across the thousand years averages to the frequency selected from the predefined class code 234, entity type, and number of members active within the entity.

Said differently, in one or more embodiments the gamma distribution generator 216 generates a distribution of factors to scale the selected frequency (which in one embodiment is the product of the expected frequency for each member of an entity type operating within a predefined class code 234 times the number of members) across the one thousand year period to various values greater than the selected frequency or less than the selected frequency, but that have a value of one times the selected frequency as a mean across the one thousand year period. In effect, this use of the gamma distribution generator 216 causes the frequency for any given year to potentially deviate from the selected frequency. However, it provides a one thousand year average equal to the selected frequency. Advantageously, the application of the gamma factor rule using the gamma distribution generator 216 causes the number of impactors selected in the sample set 214 by the sample selection engine 213 to be more realistic in any given year due to the fact that, in real life, it is unlikely that the frequency would be equal to the selected frequency each and every year. At the same time, the application of the gamma factor rule using the gamma distribution generator 216 causes the average impactor frequency for the long term to be exactly equal to the selected frequency.

To illustrate by example, consider the situation where, for a chosen frequency of sixty per year, the gamma distribution generator 216 generates the following ten elements as the first ten elements in the array of elements representing the one thousand year period: 1.0094866 0.6424495 0.8331758 1.1191176 1.1320268 1.4014988 0.9609934 1.2261066 1.7431356 0.9029951 0.9299348 1.3108653 1.3344450 1.0025480. When multiplying by frequency and rounding to the nearest integer, the frequency of impactors per year would be expressed as the gamma factor times the frequency, yielding the following frequencies: 61, 39, 50, 67, 68, 84, 58, 74, 105, 54, 56, 79, 80, and 60, per year, respectively. While each is different for each year, the average across the thousand years would still be the chosen frequency, or sixty impactors per annum.

In one or more embodiments, the sample rule set application engine 215 is also operable with a Poisson function rule applicator 217. As known in the art, a Poisson distribution is a probability distribution that plots, as a function of an index number, generally referred to as "k," the probability of a given number of events occurring across a predefined time, generally referred to as "lambda," where such events occur with a constant rate with each occurrence happening independent of the amount of time that has passed since the most recent event occurred. Applied to this disclosure, a Poisson distribution can illustrate a probability of each impactor impacting an entity structure or impactor mitigator across a predefined period, one year in this example, where each impactors occurrence is independent of the amount of time passing since its predecessor occurred. Said differently, the use of the Poisson distribution advantageously provides impactor sets where the probability of one impactor impacting an entity structure does not affect the probability of another impactor impacting the same entity structure.

In one or more embodiments, the scaled frequency occurring for each time period after the application of the rules from the gamma distribution generator 216 are then input into the Poisson function rule applicator 217 as the "lambda" values to generate the distribution. In so doing, the Poisson function rule applicator 217 generates a different probability curve for each predefined time duration, with their being an explicit probability for each number of occurrences.

Since each impactor data point in the impactor data 235,236,237 stored in the indexed entity data structure 109 includes therewith an express probability of that impactor occurring, by correlating the probabilities output by the Poisson function rule applicator 217 with those probabilities, the sample selection engine 213 can select impactors for the sample set 214 from different probabilistic segments defined within the impactor data 235,236,237. Thus, across the illustrative one thousand year period, a "once every twenty year" impactor will impact an entity structure or impactor mitigator every twenty years on average, without striking at each and every twenty-year interval.

In effect, the Poisson function rule applicator 217 allows for exact impact time of an impactor to vary about its mean across the plurality of time segments. As with the gamma distribution generator 216, this variation again mirrors real life because the sum total of losses will not be the same from year to year. However, by using the mean of one from the gamma distribution generator 216, all of the variously shaped Poisson distribution functions output by the Poisson function rule applicator 217 should integrate over the 1000 years to yield a randomly selected, average expected adverse impactor effect per year.

Accordingly, in one or more embodiments the sample rule set application engine 215 applies rules to the sample selection engine 213 for selecting the sample set 214 of impactor data from the impactor data 235,236,237 stored in the indexed entity data structure 109 by generating, with the gamma distribution generator 216, an array of one thousand gammas that in total average to one. For each iteration of the simulation, the next gamma of the gamma array is multiplied by the chosen impactor frequency. That product is then input into the Poisson function rule applicator 217 as the lambda value. A Poisson distribution for each year is generated, which has probabilities correlated to probabilities of the impactors stored in the impactor data 235,236,237 so that the sample selection engine 213 can select realistic, but randomized, impactor data in the sample set 214. Once randomized by the application of these rules, the sample set 214 is transformed and output as randomized impactor data 218. While one thousand gammas is used as an illustrative example for a one thousand year time period, it will be obvious to those of ordinary skill in the art having the benefit of this disclosure that other numbers of gammas can be used to represent other numbers of predefined time periods.

Thus, the process described above with reference to the sample selection engine 213, the sample rule set application engine 215, operating in conjunction with the gamma distribution generator 216 and the Poisson function rule applicator 217, and sample iteration generation engine 219, outputs a sample set 214 of impactor data as randomized impactor data 218. In one or more embodiments, the randomized impactor data 218 comprises a set of impactors that a given entity structure probabilistically will encounter across a number of time periods defined by the sample iteration generation engine 219. Thus, if the sample iteration generation engine 219 defined a period of 1000 years as the iteration window, the randomized impactor data 218 would then comprise the impactors the entity structure probabilistically would encounter across the 1000-year window.

However, as noted above, one of the principal advantages of embodiments of the disclosure is that the randomized impactor data 218 is presented not as a function of time, i.e., by presenting visualizations of impactors from the randomized impactor data 218 impacting the entity structure per month, year, or decade, but rather as a function of confidence level, with the confidence level referring to a level below which no greater impactor will probabilistically impact the entity structure. Said differently, in one or more embodiments the randomized impactor data 218 is presented not as a function of time, but rather as a function of a confidence level below which no more adverse impactor is expected. In one or more embodiments, these impactors are presented in conjunction with a visualization of the effects upon both entity and impactor mitigators by those impactors across confidence level.

This "confidence level" instead of "across time" visualization process advantageously allows users to quickly, easily, and simply visualize probabilistic effects upon entities and impactor mitigators to determine what adverse effects the entity will sustain, the frequency at which the entity will sustain these adverse effects, the entity depletion results stemming from these adverse effects, and how these statistical data can be changed when an entity is protected by alternate impactor mitigators. This is in contrast to prior art systems that provide visualizations that occur only as a function of time. Such prior art systems are deficient in that a temporal presentation of data only demonstrates when impactors impact an impactor mitigator or entity structure. The viewer of such visualization systems, therefore, has no mechanism for determining cumulative impactor effects upon impactor mitigators or the entity structure, especially when those impactor mitigators can be replenished, restocked, rebuilt, or replaced at various intervals.

This is true because, unlike embodiments of the present disclosure, the prior art systems generally fail to consider sample size, sample variability, and potential variation across the universe of impactor data 235,236,237, and therefore fail to adequately or accurately illustrate the effects of impactors upon impactor mitigators and entity structures.

Moreover, temporal systems fail to provide any probabilistic implications corresponding to the precision and/or sampling error associated with selecting the data used in the visualization. A viewer of a prior art system may conclude that the X impactors impacting the entity structure across a year are exactly those that should be expected, resulting in the implementation of inaccurate impactor mitigator strategies.

By contrast, embodiments of the present disclosure provide an explicit probabilistic implication that the randomized impactor data 218 is an estimate within a distribution, with a tail of that distribution lying beyond the confidence level. Advantageously, a viewer of the simulation will intuitively understand that any impactor mitigator strategy employed will not be perfect, but will instead be subject to a potentially "long" tail if the distribution is not normally distributed. Thus, viewers of visualizations configured in accordance with embodiments of the disclosure receive an explicit warning flag indicating that a given mitigator strategy will work only within a certain confidence range, not in the absolute sense, thereby allowing the viewer to assess remaining risk and configure an impactor mitigator strategy to correspond with a desired comfort level. Thus, advantageously, embodiments of the disclosure correct the problems associated with the prior art by presenting data visualizations, which can be in the form of one or more animations, which progress as a function of confidence level, not time.

In one or more embodiments, the confidence level data conversion system 220 is responsible for converting the randomized impactor data 218 into a visualization impactor data set 221. The confidence level data conversion system 220 performs this process primarily across three different operations. First, the confidence level data conversion system 220 sorts impactors from the randomized impactor data 218 from least severity to highest severity to generate a sorted randomized impactor data set.

Recall from above that embodiments of the disclosure contemplate that some impactors will be low severity impactors that have less adverse impact (smaller magnitude) upon an entity structure or impactor mitigator when occurring. By contrast, other impactors will be high-severity impactors, and will have a greater adverse impact (higher impact) upon the entity structure or impactor mitigator when occurring. In one or more embodiments, the confidence level data conversion system 220 first sorts the impactors from the randomized impactor data 218, arranging them from smallest impactor magnitude to largest impactor magnitude. Where, for example, the randomized impactor data 218 defines impactors that a given entity structure can expect to encounter across a 1000-year period, this sorting would result in a sorted randomized impactor data set comprising impactors ranging from the smallest in magnitude occurring across the 1000-year period to the largest in magnitude occurring across the 1000-year period.

Second, the confidence level data conversion system 220 divides this sorted impactor data into one hundred groups. Each group represents one percent of the impactors of the randomized impactor data 218. If, for example, there were two thousand impactors in the randomized impactor data 218, each division would include twenty impactors, each falling within one percent of the range of impactor magnitude of the randomized impactor data 218, with that one percent defined by the smallest magnitude of the twenty impactors within the group and the largest magnitude of the twenty impactors in the group.

Third, the confidence level data conversion system 220 selects, evenly from the one hundred groups, a predefined number of impactors from the randomized impactor data 218 that will be used for the visualization. The predefined number can vary based upon application and visualization output capability. In one or more embodiments, the predefined number is one thousand impactors. Thus, if there were three thousand impactors in the sorted randomized impactor data set, with thirty impactors in each of the one hundred groups, in one or more embodiments the confidence level data conversion system 220 would select, randomly, ten impactors from each thirty-impactor group to yield a visualization impactor data set 221 of one thousand impactors, with ten impactors in each of the one hundred groups. While one thousand is one illustrative predefined number of impactors the confidence level data conversion system 220 can select, others will be obvious to those of ordinary skill in the art having the benefit of this disclosure.

Since this visualization impactor data set 221 is arranged in the one hundred groups by magnitude, and since the visualization impactor data set 221 represents a sampling of impactors taken from a very long period of time, e.g., one thousand years, each of the one hundred groups defines a confidence level below which no impactor with a greater magnitude will occur. Illustrating by example, if the ninety-fifth group included impactors with magnitudes ranging from 2.5 million units to 2.55 million units, this group would represent a ninety-five percent confidence level that an entity structure would never see any impactor with a magnitude over 2.55 million units. As noted above, this is a probabilistic value. Thus, it is an estimate only, in that distributions can have fat, long, or asymmetrical tails. Accordingly, the confidence level associated with the visualization impactor data set 221 is a best estimate given the quality of the impactor data 235,236,237, the amount of time selected by the sample iteration generation engine 219, and the random selection from the sorted randomized impactor data set. Still, the confidence level provided is far superior for use in visualization of impactors than are prior art temporal systems for the reasons set forth above.

The visualization impactor data set 221 is then fed into a sample presentation visualization data generation engine 222. In one or more embodiments, the sample presentation visualization data generation engine 222 primarily performs two operations: First, it correlates the visualization impactor data set 221 to a given entity structure. Second, it generates impactor graphical objects 223 from the visualization impactor data set 221 by applying one or more modeling rules 240 stored in the indexed entity data structure 109 or another memory or storage device.

In one or more embodiments, where necessary, the sample presentation visualization data generation engine 222 first correlates the visualization impactor data set 221 with a given entity structure. Recall from above that in one or more embodiments impactors are initially selected from the impactor data 235,236,237 stored in the indexed entity data structure 109 independently of any entity identifying information, as experimental testing has determined that the magnitudes of impactors selected in this manner are generally indistinguishable from the magnitudes of impactors selected as a function of entity specific information, such as predefined class code 234, predefined class code 234 and severity type 233, and/or predefined class code 234, severity type 233, and other entity identifying factors. Advantageously, initially ignoring entity type when selecting impactors improves the way that the one or more processors 203 store and retrieve impactor data 235,236,237 from the indexed entity data structure 109 by increasing the speed at which the sample selection engine 213 can select the sample set 214 for a give entity.

Where this occurred, in one or more embodiments the sample presentation visualization data generation engine 222 first correlates the visualization impactor data set 221 with a given entity structure. The sample presentation visualization data generation engine 222 can correlate the visualization impactor data set 221 with a given entity structure as a function of many different entity identifiers, including a number of physicians, specialty type, number of procedures, number of beds, number of outpatient visits, and so forth.

In one or more embodiments, the sample presentation visualization data generation engine 222 does this by selecting an example impactor from the impactor data 235,236, 237 having a magnitude that is equal to a magnitude of an entity independent impactor included with the visualization impactor data set 221. Continuing the medical practice example, if an impactor included with the visualization impactor data set 221 has a magnitude of five million units, but is an impactor defining a loss associated with a malpractice claim for a general surgeon's amputation of an incorrect limb, and the specific entity type is that of an ophthalmologist, in one or more embodiments the sample presentation visualization data generation engine 222 does this by selecting an example impactor from the impactor data 235,236,237 corresponding to this practice type, e.g., a malpractice claim for an ophthalmologist's accidentally rendering a patient blind in one eye, and so forth.

In one or more embodiments, the sample presentation visualization data generation engine 222 repeats this process for each impactor of the visualization impactor data set 221. In one or more embodiments, the sample presentation visualization data generation engine 222 replaces all information associated with the impactor other than magnitude for each impactor of the visualization impactor data set 221. Thus, if the surgeon's five-million unit impactor occurred on a specific date, and was associated with other impactor specifics, in one or more embodiments the sample presentation visualization data generation engine 222 replaces all but the five million unit magnitude with the date and other impactor specifics taken from the ophthalmologist's impactor selected from the impactor data 235,236,237. In situations where the impactor data of the visualization impactor data set 221 was selected using entity identifying information, e.g., where the impactors of the visualization impactor data set 221 were initially selected as a function of a number of physicians, specialty type, number of procedures, number of beds, number of outpatient visits, and so forth, this first process of the sample presentation visualization data generation engine 222 can be omitted.

In one or more embodiments, the sample presentation visualization data generation engine 222 also generates impactor graphical objects 223 from the visualization impactor data set 221 by applying one or more modeling rules 240. Embodiments of the disclosure are directed to a visualization system with which the effects of impactors upon impactor mitigators and entity structures can intuitively and easily be seen. In one or more embodiments, impactor graphical objects 223 are the visualization tools by which impactors are presented in the visualization system. Thus, while an impactor of the visualization impactor data set 221 may be a data file that includes a magnitude, probability, impactor identifiers, impactor details, and so forth, in one or more embodiments the impactor graphical objects 223 defines a simple, intuitive graphical object that represents one or more of these characteristics when the impactor graphical object 223 is presented on a display in conjunction with the visualization system.

In one or more embodiments, the sample presentation visualization data generation engine 222 generates the impactor graphical objects 223 from the visualization impactor data set 221 by applying one or more modeling rules 240. Illustrating by example, in one or more embodiments the sample presentation visualization data generation engine 222 applies a modeling rule 240 by causing the impactor graphical objects 223 to have a predefined color. In one or more embodiments, the predefined color corresponds to the type of impactor. Illustrating by example, if the type of impactor is a skill set impactor, e.g., an impactor that occurs when a predefined skill set is misapplied, in one or more embodiments the impactor graphical object 223 corresponding this type of impactor will have a first color, such as red. By contrast, if another type of impactor is an external threat impactor, e.g., an impactor that occurs when an external enemy attacks an entity structure, in one or more embodiments the impactor graphical object 223 corresponding to this type of impactor will have a second color that is different from the first color, such as blue.

In one or more embodiments, the sample presentation visualization data generation engine 222 applies another modeling rule 240 by causing the impactor graphical objects 223 to have a predefined size. In one or more embodiments, the predefined size corresponds to the magnitude of impactor. Illustrating by example, if a particular impactor has a magnitude of 1.5 million units, in one or more embodiments the impactor graphical object 223 corresponding this type of impactor will be represented by a graphical object having a first size, such as a dimension of five millimeters. By contrast, if another type of impactor has a magnitude of ten million units, in one or more embodiments the impactor graphical object 223 corresponding this type of impactor will be represented by a graphical object having a second size, greater than the first size, such as such as a dimension of twenty millimeters, and so forth.

In one or more embodiments, the sample presentation visualization data generation engine 222 applies another modeling rule 240 by causing the impactor graphical objects 223 to have a predefined opacity. In one or more embodiments, the predefined opacity corresponds to the probability that another impactor having a predefined magnitude will occur. Illustrating by example, if a particular impactor has a reoccurrence probability of ninety-five percent, in one or more embodiments the impactor graphical object 223 corresponding this type of impactor will be represented by a graphical object having a first opacity, such as an opacity of five percent. By contrast, if another type of impactor has a reoccurrence probability of only ten percent, in one or more embodiments the impactor graphical object 223 corresponding this type of impactor will be represented by a graphical object having a second opacity, greater than the first opacity, such as such as an opacity of ninety percent, and so forth. These modeling rules 240 are illustrative only, as numerous others will be obvious to those of ordinary skill in the art having the benefit of this disclosure.

In a similar fashion to the way that the sample presentation visualization data generation engine 222 also generates impactor graphical objects 223 from the visualization impactor data set 221 by applying one or more modeling rules 240, in one or more embodiments a entity visualization renderer 224 generates an entity type graphical object 226 and/or one or more impactor mitigator graphical objects 227 for the visualization system. In one or more embodiments, the entity visualization renderer 224 generates an entity type graphical object 226 and/or one or more impactor mitigator graphical objects 227 by employing entity type, other entity identifying information, and impactor mitigator information from the computer-readable signal media received from the terminal device event detector 210 as extracted by the device event entity type signal extractor 212, and thereafter applying one or more modeling rules 240 to the extracted entity type, other entity identifying information, and impactor mitigator information. Alternatively, the entity visualization renderer 224 can generate an entity type graphical object 226 and/or one or more impactor mitigator graphical objects 227 by employing entity type, other entity identifying information, and impactor mitigator information from the computer-readable signal media received from the indexed entity data structure, as previously described, thereafter applying one or more modeling rules 240 to this information. Of course, a combination of these methods may be used as well. Moreover, still other techniques for generating an entity type graphical object 226 and/or one or more impactor mitigator graphical objects 227 will be obvious to those of ordinary skill in the art having the benefit of this disclosure.

In one or more embodiments, the entity visualization renderer 224 generates an entity type graphical object 226 for the visualization system by applying a first modeling rule 240. In one or more embodiments, the first modeling rule 240 comprises causing the entity structure to be represented as a geometric object in the entity type graphical object 226. Illustrating by example, in one or more embodiments the entity type graphical object 226 comprises a cylinder representing the entity structure. In one or more embodiments, the cylinder representing the entity structure has a predefined color, one example of which is white.

In one or more embodiments, the cylinder has a predefined height that is configured to be greater than the largest impactor mitigator corresponding to the entity structure. Thus, if the largest impactor mitigator has an impactor mitigation magnitude of 2.5 million units, represented by the height of the corresponding impactor mitigator graphical object 227, in one or more embodiments the cylinder representing the entity structure will have a height greater than this magnitude, or greater than the height corresponding to 2.5 million units.

While a white cylinder is one geometric object suitable for representing the entity structure as an entity type graphical object 226, it is illustrative only. Numerous others will be obvious to those of ordinary skill in the art having the benefit of this disclosure. For example, in another embodiment the entity type graphical object 226 can have a rectangular cross section. In another embodiment, the entity type graphical object 226 can have a multi-faceted cross section, with each face corresponding to an impactor mitigator employed by the entity structure, and so forth.

In one or more embodiments, the entity visualization renderer 224 generates an impactor mitigator graphical object 227 for the visualization system by applying another modeling rule 240. In one or more embodiments, this modeling rule 240 comprises causing the impactor mitigator to be represented as a geometric object attached to the entity type graphical object 226. In one or more embodiments, the impactor mitigator graphical object 227 comprises a wedge attached to a major face of the entity type graphical object 226. In another embodiment, the impactor mitigator graphical object 227 comprises a bar attached to a major face of the entity type graphical object 226. In still another embodiment, the impactor mitigator graphical object 227 comprises a concentrically aligned layer circumscribing the entity type graphical object 226. Still other examples of shapes for the impactor mitigator graphical object 227 will be obvious to those of ordinary skill in the art having the benefit of this disclosure.

In one or more embodiments, the entity visualization renderer 224 generates an impactor mitigator graphical object 227 for the visualization system by applying still another modeling rule 240. In one or more embodiments, this modeling rule 240 comprises causing the impactor mitigator to have a certain color corresponding to the type of impactor it mitigates. Illustrating by example, if the type of impactor that the impactor mitigator mitigates is a skill set impactor, which was illustratively colored red in the example above, in one or more embodiments the impactor mitigator graphical object 227 will be red as well. By contrast, if another type of impactor is an external threat impactor, which was blue in the example above, in one or more embodiments impactor mitigator graphical object 227 mitigating this impactor will be blue as well.

In one or more embodiments, the entity visualization renderer 224 generates an impactor mitigator graphical object 227 for the visualization system by applying still another modeling rule 240 causing the impactor mitigator graphical object 227 to have a predefined height. In one or more embodiments, the predefined height is a magnitude of mitigation the impactor mitigator can provide for any one single impactor. Illustrating by example, if an impactor mitigator has a single impactor mitigation magnitude of ten million units, this means that the impactor mitigator could mitigate an impactor having a magnitude of ten million units or less, but would only be able to mitigate two thirds of an impactor having a magnitude of fifteen million units upon that impactor impacting the impactor mitigator. Accordingly, in one or more embodiments the entity visualization renderer 224 generates an impactor mitigator graphical object 227 for the visualization system by causing the impactor mitigator graphical object 227 to have a predefined height defined by a magnitude of mitigation the impactor mitigator can per single instance of impactor interaction.

In one or more embodiments, the entity visualization renderer 224 generates an impactor mitigator graphical object 227 for the visualization system by applying yet another modeling rule 240 causing the impactor mitigator graphical object 227 to have a predefined depth. In one or more embodiments, the predefined depth is a magnitude of mitigation the impactor mitigator can provide prior to depletion. Illustrating by example, if an impactor mitigator has a depletion mitigation magnitude of ten million units, this means that the impactor mitigator could mitigate five impactors having magnitudes of two million units, two impactors having magnitudes of five million units, one impactor having a magnitude of ten million, or two thirds of an impactor having a magnitude of fifteen million units before being depleted. Accordingly, in one or more embodiments the entity visualization renderer 224 generates an impactor mitigator graphical object 227 for the visualization system by causing the impactor mitigator graphical object 227 to have a predefined depth defined by a magnitude of mitigation the impactor mitigator can provide prior to depletion.

In one or more embodiments, the entity visualization renderer 224 generates an impactor mitigator graphical object 227 for the visualization system by applying still another modeling rule 240 causing the impactor mitigator graphical object 227 to have a predefined gap between a base of the entity type graphical object 226 and the base of the impactor mitigator graphical object 227. In one or more embodiments, this predefined gap represents a threshold below which the impactor mitigator will be ineffective. Illustrating by example, for an impactor mitigator graphical object 227 having a height corresponding to one million units, and a depth corresponding to three million units prior to depletion, is some instances this robust impactor mitigator may be inefficient at mitigating impactors under a predefined threshold, such as thirty thousand units. Where the impactor mitigator graphical object 227 is so configured, the gap between base of the entity type graphical object 226 and the base of the impactor mitigator graphical object 227 can visually identify this predefined threshold.

It should be noted that the modeling rules 240 with which the sample presentation visualization data generation engine 222 can generate impactor graphical objects 223 from the visualization impactor data set 221 and/or the entity visualization renderer 224 can generate an entity type graphical object 226 and/or one or more impactor mitigator graphical objects 227 for the visualization system in accordance with one or more embodiments of the disclosure. Numerous others will be obvious to those of ordinary skill in the art having the benefit of this disclosure.

In one or more embodiments, once the sample presentation visualization data generation engine 222 generates impactor graphical objects 223 from the visualization impactor data set 221 and the entity visualization renderer 224 generates an entity type graphical object 226 and/or one or more impactor mitigator graphical objects 227 for the visualization system, an animation rule application engine 244 then applies one or more animation rules 241 to generate a visualization comprising the impactor graphical objects 223, the entity type graphical object 226, and/or the one or more impactor mitigator graphical objects 227.

As noted above, embodiments of the disclosure contemplate that the human mind can more readily understand and process complex concepts such as statistical analyses, risk, loss, and capital exposure through visualization. Accordingly, in one or more embodiments the animation rule application engine 244 applies one or more animation rules 241 to the impactor graphical objects 223, the entity type graphical object 226, and/or the one or more impactor mitigator graphical objects 227 to generate animates, visual representations of these graphical objects that can be simply presented on a display. This is in contrast to the prior art presentation of underlying numerical data, statistical functions, probability distributions, and other information, which can sometimes be as tedious to read as a lengthy patent application.

Advantageously, in one or more embodiments the animation rule application engine 244 generates animations using the impactor graphical objects 223, the entity type graphical object 226, and/or the one or more impactor mitigator graphical objects 227 that make all of the concepts described above with reference to the rules employed by the sample rule set application engine 215, the modeling rules 240, and other rules simple, quick, and easy to see, understand, and visualize. Moreover, in one or more embodiments the animation moves not as a function of time, but as a function of confidence level to intuitively express the results of impactor occurrences upon an entity structure for a given impactor mitigator strategy associated with that entity structure. This animated interaction of impactor graphical objects 223, the entity type graphical object 226, and/or the one or more impactor mitigator graphical objects 227 intuitively illustrates which impactor graphical objects 223 are mitigated by the one or more impactor mitigator graphical objects 227 and which impactor graphical objects 223 adversely impact the entity type graphical object 226, all as a function of confidence level instead of time.

In one or more embodiments, the animation rule application engine 244 applies one or more animation rules 241 to generate a visualization by initially causing only the impactor graphical objects 223 to be presented in the visualization. In one or more embodiments, these are presented in a radial pattern, with the impactor graphical objects 223 becoming denser and denser toward the center of the radial pattern. One example of this will be shown and described below with reference to FIG. 15.

In one or more embodiments, the animation rule application engine 244 then applies another animation rule 241 to generate a visualization by introducing the entity type graphical object 226 and/or the one or more impactor mitigator graphical objects 227. In one or more embodiments, the animation rule application engine 244 does this by presenting only the entity type graphical object 226 and/or the one or more impactor mitigator graphical objects 227, with no the impactor graphical objects 223 presented. This allows a viewer to examine and inspect the entity type graphical object 226 and/or the one or more impactor mitigator graphical objects 227 initially without visual interference from the impactor graphical objects 223.

In one or more embodiments, the animation rule application engine 244 embeds animation rules 241 allowing the entity type graphical object 226 and/or the one or more impactor mitigator graphical objects 227 to be manipulated, such as panned or spun between a side elevation view, a top plan view, and numerous other perspective views therebetween. Advantageously, this allows a viewer interacting with the visualization at a terminal device 102,103,104,105 to "spin around" or "flip around" the entity type graphical object 226 and/or the one or more impactor mitigator graphical objects 227 for closer inspection.

In one or more embodiments, the animation rule application engine 244 then applies another animation rule 241 causing the impactor graphical objects 223 to be introduced in an animated fashion about and encircling the entity type graphical object 226 and/or the one or more impactor mitigator graphical objects 227. In one or more embodiments, these animation rules cause the impactor graphical objects 223 to rotate around, and impact, the entity type graphical object 226 and/or the one or more impactor mitigator graphical objects 227 as a function of confidence level, with that confidence level being represented beneath the animation alongside user actuation targets that cause the animation to start, stop, fast forward, and pause.

In one or more embodiments, the animation proceeds like a temporal video. However, events in the animation do not occur as a function of time. They instead occur as a function of confidence levels representing actuarial intervals representing the likelihood of impactor graphical objects 223 having greater magnitudes impacting the entity type graphical object 226 and/or the one or more impactor mitigator graphical objects 227. When applied to a visualization or animation, in one or more embodiments the confidence level defines a probabilistic threshold that the impactor magnitude of all subsequent impactor graphical objects 223 interacting with the one or both of the entity type graphical object 226 or the one or more impactor mitigator graphical objects 227 will be below a predefined impactor magnitude threshold. Said differently, in one or more embodiments the confidence level defines a probabilistic threshold that only impactor graphical objects 223 having an impactor magnitude below a predefined magnitude threshold will interact with the one or both of the entity type graphical object 226 or the one or more impactor mitigator graphical objects 227.

Accordingly, the confidence level can be used to define a confidence level index for animating the impactor graphical objects 223 in one or more embodiments, as the confidence level determines when, and which, impactor graphical objects 223 will interact with one or both of the entity type graphical object 226 or the one or more impactor mitigator graphical objects 227. In effect, during the visualization, as confidence level increases, the magnitudes associated with the impactor graphical objects 223 that interact and affect the entity type graphical object 226 and/or the one or more impactor mitigator graphical objects 227 become greater and greater. Integrated adverse effects of the impactor graphical objects 223 interacting and affecting the entity type graphical object 226 and/or the one or more impactor mitigator graphical objects 227 can be presented in a tabular format alongside the animation in one or more embodiments.

In one or more embodiments, the animation rule application engine 244 then applies another animation rule 241 causing the impactor graphical objects 223 to have metadata associated therewith. In one or more embodiments, this metadata comprises entity specific information such as predefined class code 234, predefined class code 234 and severity type 233, and/or predefined class code 234, severity type 233, and other entity identifying factors, whether applied by the sample presentation visualization data generation engine 222 when correlating the visualization impactor data set 221 with a given entity structure, or initially selected using entity identifying information, e.g., where the impactors of the visualization impactor data set 221 were initially selected as a function of a number of physicians, specialty type, number of procedures, number of beds, number of outpatient visits, and so forth.

Advantageously, the inclusion of this metadata allows a user to perform a terminal device interaction event 211 interacting with the controls of the animation to pause the animation and interact with an impactor graphical object 223. In one or more embodiments, doing so reveals a graphical presentation of the description of the impactor graphical object 223, e.g., it's type, severity type, magnitude, probability of occurrence, and other information. Illustrating by example, if the impactor is a fire occurrence having a magnitude of twenty-five million units and occurring at the ninety-five percent confidence level, a terminal device interaction event 211 interacting with this impactor graphical object 223 would reveal the fact that it is a fire with this magnitude on the display.

In one or more embodiments, the animation proceeds until the 99.9 percent confidence level is reached. In one or more embodiments, once this occurs the initial animation generated by the animation rule application engine 244 stops. However, in one or more embodiments the visualization does not.

In one or more embodiments, an impactor mitigator optimization engine 228 then selects an optimized impactor mitigator strategy for the entity structure that mitigates affects of one or more of the impactor graphical objects 223 interacting with the entity type graphical object 226 in the prior animation. In one or more embodiments, the impactor mitigator optimization engine 228 selects the optimized impactor mitigator strategy in response to terminal device interaction events 211. In one or more embodiments, these terminal device interaction events 211 comprise user input occurring at a terminal device 102,103,104,105 during, or after, the initial animation, and which are configured as computer-readable signal media 209 transmitted from at least one of the one or more terminal devices 102,103,104, 105. In one or more embodiments, the terminal device interaction events 211 comprise user interactions with user interface devices occurring at terminal devices 102,103,104, 105.

In one or more embodiments, the terminal device interaction events 211 may indicate types of impactors considered to be problematic during the first animation. In other embodiments, the terminal device interaction events 211 comprise options for adding, removing, increasing, or decreasing impactor mitigator specifications, including the type of impactor an existing or desired impactor mitigator mitigates, the magnitude of mitigation the impactor mitigator can provide for any one single impactor, the magnitude of mitigation the impactor mitigator can provide prior to depletion, and/or the threshold below which the impactor mitigator will be ineffective. These terminal device interaction events 211 are in response to insufficiencies of these metrics occurring during the initial animation in one or more embodiments.

Upon receipt of the terminal device interaction events 211 in the form of computer-readable signal media 209, in one or more embodiments the impactor mitigator optimization engine 228 can extract requests for changes in the type of impactor an existing or desired impactor mitigator mitigates, the magnitude of mitigation the impactor mitigator can provide for any one single impactor, the magnitude of mitigation the impactor mitigator can provide prior to depletion, and/or the threshold below which the impactor mitigator will be ineffective from the computer-readable signal media 209 received from the terminal device event detector 210. In one or more embodiments, the impactor mitigator optimization engine 228 can then store this information in one or more of the one or more memory devices 204, the indexed entity data structure 109, or combinations thereof.

In one or more embodiments, the impactor mitigator optimization engine 228 then selects optimized impactor mitigator implementations that satisfy the requests for changes in the type of impactor an existing or desired impactor mitigator mitigates, the magnitude of mitigation the impactor mitigator can provide for any one single impactor, the magnitude of mitigation the impactor mitigator can provide prior to depletion, and/or the threshold below which the impactor mitigator will be ineffective. Once this occurs, this information is delivered to the sample presentation visualization data generation engine 222. In one or more embodiments, the sample presentation visualization data generation engine 222 can generate optimized impactor mitigator graphical objects 242 for the optimized impactor mitigator implementations generated by the impactor mitigator optimization engine 228.

In one or more embodiments, the optimized impactor mitigator graphical objects 242 are then delivered to the animation rule application engine 244. The animation rule application engine 244 then once again applies one or more animation rules 241 to generate a second visualization in one or more embodiments.

In one or more embodiments, the animation rule application engine 244 applies an animation rule 241 by again introducing the entity type graphical object 226, along with the optimized impactor mitigator graphical objects 242. In one or more embodiments, the animation rule application engine 244 does this by presenting only the entity type graphical object 226 and the optimized impactor mitigator graphical objects 242, with no the impactor graphical objects 223 being presented. As described above, this allows a viewer to examine and inspect the optimized impactor mitigator graphical objects 242, including how they differ from the previously presented one or more impactor mitigator graphical objects 227, without visual interference from the impactor graphical objects 223.

In one or more embodiments, the animation rule application engine 244 embeds animation rules 241 allowing the entity type graphical object 226 and the optimized impactor mitigator graphical objects 242 to be manipulated, such as panned or spun between a side elevation view, a top plan view, and numerous other perspective views therebetween. Advantageously, this allows a viewer interacting with the visualization at a terminal device 102,103,104,105 to "spin around" or "flip around" the entity type graphical object 226 and the optimized impactor mitigator graphical objects 242 for closer inspection.

In one or more embodiments, the animation rule application engine 244 then applies another animation rule 241 causing the impactor graphical objects 223 to be introduced in an animated fashion about and encircling the entity type graphical object 226 and the optimized impactor mitigator graphical objects 242. In one or more embodiments, rather than these animation rules causing the impactor graphical objects 223 to rotate around, and impact, the entity type graphical object 226 and the optimized impactor mitigator graphical objects 242 as in the first animation, in one or more embodiments in this animation the impactor graphical objects 223 are aligned with, and fly directly toward the entity type graphical object 226 and the optimized impactor mitigator graphical objects 242.

While the impactor graphical objects 223 could rotate around, and impact, the entity type graphical object 226 and the optimized impactor mitigator graphical objects 242 as previously described, in one or more embodiments they are aligned with, and fly directly toward the entity type graphical object 226 and the optimized impactor mitigator graphical objects 242 to illustrate a more orderly sorting of the impactor graphical objects 223, thereby depicting that the optimized impactor mitigator graphical objects 242 were intentionally selected in response to the terminal device interaction events 211 received in the form of computer-readable signal media 209 defining requests for changes in the type of impactor an existing or desired impactor mitigator mitigates, the magnitude of mitigation the impactor mitigator can provide for any one single impactor, the magnitude of mitigation the impactor mitigator can provide prior to depletion, and/or the threshold below which the impactor mitigator will be ineffective. Thus, instead of a chaotic first animation, this orderly "direct attack" second animation presents a calming visualization in which the optimized impactor mitigator graphical objects 242 protect the entity type graphical object 226. Other arrangements for the impactor graphical objects 223 will be obvious to those of ordinary skill in the art having the benefit of this disclosure.

Once again, the animation rule application engine 244 then applies another animation rule 241 causing the second animation to proceed, not as a function of time, but instead as a function of confidence level. In one or more embodiments, the animation proceeds until the 99.9 percent confidence level is reached. In one or more embodiments, once this occurs the initial animation generated by the animation rule application engine 244 stops. However, in one or more embodiments the visualization does not.

Thus, in one or more embodiments the animation rule application engine 244 repeats the generation of the visualization, again as a function of confidence level, to illustrate a comparison between the one or more impactor mitigator graphical objects 227 presented in the initial animation and the optimized impactor mitigator graphical objects 242. In one or more embodiments, this second animation serves to intuitively express the results of impactor impact when the optimized impactor mitigator graphical objects 242 represent an improved impactor mitigator implementation over that presented in the first animation.

Illustrating by example, the impactor mitigator optimization engine 228 may select an impactor mitigator implementation as a function of the impactor occurrences a particular entity structure is likely to experience across a given time period at a particular confidence level, such as eighty-five percent. This animated interaction of the impactor graphical objects 223 interacting and affecting the entity type graphical object 226 and the optimized impactor mitigator graphical objects 242 intuitively illustrates the adverse impact reduction afforded by the optimized impactor mitigator graphical objects 242 compared to the one or more impactor mitigator graphical objects 227 due to the increased mitigation offered by the optimized impactor mitigator graphical objects 242.

Once the animation rules 241 are applied by the animation rule application engine 244, in one or more embodiments a terminal rendering signal generator 229 generates computer-readable graphic object signals 243 suitable for rendering the resulting animations on one or more of the terminal devices 102,103,104,105. Thus, in one or more embodiments the impactor graphical objects 223, entity type graphical object 226, the one or more impactor mitigator graphical objects 227 of the first animation, and the optimized impactor mitigator graphical objects 242, along with any required animation rules 241, can be transmitted to one or more of the terminal devices 102,103,104,105 as computer-readable graphic object signals 243 so that the visualization generated by the visualization system 100 can be rendered on the output of the one or more of the terminal devices 102,103, 104,105.

In accordance with the illustrative embodiment of FIG. 2 illustrated and described above, the various entity structures, impactors, and impactor mitigators used in the visualization systems configured in accordance with embodiments of the disclosure, as well as related systems and methods, solve the technical problem of allowing viewers to intuitively understand complex statistical and probabilistic models representing the adverse impacts of impactors of varying magnitudes for a given impactor mitigator implementation. Moreover, as will be illustrated in more detail with reference to FIGS. 14-29 below, these times, e.g., the impactor graphical objects 223, entity type graphical object 226, the one or more impactor mitigator graphical objects 227 of the first animation, and the optimized impactor mitigator graphical objects 242 may each be represented as three-dimensional virtual objects presented on one or more terminal devices 102,103,104,105.

In one or more embodiments, a combination of the sample presentation visualization data generation engine 222, the entity visualization renderer, the and the animation rule application engine 244, working in tandem with the terminal rendering signal generator 229, generate modeled three-dimensional objects that can be rendered on a computing device. In one or more embodiments, these three-dimensional virtual models may be manipulated when rendered on a terminal device 102,103,104,105. Illustrating by example, in one or more embodiments the three-dimensional virtual models may be rotated, spun, tilted, viewed in plan, elevation, or isometric views. Additionally, the animations associated with the three-dimensional virtual models can be started, paused, and stopped at various confidence levels as desired by a user. Advantageously, embodiments of the disclosure accurately, easily, and intuitively represent.

Figure 3:
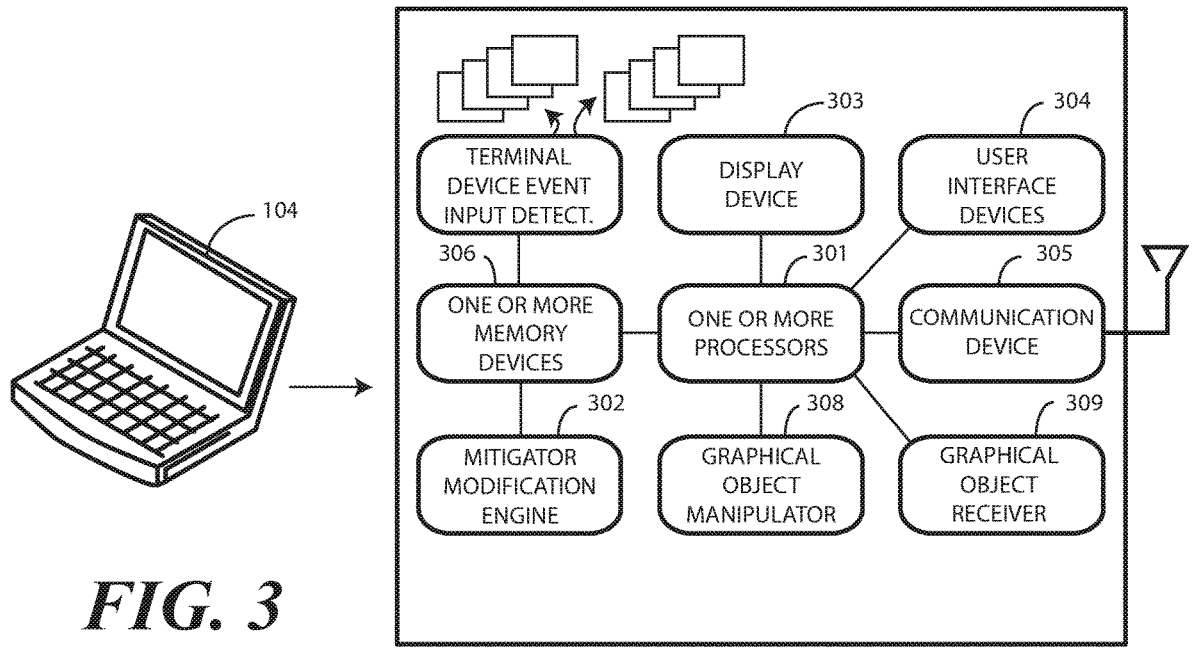
FIG. 3 illustrates one explanatory terminal device in accordance with one or more embodiments of the disclosure.

Turning now to FIG. 3, illustrated therein is one explanatory terminal device 104. In accordance with various embodiments of the disclosure, the explanatory terminal device 104, which is shown as a laptop computer in the illustrative embodiment of FIG. 3, can alternatively be another electronic device capable of wired and/or wireless communications and execution of executable code by one or more processors. Examples of other terminal devices include smartphones, tablet computers, desktop computers, or other electronic devices. These examples of electronic devices are illustrative only, as others suitable for use with embodiments of the disclosure will be obvious to those of ordinary skill in the art having the benefit of this disclosure. For example, another terminal device could comprise a wearable device, e.g., a smart watch, a virtual reality device, e.g., a headset, an augmented reality device, or a set top box.

It is to be understood that FIG. 3 is provided for illustrative purposes only and for illustrating components of one explanatory terminal device 104 configured in accordance with one or more embodiments of the disclosure. Accordingly, the components shown in FIG. 3 are not intended to be complete schematic diagrams of the various components required for a particular terminal device 104, as other terminal devices configured in accordance with embodiments of the disclosure may include various other components not shown in FIG. 3. Alternatively, other terminal devices configured in accordance with embodiments of the disclosure or may include a combination of two or more components or a division of a particular component into two or more separate components, and still be within the scope of the present disclosure.

As described above, in one or more embodiments the terminal device 104 can be responsible for performing one or more of the methods, operations, steps, functions, or procedures described above with reference to FIGS. 1-2. These include connecting to a network (106), presenting information, such as graphical user interfaces, graphical objects, entity models, impactor models, and application files on the display 303 or other user interface device 304, receiving terminal device interaction events (211), storing information in the one or more memory devices 302, and other operations.

In one or more embodiments, the terminal device 104 includes one or more processors 301, one or more memory devices 302, a display 303, one or more user interface devices 304, e.g., keyboards, a mouse, audio input devices, audio output devices, and alternate visual output devices, and a communication device 305. These components can be operatively coupled together such that, for example, the one or more processors 301 are operable with the one or more memory devices 302, the display 303, the one or more user interface devices 304, and or the communication device 305 in one or more embodiments.

The one or more processors 301 can include a microprocessor, a group of processing components, one or more ASICs, programmable logic, or other type of processing device. The one or more processors 301 can be configured to process and execute executable software code to perform the various functions of the terminal device 104.

The one or more memory devices 302 can optionally store the executable software code used by the one or more processors 301 in carrying out the operations of the visualization system. The one or more memory devices 302 may include either or both of static and dynamic memory components. The one or more memory devices 302 can store both embedded software code and user data. The software code can embody program instructions and methods to operate the various functions of the terminal device, and also to execute software or firmware applications and modules such as the impactor mitigator modification engine 307, the graphical object manipulator 308, and the graphical object receiver 309. The one or more processors 301 can execute this software or firmware, and/or interact with modules, to provide terminal device 104 functionality.

Moreover, the one or more memory devices 302 may include a terminal device event input store 306 for storing information received in the form of terminal device events, including terminal device events such as those identifying entity structure characteristics, those manipulating animations and/or impactor graphical objects (223), entity type graphical objects (226), the one or more impactor mitigator graphical objects (227), or optimized impactor mitigator graphical objects (242). The terminal device event input store 306 may also store information received in the form of terminal device events such as those requesting requests for changes in the type of impactor an existing or desired impactor mitigator mitigates, the magnitude of mitigation the impactor mitigator can provide for any one single impactor, the magnitude of mitigation the impactor mitigator can provide prior to depletion, and/or the threshold below which the impactor mitigator will be ineffective, as previously described.

In one or more embodiments, the one or more user interface devices 304 enable a user to interact with the terminal device 104. In one or more embodiments, the one or more user interface devices 304 allow a user to indicate preferences and/or interact with visualizations presented on the display 303. In one or more embodiments, the one or more user interface devices 304 allow a user to manipulate, for example, graphical objects included with animations and/or visualizations by zooming in, zooming out, rotating the graphical objects, shifting the graphical objects, spinning the graphical objects, and so forth.

In one or more embodiments, the communication device 305 comprises any of a number of wired or wireless technologies for communication. Examples of these technologies include wired plain old telephone service (POTS) technologies, wired Ethernet technologies such as those configured in accordance with the IEEE 802 networking standards, peer-to-peer or ad hoc communications, frequency modulated communication, amplitude modulated communication, or IEEE 802.11 wireless communication. Other forms of communication technologies suitable for inclusion with the communication device 305 will be obvious to those having the benefit of this disclosure. The communication device 305 can include wired or wireless communication circuitry, one of a receiver, a transmitter, or transceiver. Where wireless, the communication device 305 can include one or more antennas.

In one or more embodiments, the graphical object receiver 309 is operable to communicate across a network with a terminal rendering signal generator (229) of a visualization system (100). In one or more embodiments, when the terminal rendering signal generator (229) generates computer-readable graphic object signals (243) suitable for rendering one or more graphical object presentations or animations the display 303 or other user interface device 304, these computer-readable graphic object signals (243) are received by the graphical object receiver 309. In one or more embodiments, these computer-readable graphic object signals (243) can be stored by the one or more processors 301 or the graphical object receiver 309 in the one or more memory devices 302 for concurrent, or subsequent, presentation on the display 303 or other user interface device 304.

In one or more embodiments, the graphical object receiver 309 receives impactor graphical objects (223), entity type graphical objects (226), one or more impactor mitigator graphical objects (227), and one or more optimized impactor mitigator graphical objects (242), along with any required animation rules (241), as computer-readable graphic object signals (243) sent by the terminal rendering signal generator (229). This allows the visualization generated by the visualization system (100) to be presented on the display 303 or other user interface device 304 of the terminal device 104.

In one or more embodiments, the graphical object manipulator 308 allows a user to interact with the impactor graphical objects (223), the entity type graphical objects (226), the one or more impactor mitigator graphical objects (227), and the one or more optimized impactor mitigator graphical objects (242), in accordance with any animation rules (241) applied by an animation rule application engine (244). Illustrating by example, in one or more embodiments the graphical object manipulator 308 receives terminal device interaction events (211) and employs them to manipulate various graphical objects presented in an animation or other visualization. For instance, the graphical object manipulator 308, in response to terminal device interaction events (211), can cause graphical objects to be manipulated, such as panned or spun between a side elevation view, a top plan view, and numerous other perspective views therebetween. Advantageously, this allows a viewer interacting with the visualization using the user interface devices 304 to "spin around" or "flip around" the visualization graphical objects for closer inspection or for other reasons.

An impactor mitigator modification engine 307 allows a user to employ the various user interface devices 304 to deliver terminal device interaction events (211) to the impactor mitigator optimization engine (228) of a visualization system (100) by extracting information from the terminal device interaction events (211) used in modifying, changing, or optimizing an impactor mitigator strategy for the entity structure that mitigates effects of impactors. For example, the impactor mitigator modification engine 307 may extract from terminal device interaction events (211) user input occurring at the terminal device 104 during, or after, the animations resulting from the graphical object receiver 309 receiving impactor graphical objects (223), entity type graphical objects (226), one or more impactor mitigator graphical objects (227), and one or more optimized impactor mitigator graphical objects (242), along with any required animation rules (241), as computer-readable graphic object signals (243) sent by the terminal rendering signal generator (229).

These user inputs can define types of impactors considered to be problematic and/or options or requests for adding, removing, increasing, or decreasing impactor mitigator specifications, including the type of impactor an existing or desired impactor mitigator mitigates, the magnitude of mitigation the impactor mitigator can provide for any one single impactor, the magnitude of mitigation the impactor mitigator can provide prior to depletion, and/or the threshold below which the impactor mitigator will be ineffective, and so forth. In one or more embodiments, the impactor mitigator modification engine 307 can cause the communication device 305 to transmit this information in the form of computer-readable signal media (209) to the impactor mitigator optimization engine (228). In one or more embodiments, the impactor mitigator optimization engine (228) then select optimized impactor mitigator implementations that satisfy the requests for changes in the type of impactor an existing or desired impactor mitigator mitigates, the magnitude of mitigation the impactor mitigator can provide for any one single impactor, the magnitude of mitigation the impactor mitigator can provide prior to depletion, and/or the threshold below which the impactor mitigator will be ineffective, as previously described.

In one or more embodiments, the one or more processors 301 may cause visualizations, which can be combined image visualizations including one or more of the impactor graphical objects (223), entity type graphical objects (226), one or more impactor mitigator graphical objects (227), and one or more optimized impactor mitigator graphical objects (242), along with any required animation rules (241), on the display 303. In one or more embodiments, a user may interact with the user interface devices 304 to adjust the resulting image visualization by causing the rendering geometry to change, such as by spinning, flipping, or rotating the various objects of the visualization.

Figure 4:
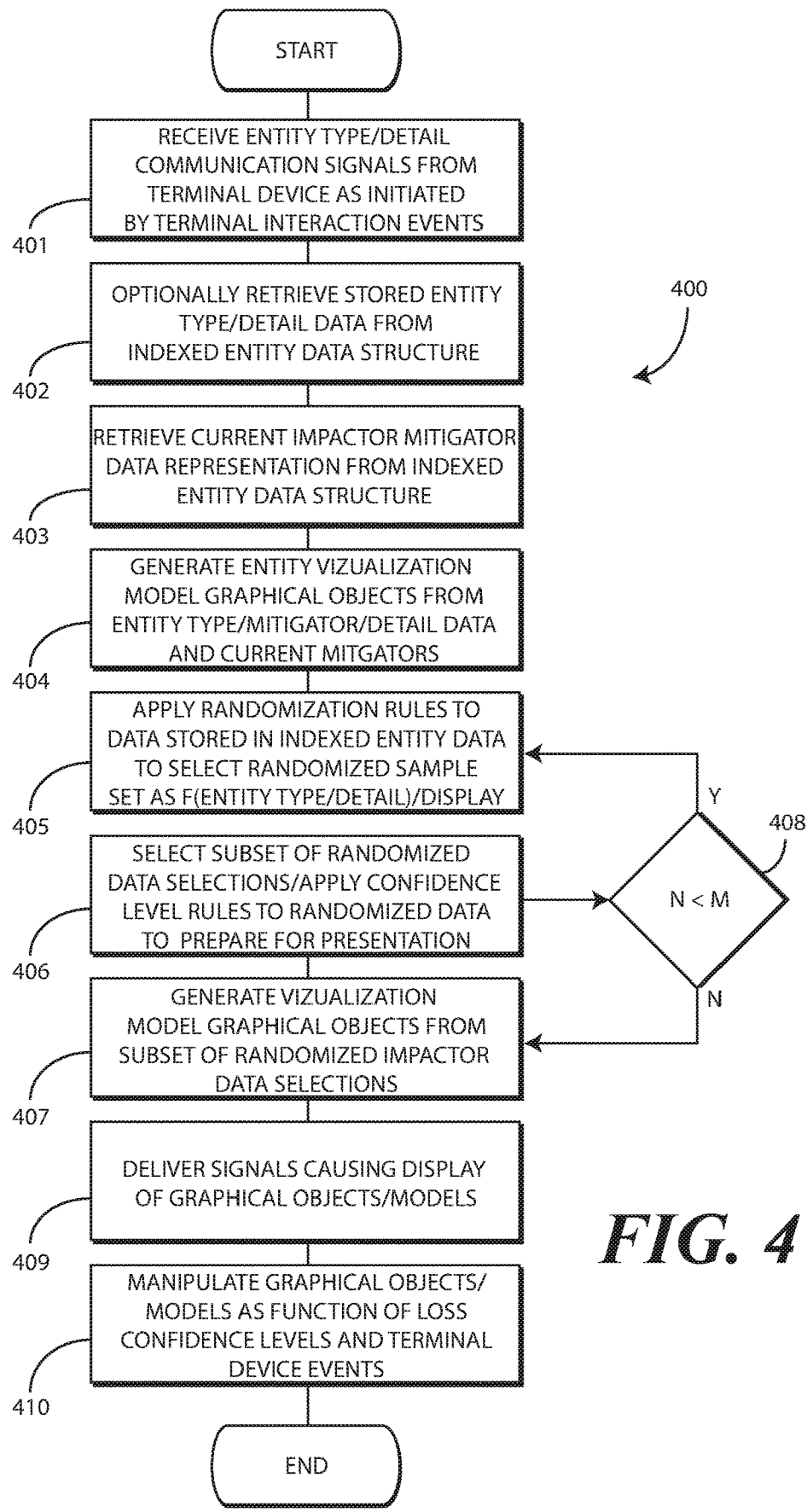
FIG. 4 illustrates one explanatory method in accordance with one or more embodiments of the disclosure.

Turning now to FIG. 4, illustrated therein is one explanatory method 400 in accordance with one or more embodiments of the disclosure. Many of the steps of the method 400 have been described above with reference to FIG. 2 and the operation of the visualization system (100) illustrated therein. However, some additional details are provided in the discussion of FIG. 4 and subsequent figures. It should be noted that where such additional details are provided, it will be obvious to those of ordinary skill in the art having the benefit of this disclosure that those additional details can be implemented in the operation of the visualization system (100) of FIG. 2. Moreover, details described above that are omitted from the discussion of FIG. 4 and subsequent figures are done so in the interest of brevity, and could optionally be included with, or omitted from, the embodiments described below.

Beginning at step 401, the method 400 receives entity-defining information from a terminal device. In one or more embodiments, this information is used to generate an entity type visualization object.

In one or more embodiments the entity-defining information is received at step 401 in the form of terminal device interaction events. In one or more embodiments, these terminal device interaction events can comprise user input occurring at a terminal device. The terminal device can then convert the user input into computer-readable signal media, which is received at step 401. A user can optionally be prompted, for example, to deliver the user input at the terminal device. The terminal device may prompt a user for information related to entity structure in one or more embodiments.

In other embodiments, rather than receiving the information at step 401 from computer-readable signal media from terminal devices, step 402 can comprise retrieving information from an indexed entity data structure or other persistent storage devices or memory devices. Embodiments of the disclosure contemplate that the system will frequently have entity-defining information stored in one or more memory devices or other persistent storage devices such as an indexed entity data structure. Where this is the case, rather than requiring user input to deliver this information, step 402 can comprise the information being retrieved from the one or more memory devices or other persistent storage devices.

Of course, a combination of retrieval at step 402 and receipt at step 401 can be used. In situations where some entity-defining information is stored in an indexed entity data structure or other persistent storage devices or memory devices, but not all entity-defining information, step 402 can comprise retrieving some or all of the stored entity-defining information from the one or more memory devices or other persistent storage devices. Step 401 can then prompt the terminal device for other entity-defining information, which can then be received in the form of computer-readable signal media, as previously described.

Figure 6:
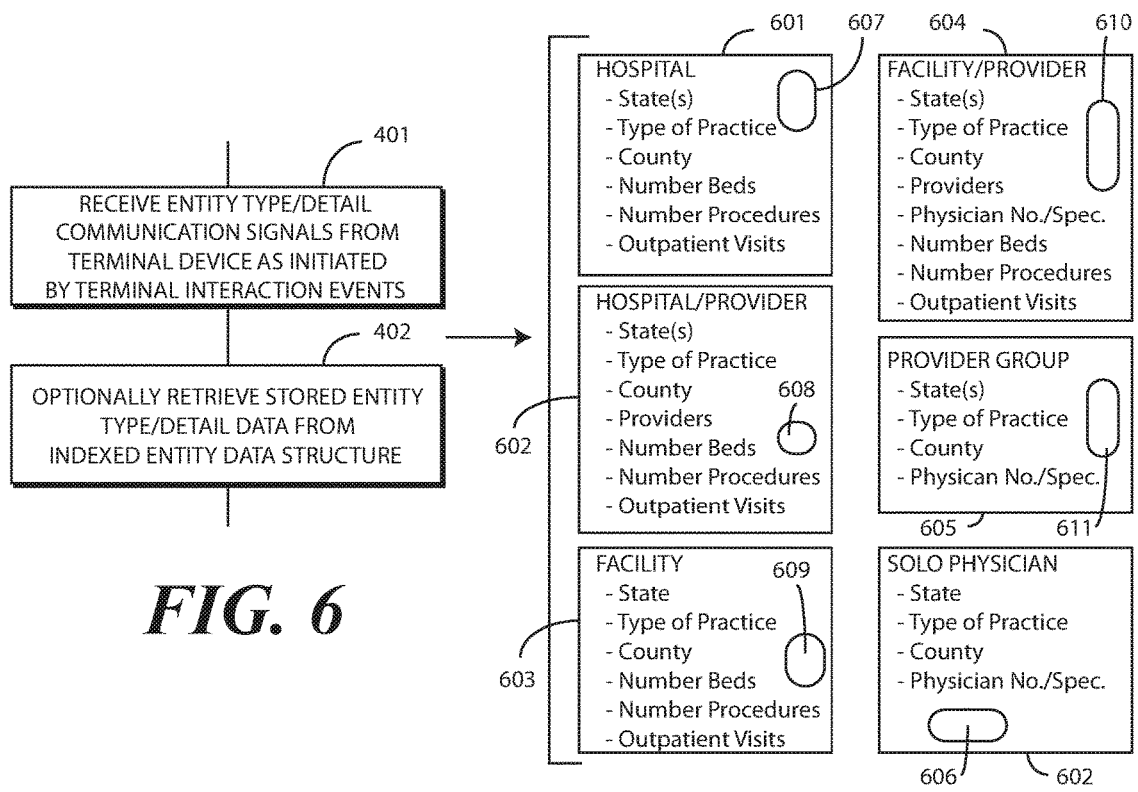
FIG. 6 illustrates explanatory data, conveyed as terminal interaction event communication signals transmitted between terminal devices and server complexes, or alternatively retrieved from an indexed entity data structure, in accordance with one or more embodiments of the disclosure.

Turning briefly to FIG. 6, illustrated therein is some illustrative information that can be received at step 401 and/or retrieved at step 402. It should be noted that the examples in FIG. 6 relate to medical practices. However, those of ordinary skill in the art having the benefit of this disclosure will recognize that if the entity were of another type, e.g., a machine, article of manufacture, or composition of matter, the information may be different from that shown in FIG. 6. Accordingly, FIG. 6 is intended to be illustrative only, as other examples of information that can be received at step 401 and/or retrieved at step 402 will be obvious to those of ordinary skill in the art having the benefit of this disclosure.

Continuing the medical practice example, in FIG. 6 information relating to six types of entities is shown. In this illustrative embodiment, a first type of entity 601 is a hospital. A second type of entity 602 is a hospital/provider. A third type of entity 603 is a facility. A fourth type of entity 604 is a facility/provider. A fifth type of entity 605 is a provider group. A seventh type of entity 606 is a solo physician.

Examples of information received at step 401 and/or retrieved at step 402 when the entity is the first type of entity 601 include in which states the first type of entity 601 is located, the type of medicine practiced at the first type of entity 601, the county in which the first type of entity 601 is located, the number of procedures performed in the first type of entity 601, and the number of outpatient visits occurring at the first type of entity 601. Examples of information received at step 401 and/or retrieved at step 402 when the entity is the second type of entity 602 include in which states the second type of entity 602 is located, the type of medicine practiced at the second type of entity 602, the county in which the second type of entity 602 is located, the number of providers at the second type of entity 602, the number of beds at the second type of entity 602, the number of procedures performed in the second type of entity 602, and the number of outpatient visits occurring at the second type of entity 602.

Examples of information received at step 401 and/or retrieved at step 402 when the entity is the third type of entity 603 include in which states the third type of entity 603 is located, the type of medicine practiced at the third type of entity 603, the county in which the third type of entity 603 is located, the number of beds at the third type of entity 603, the number of procedures performed in the third type of entity 603, and the number of outpatient visits occurring at the third type of entity 603. Examples of information received at step 401 and/or retrieved at step 402 when the entity is the fourth type of entity 604 include in which states the fourth type of entity 604 is located, the type of medicine practiced at the fourth type of entity 604, the county in which the fourth type of entity 604 is located, the number of providers at the fourth type of entity 604, the number of physicians, and their respective specialty types, practicing at the fourth type of entity 604, the number of beds at the fourth type of entity 604, the number of procedures performed in the fourth type of entity 604, and the number of outpatient visits occurring at the fourth type of entity 604.

Examples of information received at step 401 and/or retrieved at step 402 when the entity is the fifth type of entity 605 include in which states the fifth type of entity 605 is located, the type of medicine practiced at the fifth type of entity 605, the county in which the fifth type of entity 605 is located, and the number of physicians, and their respective specialty types, practicing at the fifth type of entity 605. Examples of information received at step 401 and/or retrieved at step 402 when the entity is the sixth type of entity 606 are largely the same as the fifth type of entity 605, and include in which states the sixth type of entity 606 is located, the type of medicine practiced at the sixth type of entity 606, the county in which the sixth type of entity 606 is located, and the number of physicians, and their respective specialty types, practicing at the sixth type of entity 606.

Other types of information that can be received at step 401 and/or retrieved at step 402 include operational information related to the entity, internal component information of the entity, the number of operations of the entity, the frequency of operations of the entity, and so forth. Still other types of information that can be received at step 401 and/or retrieved at step 402 will be obvious to those of ordinary skill in the art having the benefit of this disclosure.

In one or more embodiments, types of entities can further be pre-classified and arranged into one or more predefined class codes 607,608,609,610,611,612. These class codes 607,608,609,610,611,612 can be received at step 401. Alternatively, they can be assigned at step 401 or step 402 in response to the other information of FIG. 6 that is received at step 401 and/or retrieved at step 402. Where less than all the information shown in FIG. 6 is received at step 401 and/or retrieved at step 402, in one or more embodiments the class codes 607,608,609,610,611,612 can serve as a primary key identifier for each entity type by substituting as a proxy for the missing information.

In one or more embodiments, these class codes 607,608, 609,610,611,612 comprise the classes set forth above with reference to FIG. 2. Accordingly, in one or more embodiments the class codes 607,608,609,610,611,612 comprise class code 1, class code 2, class code 3, class code 4, class code 5, class code 6, class code 7, class code 8, class code 1A, class code 2A, class code 2B, class code 2C, class code 3A, class code 3B, class code 3C, class code 4A, class code 4B, class code 5A, and class code 5B. It should be noted that these class codes 607,608,609,610,611,612 are illustrative only, and serve as one explanatory example of how entity structures can be pre-classified with one or more predefined class codes 607,608,609,610,611,612 for use in visualization systems configured in accordance with embodiments of the disclosure. Other examples of predefined class codes 607, 608,609,610,611,612 for other types of entities will be obvious to those of ordinary skill in the art having the benefit of this disclosure.

In one or more embodiments, as the class codes get higher, the impactors those classes may experience become larger in magnitude. This is why class code serves as a suitable proxy for more detailed entity-defining information in many applications. Illustrating by example, if class code 1 is associated with a dentist performing oral surgery, but class code 6 is associated with a medical professional performing cardiac surgery, one type of impactor, i.e., a medical malpractice claim, may have a larger impact, generally speaking, in class code 6 than in class code 1. This is true because mishaps in cardiac surgery tend to cause more injury than to mishaps in oral surgery, for example.

Turning now back to FIG. 4, at step 403 the method 400 retrieves receives and/or retrieves impactor mitigator information. In one or more embodiments, this information is used to generate an impactor mitigator graphical object.

In one or more embodiments the impactor mitigator information is received at step 403 in the form of terminal device interaction events. For example, a user can deliver user input indicating what impactor mitigators are accessible to the entity, which are in use, the details of how these impactor mitigators function, and so forth. Where so entered, optionally in response to one or more prompts, a terminal device can then convert the user input into computer-readable signal media, which is received at step 403.

In many cases, however, the impactor mitigator information will become retrievable once the entity-defining information is received at step 401 and/or retrieved at step 402. Accordingly, in other embodiments step 403 can comprise retrieving impactor mitigator information corresponding to the entity identified from the entity-defining information received at step 401 and/or retrieved at step 402. In one or more embodiments, this impactor mitigator information can be retrieved from an indexed entity data structure or other persistent storage devices or memory devices. Of course, a combination of retrieval at step 402 and receipt at step 401 can be used, as previously described.

Figure 7:
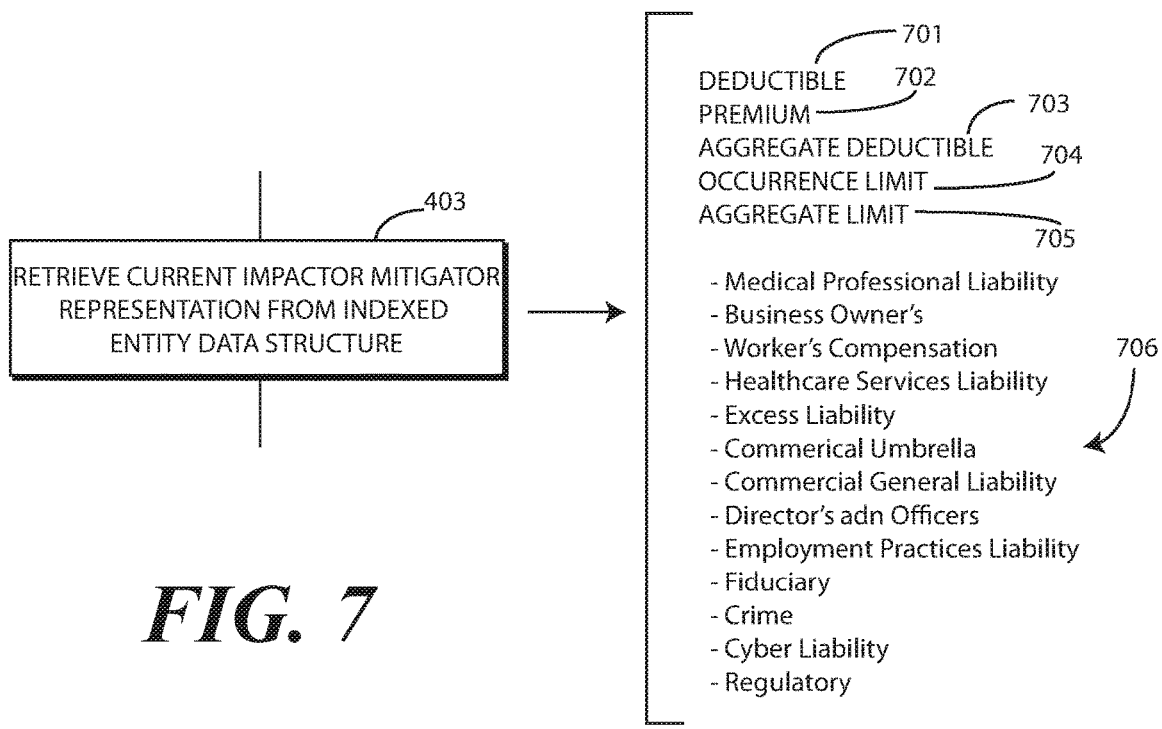
FIG. 7 illustrates additional explanatory data, conveyed as terminal interaction event communication signals transmitted between terminal devices and server complexes, or alternatively retrieved from an indexed entity data structure, in accordance with one or more embodiments of the disclosure.

Turning briefly to FIG. 7, illustrated therein is one explanatory example of impactor mitigator information that can be retrieved or received at step 403. In this illustrative example, the impactor mitigator is an insurance policy. This is a convenient impactor mitigator to use for illustrative purposes because it is easy to understand: if an impactor comprises a claim for money or damages, the impactor mitigator of an insurance policy can mitigate the effect of that mitigator upon an entity by absorbing the claim and paying any amount due, thereby alleviating the entity from having to do the same.

Moreover, using an insurance policy as an impactor mitigator is convenient because information such as type of impactor the impactor mitigator mitigates, the magnitude of mitigation the impactor mitigator can provide for any one single impactor, the magnitude of mitigation the impactor mitigator can provide prior to depletion, and/or the threshold below which the impactor mitigator will be ineffective can all be easily expressed. In one or more embodiments, these data can be policy type, limited indemnity, aggregate protection, and deductible, respectively.

While an insurance policy is one illustrative example of an impactor mitigator, it will be obvious to those of ordinary skill in the art having the benefit of this disclosure that impactor mitigators can take other forms as well. Using a house as an example entity, an impactor mitigator may comprise a coat of paint, a roof, or insulation, each mitigating the impact of weather, pest, and other impactors. If the entity is an organism, an impactor mitigator might be a vaccine, mitigating the impact of a disease. If the entity is a vehicle, the impactor mitigator might be engine oil, mitigating against friction, heat, and mechanical wear. Other examples of impactor mitigators will be obvious to those of ordinary skill in the art having the benefit of this disclosure.

In FIG. 7, various impactor mitigator data is shown. Each can be retrieved and/or received at step 403. These data include type of impactor 706 the impactor mitigator mitigates, the magnitude 704 of mitigation the impactor mitigator can provide for any one single impactor, the magnitude 705 of mitigation the impactor mitigator can provide prior to depletion, and/or the threshold 701 below which the impactor mitigator will be ineffective. The data can also include the cumulative threshold 703 required from the entity when multiple impactors occur with each having a single threshold 701 below which the impactor mitigator will be ineffective.

The cost 702 of the impactor mitigator may also be retrieved and/or received at step 403 as well.

Figure 8:
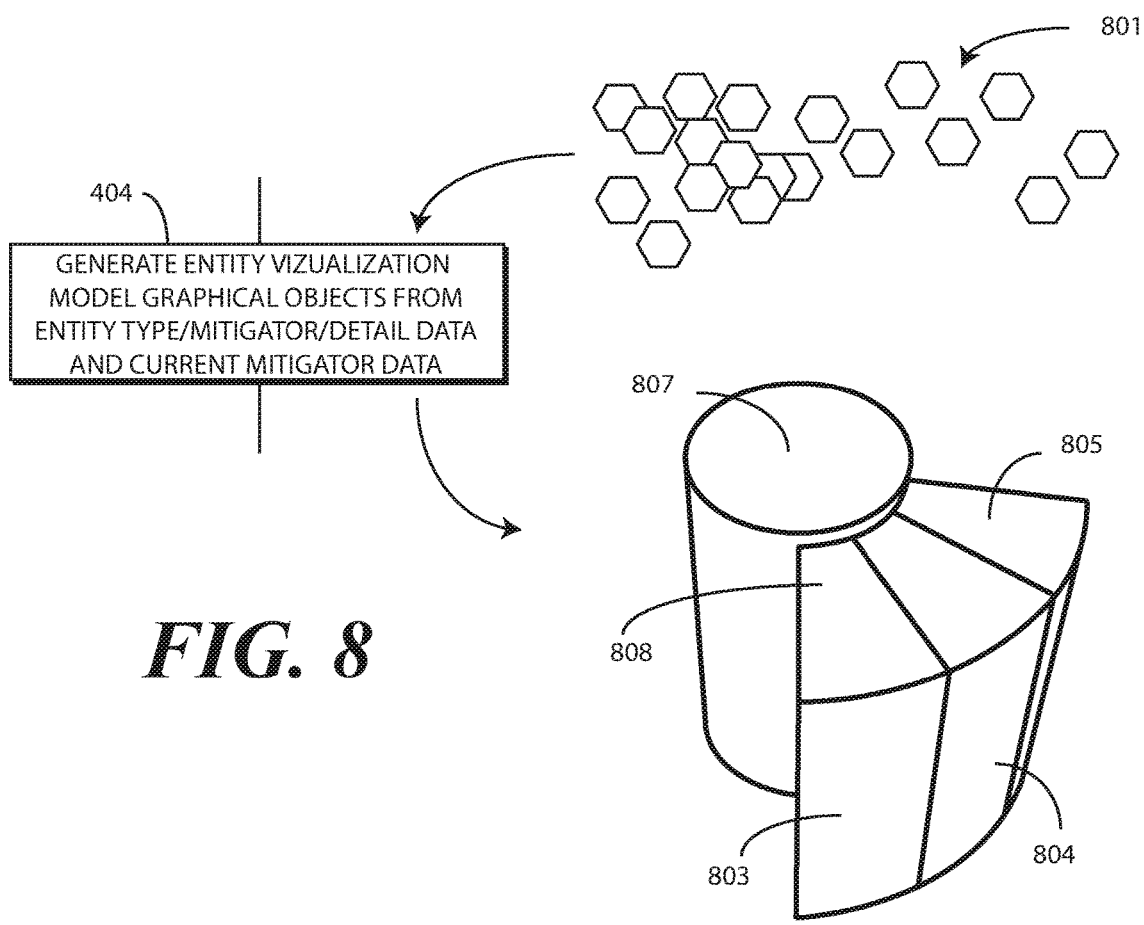
FIG. 8 illustrates one or more methods steps for generating entity visualization graphical models from explanatory data, conveyed as terminal interaction event communication signals transmitted between terminal devices and server complexes, or alternatively retrieved from an indexed entity data structure, in accordance with one or more embodiments of the disclosure.

Turning now back to FIG. 4, at step 404 the method 400 generates an entity type visualization object and one or more impactor mitigator graphical objects from the information received and/or retrieved at steps 401,402,403. Turning briefly to FIG. 8, illustrated therein is one example of how step 404 can occur. Other methods for how step 404 can occur will be obvious to those of ordinary skill in the art having the benefit of this disclosure.

As shown in FIG. 8, the various data 801 received and/or retrieved at steps (401,402,403) of FIG. 4 is transformed into an entity type graphical object 802 and one or more impactor mitigator graphical objects 803,804,805. Each of the entity type graphical object 802 and one or more impactor mitigator graphical objects 803,804,805 shown in FIG. 8 comprises a graphical object suitable for presentation on an output of a terminal device in one or more embodiments.

In one or more embodiments, step 404 generates the entity type graphical object 802 for the visualization system by applying one or more modeling rules 806. In the illustrative example of FIG. 8, step 404 applies a first modeling rule to cause the entity type graphical object 802 to be rendered as a geometric graphical object. In this example, the geometric graphical object comprises a cylinder. While a white cylinder is one geometric object suitable for representing the entity type graphical object 802, it is illustrative only. Numerous others will be obvious to those of ordinary skill in the art having the benefit of this disclosure. For example, in another embodiment the entity type graphical object 802 can have a rectangular cross section. In another embodiment, the entity type graphical object 802 can have a multi-faceted cross section, with each face corresponding to an impactor mitigator employed by the entity structure, and so forth.

In one or more embodiments, the cylinder has a predefined color. In one or more embodiments, the predefined color is white. Other colors will be obvious to those of ordinary skill in the art having the benefit of this disclosure.

In one or more embodiments, the cylinder has a predefined height. In one or more embodiments, the predefined height is greater than a corresponding height of largest impactor mitigator graphical objects 803,804,805. In the illustrative embodiment of FIG. 8, each impactor mitigator graphical objects 803,804,805 has an equivalent height. Thus, if the height of these impactor mitigator graphical objects 803,804,805 has an impactor mitigation magnitude of 2.5 million units, in one or more embodiments the cylinder representing the entity type graphical object 802 will have a height greater than this magnitude.

In one or more embodiments, in addition to generating the entity type graphical object 802, step 404 also generates the impactor mitigator graphical objects 803,804,805. As with the entity type graphical object 802, in one or more embodiments step 404 generates the impactor mitigator graphical objects 803,804,805 by applying one or more modeling rules 806.

In one or more embodiments, step 404 generates the impactor mitigator graphical objects 803,804,805 by applying a modeling rule 806 comprises causing the impactor mitigator graphical objects 803,804,805 to be represented as a geometric object attached to the entity type graphical object 802. In the illustrative embodiment of FIG. 8, the impactor mitigator graphical objects 803,804,805 each comprise a wedge attached to a major face of the entity type graphical object 802.

While a wedge is one possible geometric configuration for the impactor mitigator graphical objects 803,804,805, embodiments of the disclosure are not so limited. Illustrating by example, in another embodiment the impactor mitigator graphical objects 803,804,805 each comprise a bar attached to a major face of the entity type graphical object 802. In still another embodiment, the impactor mitigator graphical objects 803,804,805 each comprise a concentrically aligned layer circumscribing the entity type graphical object 226. Still other examples of shapes for the impactor mitigator graphical objects 803,804,805 will be obvious to those of ordinary skill in the art having the benefit of this disclosure.

In one or more embodiments, step 404 applies another modeling rule 806 causing the impactor mitigator graphical objects 803,804,805 to have a certain color corresponding to the type of impactor it mitigates. Illustrating by example, and continuing the illustration of an insurance policy as an impactor mitigator, an impactor mitigator covering medical professional liability may be a first color, while another impactor mitigator covering business owner's liability may be a second color. A third impactor mitigator covering worker's compensation may be a third color, while a fourth impactor mitigator covering healthcare services liability may be a fourth color. A fifth impactor mitigator covering excess liability may be a fifth color, while a sixth impactor mitigator covering miscellaneous liability under an umbrella may be a sixth color. A seventh impactor mitigator covering general commercial liability may be a seventh color, while an eighth impactor mitigator covering directors and officer's errors and omissions liability may be an eighth color. A ninth impactor mitigator covering employment practices liability may be a ninth color, while a tenth impactor mitigator covering fiduciary liability may be a tenth color. An eleventh impactor mitigator covering fiduciary liability may be an eleventh color, while a twelfth impactor mitigator covering cyber liability is a twelfth color and a thirteenth impactor mitigator covering regulatory liability is a thirteenth color, and so forth. These are illustrative examples only, as impactor mitigators may share colors in other embodiments. Of course, various combinations of colors could be used as well, with some impactor mitigators sharing a color while others are colored differently. Other configurations for the impactor mitigators will be obvious to those of ordinary skill in the art having the benefit of this disclosure.

In one or more embodiments, step 404 applies another modeling rule 806 causing the impactor mitigator graphical objects 803,804,805 to have a predefined height. In one or more embodiments, the predefined height is a magnitude of mitigation the impactor mitigator can provide for any one single impactor. Continuing the example of an insurance policy, in one or more embodiments the magnitude of mitigation the impactor mitigator can provide for any one single impactor is the occurrence limit of the policy. Other examples of magnitudes of mitigation the impactor mitigator can provide for any one single impactor will be obvious to those of ordinary skill in the art having the benefit of this disclosure.

In one or more embodiments, step 404 applies another modeling rule 806 causing the impactor mitigator graphical objects 803,804,805 to have a predefined depth. In one or more embodiments, the predefined depth is a magnitude of mitigation the impactor mitigator can provide prior to depletion. Continuing the example of an insurance policy, in one or more embodiments the magnitude of mitigation the impactor mitigator can provide for any one single impactor is the aggregate limit of the policy. Other examples of magnitudes of mitigation the impactor mitigator can provide prior to depletion will be obvious to those of ordinary skill in the art having the benefit of this disclosure.

In one or more embodiments, step 404 applies another modeling rule 806 causing the impactor mitigator graphical objects 803,804,805 to have a predefined gap between a base 807 of the entity type graphical object 802 and the base 808 of one or more of the impactor mitigator graphical objects 803,804,805. In one or more embodiments, this predefined gap represents a threshold below which the impactor mitigator will be ineffective. Continuing the example of an insurance policy, in one or more embodiments the threshold below which the impactor mitigator will be ineffective is the deductible. Other examples of thresholds below which the impactor mitigator will be ineffective will be obvious to those of ordinary skill in the art having the benefit of this disclosure.

Figure 13:
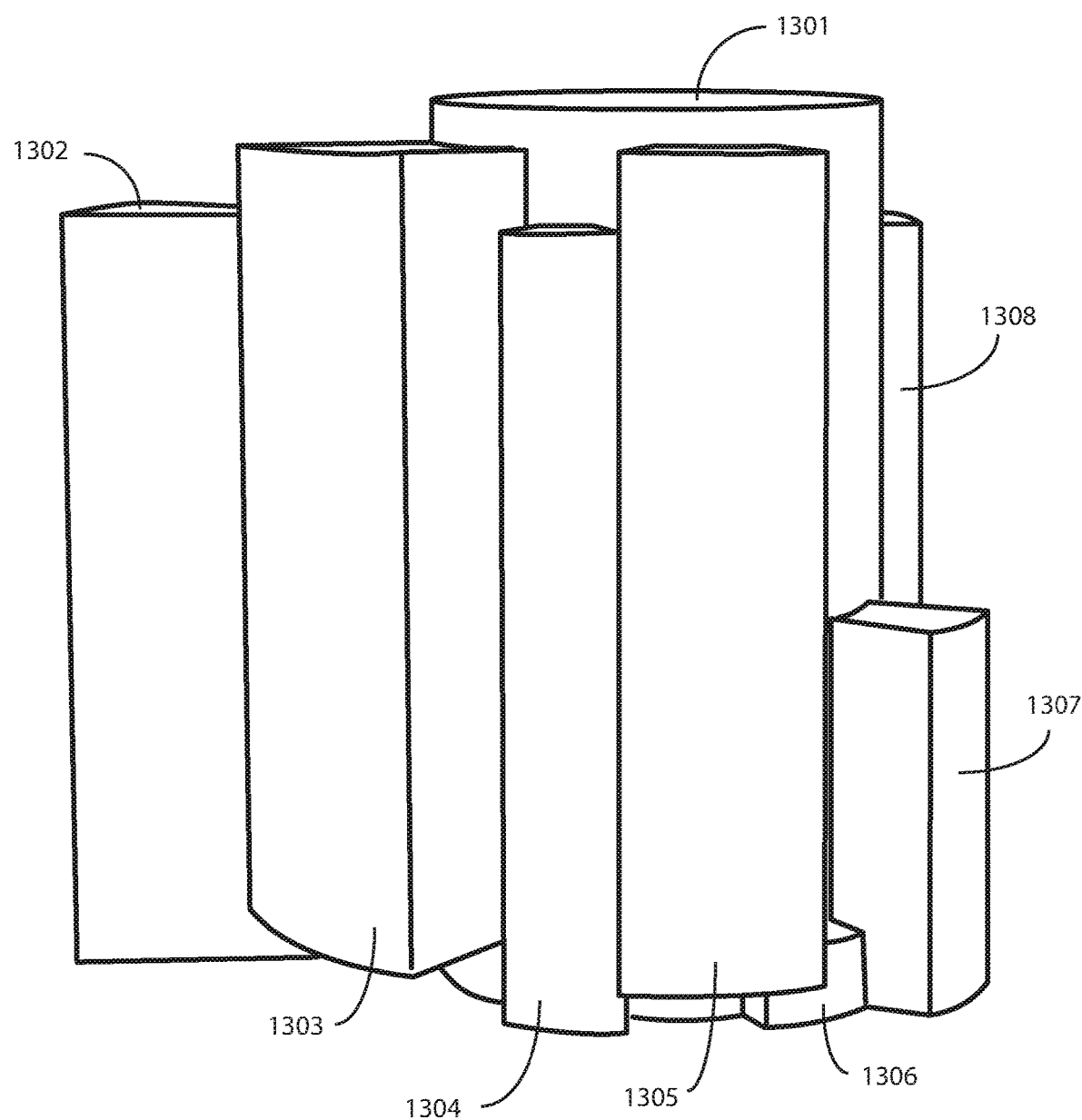
FIG. 13 illustrates one explanatory data visualization, represented as a graphical object, in accordance with one or more embodiments of the disclosure.

Turning briefly to FIG. 13, illustrated therein is another entity type graphical object 1301 shown with one or more impactor mitigator graphical objects 1302,1303,1304,1305, 1306,1307. Each of the entity type graphical object 1301 and one or more impactor mitigator graphical objects 1302,1303, 1304,1305,1306,1307 shown in FIG. 13 comprises a graphical object suitable for presentation on an output of a terminal device in one or more embodiments.

The embodiment of FIG. 13 is illustrated from a different perspective than FIG. 8. Accordingly, features such as the geometric graphical object of the entity type graphical object 1301, the predefined height of the entity type graphical object 1301, the geometric objects and shapes of the one or more impactor mitigator graphical objects 1302,1303,1304, 1305,1306,1307, the predefined heights of the one or more impactor mitigator graphical objects 1302,1303,1304,1305, 1306,1307, the predefined depths of the one or more impactor mitigator graphical objects 1302,1303,1304,1305,1306, 1307, and predefined gaps between the base of the entity type graphical object 1301 and one or more bases of one or more of the impactor mitigator graphical objects 1302,1303, 1304,1305,1306,1307 can more readily be seen.

Turning now back to FIG. 4, at step 405 the method 400 selects impactor data that will be used in the visualization. In one or more embodiments, step 405 comprises applying randomization rules to select a randomized impactor sample set. Other methods by which step 405 can occur will be obvious to those of ordinary skill in the art having the benefit of this disclosure.

In selecting the impactor data, in one or more embodiments step 405 comprises selecting the impactor data solely based upon the class code received or applied at step 401 or retrieved or applied at step 402. In other embodiments, step 405 may include considering information beyond these class codes.

As noted above, embodiments of the disclosure contemplate that when additional entity-identifying data is received at step 401 or retrieved at step 402, the better—and more realistic—the selection of impactor data occurring at step 405 for a particular entity can be. For instance, if the entity-identifying data is received at step 401 or retrieved at step 402 indicates the state in which the entity is located, step 405 can select more relevant impactor data than it could using a class code alone. However, while it can be desirable in many environments to obtain all possible entity-identifying data at steps 401,402, in other embodiments step 405 comprises selecting impactor data only as a function of class code.

Thus, in one or more embodiments step 405 comprises selecting a sample set of impactor data as a function of the entity type, the class code, and/or entity-identifying information. However, in other embodiments step 405 comprises selecting a sample set of impactor data as a function of class code only. In still another embodiment, step 405 comprises selecting a sample set of impactor data as a function of the number of medical professionals working for the entity and a frequency that impactors are expected to impact each doctor working for the medical entity, as previously described.

In still other embodiments, step 405 comprises selecting a sample set of impactor data independent of any entity-identifying information. When operating in this mode, the method 400, when executed by one or more processors, improves the way that the one or more processors retrieve the impactor data by increasing the speed at which step 405 occurs. Accordingly, upon determining the number of impactors to select, in one or more embodiments step 405 comprises ignoring associations between the entity type and any of the impactors, and instead selecting impactor data independent of any entity-identifying information to provide a specific improvement in the way one or more processors executing step 405 operate.

Figure 9:
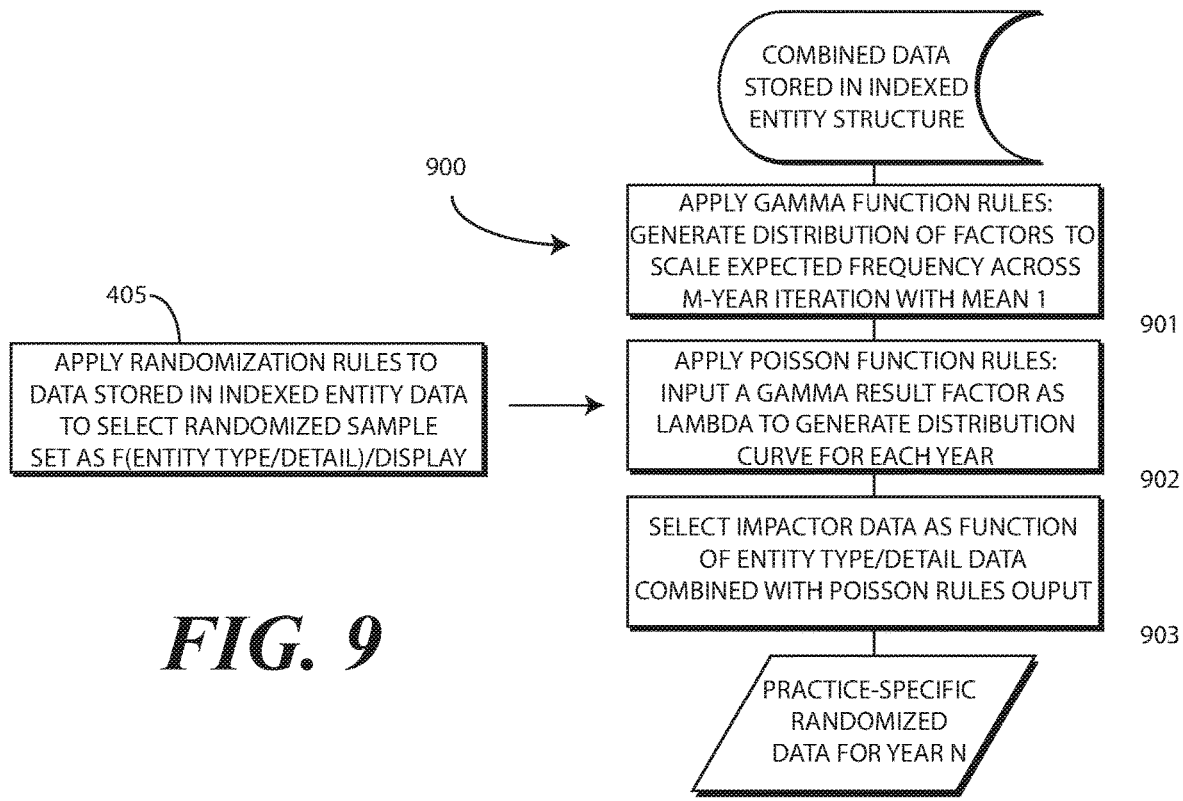
FIG. 9 illustrates one or more method steps for applying one or more randomization rules to impactor data stored in an explanatory indexed entity data structure in accordance with one or more embodiments of the disclosure.

Regardless of whether the impactors are selected at step 405 from the impactor data as a function of markers specifically identifying an entity type or structure, or by ignoring such markers, in one or more embodiments step 405 comprises selecting these impactor data so that they realistically represent impactors that a particular entity structure may experience. Turning briefly to FIG. 9, illustrated therein is one explanatory method 900 for accomplishing this selection process. Other methods for accomplishing the selection occurring at step 405 will be obvious to those of ordinary skill in the art having the benefit of this disclosure.

Beginning at step 901, in one or more embodiments step 405 comprises applying one or more gamma function rules. In one or more embodiments, step 901 comprises generating an array of factors form a gamma function. In one or more embodiments, the array of gamma factors is required to have a mean equal to one. The number of gamma factors generated can vary as a function of iterations of the method (400) of FIG. 4, as determined at decision (408), and as will be described in more detail below with reference to FIG. 4. In one or more embodiments, the array of gamma factors comprises an array of one thousand gamma factors, with the overall array having a mean equal to one.

In one or more embodiments, the array of gamma factors are each multiplied by a desired mean frequency of impactors per predefined time period for which the impactor data is to be chosen at step 901. Thus, if step 405 is selecting fifteen impactors for a period of a year, in one or more embodiments each gamma factor will be multiplied by fifteen at step 901.

At step 902, the array of gamma factors is input into a Poisson function, with each gamma serving as a lambda value of the Poisson function. In so doing, the Poisson function generates a different probability curve for each gamma, with their being an explicit probability for each number of occurrences. Each Poisson function corresponds to one predefined time period for which impactor data will be selected.

Thus, for each predefined time period iteration, the next gamma of the gamma array of step 901, multiplied by the chosen impactor frequency, is input into the Poisson function as a lambda value at step 902. A Poisson distribution for each predefined time period is generated, which has probabilities correlated to probabilities of the impactors from which the set of impactors will be selected. This results in step 903 selecting realistic, but randomized, impactor data for the sample set of impactor data for step 405.

Figure 10:
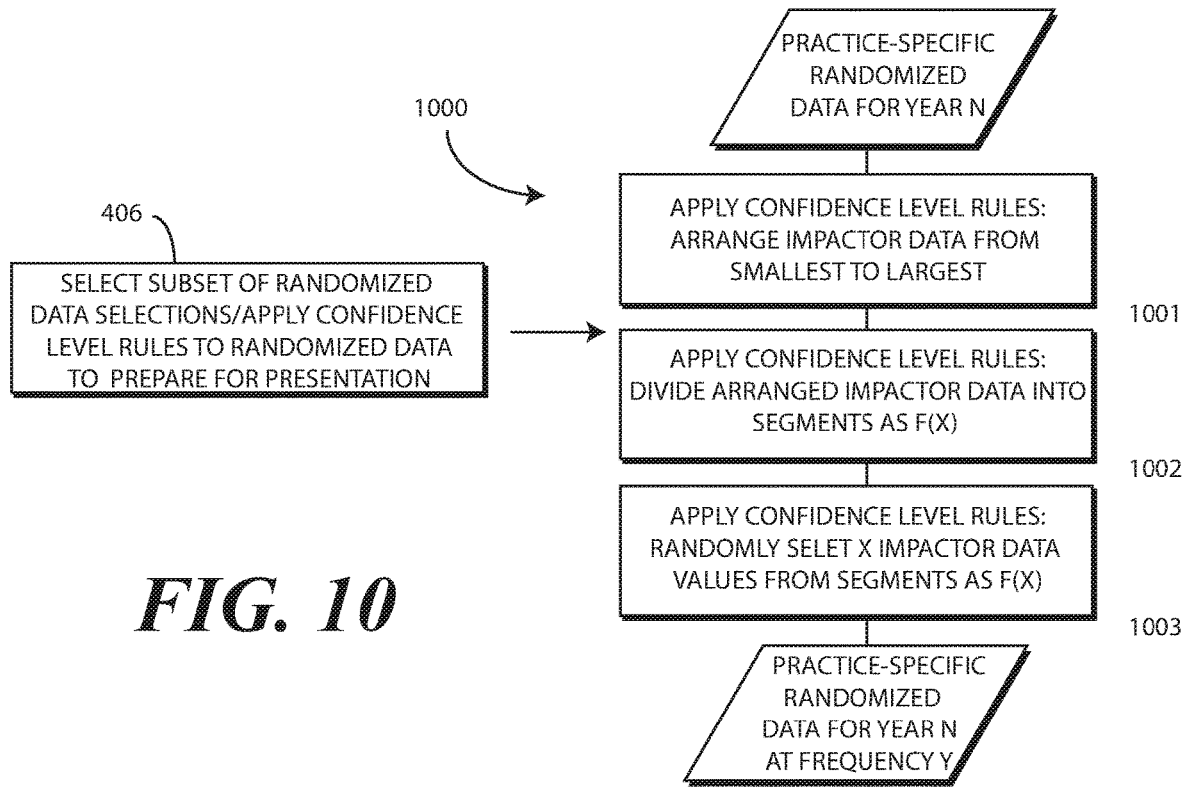
FIG. 10 illustrates one or more method steps for selecting subsets of data after the application of randomization rules in accordance with one or more embodiments of the disclosure.

Turning now back to FIG. 4, at step 406 the method 400 selects a subset of the sample set of impactor data selected at step 405 for use in a visualization system. Turning briefly to FIG. 10, illustrated therein is one explanatory method 1000 by which step 406 can occur. Other methods by which step 406 can occur will be obvious to those of ordinary skill in the art having the benefit of this disclosure.

As stated throughout this specification, one of the principal advantages of embodiments of the disclosure is that impactor data is presented as a function of confidence level. The method 1000 of FIG. 10 arranges and selects a subset of impactor data from the impactor data selected at step (405) by applying one or more confidence level rules so that this presentation as a function of confidence level can occur.

Beginning at step 1001, the method 1000 applies a first confidence level rule by sorting impactors from the impactor data selected at step (405) to generate a sorted randomized impactor data set. In one or more embodiments, step 1001 comprises sorting the impactors from the impactor data selected at step (405) by arranging them from smallest impactor magnitude to largest impactor magnitude.

Step 1002 then applies a second confidence level rule by dividing this sorted impactor data into a predefined number of groups. In one or more embodiments, the predefined number of groups comprises one hundred groups. Where one hundred groups are used, each group functions to represent one percent of the impactor data selected at step (405).

Step 1003 then applies a third confidence level rule by selecting, evenly from the one hundred groups, a predefined number of impactors from the randomized impactor data for use in a visualization system. The predefined number can vary based upon application and visualization output capability. In one or more embodiments, the predefined number is one thousand impactors. Other predefined numbers will be obvious to those of ordinary skill in the art having the benefit of this disclosure.

Turning now back to FIG. 4, in one or more embodiments decision 408 can determine how many times step 405 and step 406 can occur. Embodiments of the disclosure contemplate that a single year of impactor data might provide too small a sample set for the confidence level to be truly "confident." Accordingly, in one or more embodiments step 405 and step 406 occur multiple times such that the selection of impactor data occurring at step 406 can draw from a larger sample of impactor data.

In one or more embodiments, the number of repetitions determined at decision 408 occurs as a function of the gamma and Poisson function shown in step (901) and step (902) of FIG. 9. Thus, if the M value of decision 408 is one thousand, in one or more embodiments the array of gammas generated at step (901) of FIG. 9 will be one thousand. By contrast, if the M value of decision 408 is five hundred, in one or more embodiments the array of gammas generated at step (901) of FIG. 9 will be five hundred, and so forth.

Thus, the inclusion of decision 408, with an M value of greater than one, advantageously causes a predefined number of simulations to occur. In one or more embodiments, each simulation models impactors across a predefined time interval, with the predefined number of simulations representing a predefined number of those time intervals. In one or more embodiments, the predetermined time interval is one year. In one or more embodiments, the predefined number of years is ten years. In another embodiment, the predefined number of years is one hundred years. In still another embodiment, the predefined number of years is one thousand years. Still other numbers of years will be obvious to those of ordinary skill in the art having the benefit of this disclosure.

In one or more embodiments, at step 407 the method 400 optionally correlates the visualization impactor data set received from step 406 to a given entity structure. Recall from above that in one or more embodiments impactors are initially selected at step 405 independently of any entity identifying information. Accordingly, in one or more embodiments step 407 optionally comprises correlating the visualization impactor data set received from step 406 with a given entity structure. Step 407 can comprise correlating the visualization impactor data set received from step 406 with a given entity structure as a function of many different entity identifiers, including a number of physicians, specialty type, number of procedures, number of beds, number of outpatient visits, and so forth.

Illustrating by example, in one or more embodiments step 407 can comprise selecting an example impactor from a store of impactor data that has a magnitude that is equal to a magnitude of an entity independent impactor included with the visualization impactor data set received from step 406. In one or more embodiments, step 407 repeats this action for each impactor of the visualization impactor data set received from step 406. In situations where the impactor data of the visualization impactor data set received from step 406 was selected at step 405 using entity identifying information, this optional correlation operation of step 407 can be omitted.

Figure 11:
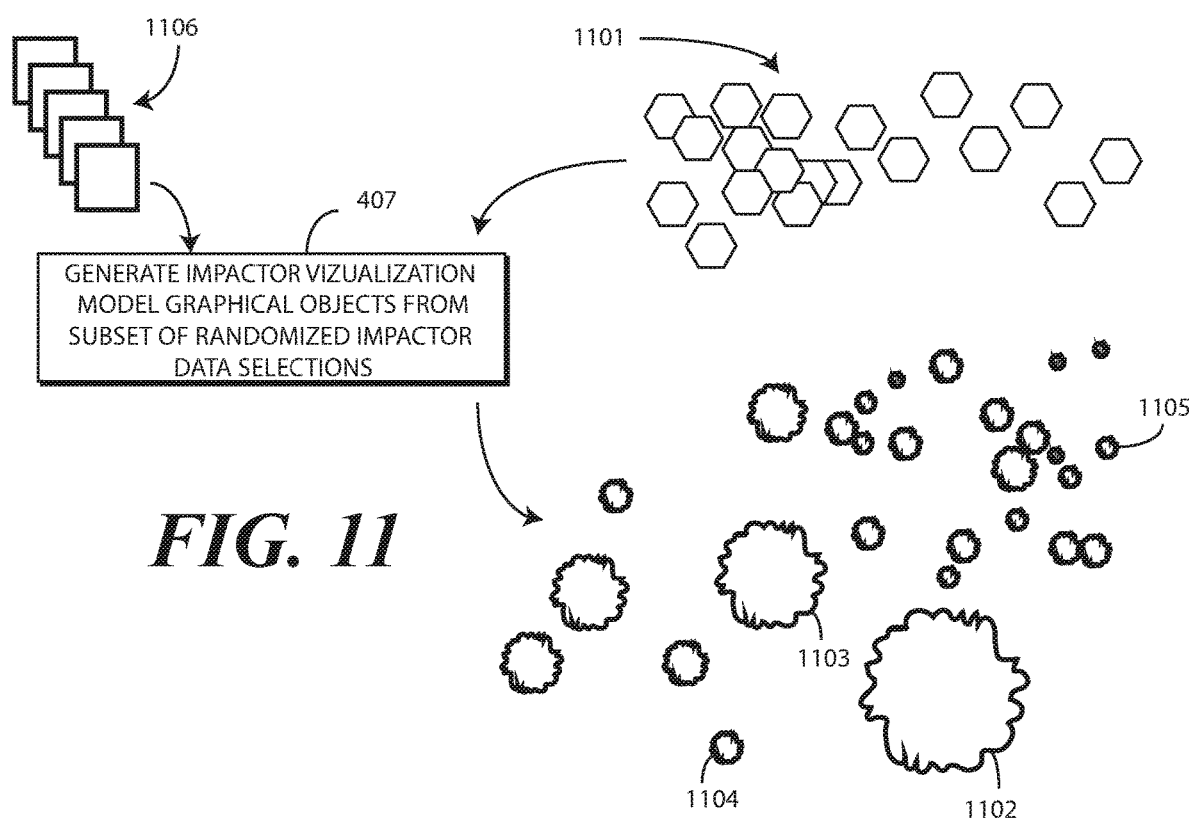
FIG. 11 illustrates one or more method steps for generating impactor visualization data representation models in accordance with one or more embodiments of the disclosure.

In one or more embodiments, step 407 also generates impactor graphical objects from the visualization impactor data set received from step 406. In one or more embodiments, step 407 generates these impactor graphical objects by applying one or more modeling rules. Turning now to FIG. 11, illustrated therein is one method by which step 407 can occur. Others will be obvious to those of ordinary skill in the art having the benefit of this disclosure.

As shown in FIG. 11, in one or more embodiments step 407 receives the visualization impactor data set 1101 received from step (406). In one or more embodiments, step 407 then applies one or more modeling rules 1106 to the visualization impactor data set 1101 received from step (406) to generate one or more impactor graphical objects 1102,1103,1104,1105. As shown in FIG. 11, in one illustrative embodiment each impactor graphical object 1102,1103, 1104,1105 has a visual appearance resembling a microbe or germ. In one or more embodiments, this menacing appearance serves as a visual queue that impactors represented by the impactor graphical objects 1102,1103,1104,1105 have an adverse or deleterious effect on entity structures and/or impact mitigators.

Step 407 advantageously generates impactor graphical objects 1102,1103,1104,1105 that can intuitively and easily be seen when rendered on a display or other output of a terminal device. Thus, while an impactor of the visualization impactor data set 1101 received from step (406) may be a data file that includes a magnitude, probability, impactor identifiers, impactor details, and so forth, in one or more embodiments the impactor graphical objects 1102,1103, 1104,1105 define a simple, intuitive graphical object that represents one or more of these characteristics when the impactor graphical objects 1102,1103,1104,1105 are rendered at a terminal device as part of the visualization system.

In one or more embodiments, step 407 comprises applying a first modeling rule 1106 causing the impactor graphical objects 1102,1103,1104,1105 to have a predefined color. In one or more embodiments, the predefined color corresponds to the type of impactor. Thus, if impactor graphical object 1102 is a first type of impactor, in one or more embodiments this impactor graphical object 1102 will have a first color, such as red. By contrast, if impactor graphical object 1103 is another type of impactor, in one or more embodiments impactor graphical object 1103 will have a second color that is different from the first color, such as blue.

In one or more embodiments, step 407 comprises applying a second modeling rule 1106 causing the impactor graphical objects 1102,1103,1104,1105 to have a predefined size. In one or more embodiments, the predefined size corresponds to the magnitude of impactor. Thus, impactor graphical object 1102 has a greater magnitude than impactor graphical object 1103 in FIG. 11, while impactor graphical object 1104 has a smaller magnitude than impactor graphical object 1103, and so forth.

In one or more embodiments, step 407 comprises applying a third modeling rule 1106 causing the impactor graphical objects 1102,1103,1104,1105 to have a predefined opacity. In one or more embodiments, the predefined opacity corresponds to the probability that another impactor having a predefined magnitude will occur. Illustrating by example, if impactor graphical object 1104 has a reoccurrence probability of ninety-five percent, in one or more embodiments this impactor graphical object 1104 will be represented by a graphical object having a first opacity, such as opacity of five percent. By contrast, if impactor graphical object 1103 has a reoccurrence probability of only ten percent, in one or more embodiments impactor graphical object 1103 will be represented as having a second opacity, greater than the first opacity, such as such as an opacity of ninety percent, and so forth.

Turning now back to FIG. 4, in one or more embodiments step 409 comprises delivering visualization data to a terminal device and causing the visualization to run (animate) in response to one or more terminal device events. Step 410 comprises manipulating the graphical objects and visualizations in response to terminal device interactions occurring at various user controls presented at the terminal device. Turning now to FIGS. 14-23, illustrated therein are various examples of visualized data demonstrating how this can occur. For the visualized data illustrated in FIGS. 14-23, the entity type will be a medical practice, with impactors comprising loss liability risks, and with impactor mitigators comprising liability protection mechanisms. However, as noted above, in other embodiments, other entity types, impactors, and impactor mitigators can be substituted for those used in FIGS. 14-23 for illustration purposes.

Figure 14:
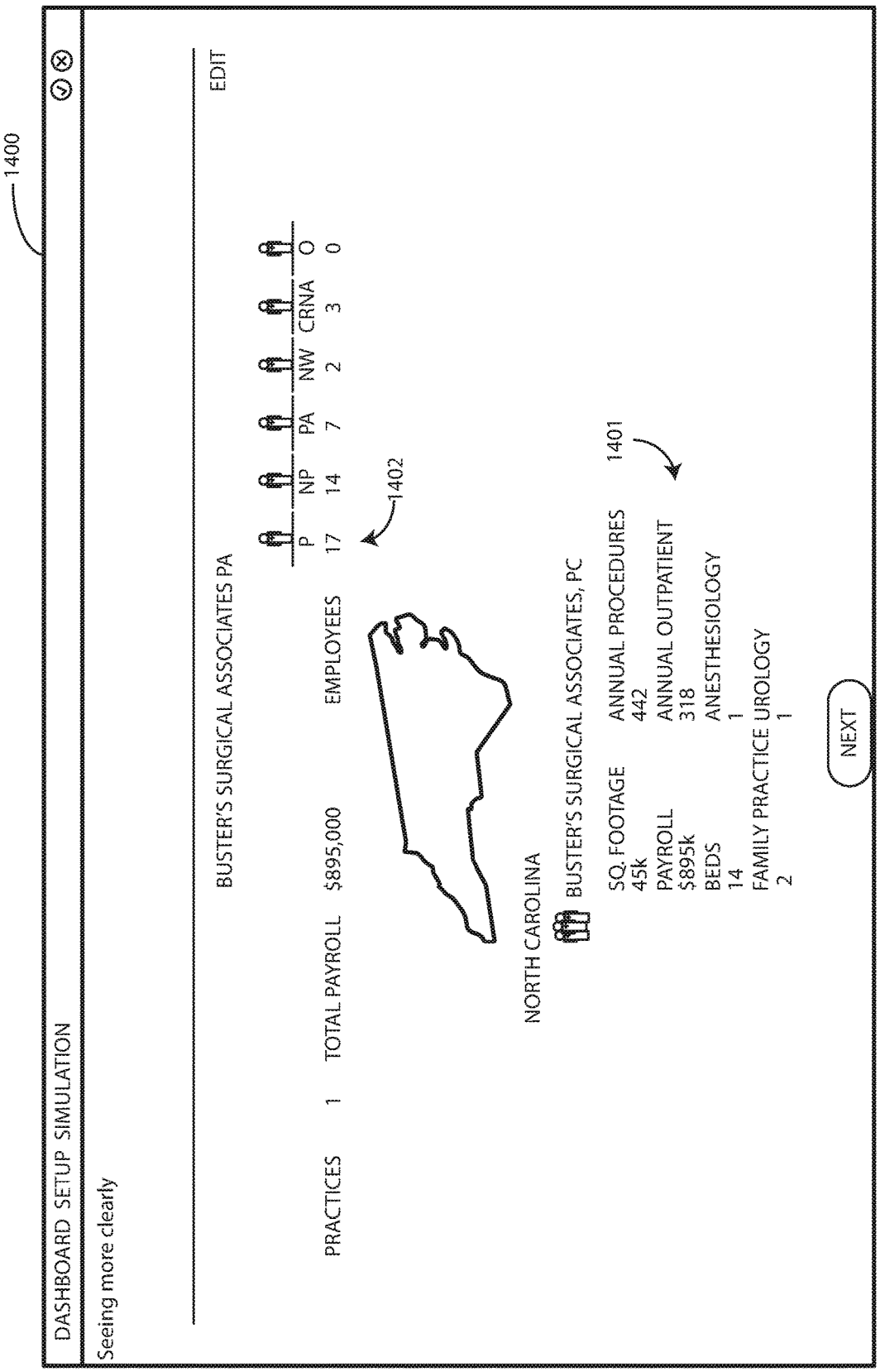
FIG. 14 illustrates one example of visualized data in accordance with one or more embodiments of the disclosure.

Beginning at FIG. 14, an entity data visualization object 1400 is presented on a display or other output of a terminal device. In one or more embodiments, the visualization system (100) receives entity-defining information 1401 from a terminal device. In one or more embodiments, this occurs through the presentation of one or more visualization objects, one example of which is the entity data visualization object 1400 of FIG. 14. In one or more embodiments, this entity-defining information 1401 is used to generate an entity type visualization object.

As noted above, the entity-defining information can be received in the form of terminal device interaction events. In one or more embodiments, these terminal device interaction events can comprise user input occurring at a terminal device. The terminal device can then convert the user input into computer-readable signal media, which is transmitted to the visualization system (100).

A user can optionally be prompted, for example, to deliver the user input at the terminal device. The terminal device may prompt a user for information related to entity structure in one or more embodiments. Illustrating by example, when prompted by the entity data visualization object 1400 of FIG. 14, a user may employ a mouse or other visualization data navigation tool to navigate to a first field 1402 to enter requested entity-identifying information. In this example, the requested entity-identifying information comprises a number of employees, and more specifically, a number of physicians practicing at Buster's Surgical Associates, PA. This process of prompting and receiving user input in the form of terminal device interaction events can continue until some, or all, of the requested information is received.

In other embodiments, rather than receiving the information from computer-readable signal media generated at the terminal device from terminal device interaction events occurring at entity data visualization object 1400, information can be retrieved from an indexed entity data structure or other persistent storage devices or memory devices. Where this occurs, entity data visualization object 1400 can simply present the entity-defining information 1401 for inspection to a user at the terminal device.

Of course, a combination of retrieval receipt can be used. In situations where some entity-defining information is stored in an indexed entity data structure or other persistent storage devices or memory devices, but not all entity-defining information, the entity data visualization object 1400 can present some retrieved entity-defining information 1401 while prompting for other information at other locations of the entity data visualization object 1400.

In the illustrative entity data visualization object 1400, the entity-defining information 1401 includes in which states the entity is located. In this example, the state is North Carolina. In one or more embodiments, the entity-defining information 1401 further includes the number of procedures performed by the entity. In one or more embodiments, the entity-defining information 1401 also includes the number of outpatient visits occurring at the entity.

The entity-defining information 1401 can comprise other information as well. In the illustrative embodiment of FIG. 14, the entity-defining information 1401 further comprises square footage of the entity, number of practices of the entity, total payroll of the entity, specialties of practice of the entity, number of employees at the entity, and specialty of the employees. The illustrative entity-defining information 1401 further includes a number of beds and types of practices as well.

Other types of entity-defining information 1401 that can be received from, or presented at, the entity data visualization object 1400 include operational information related to the entity, internal component information of the entity, the number of operations of the entity, the frequency of operations of the entity, and so forth. Still other types of entity-defining information 1401 that can be received from, or presented at, the entity data visualization object 1400 will be obvious to those of ordinary skill in the art having the benefit of this disclosure.

Figure 15:
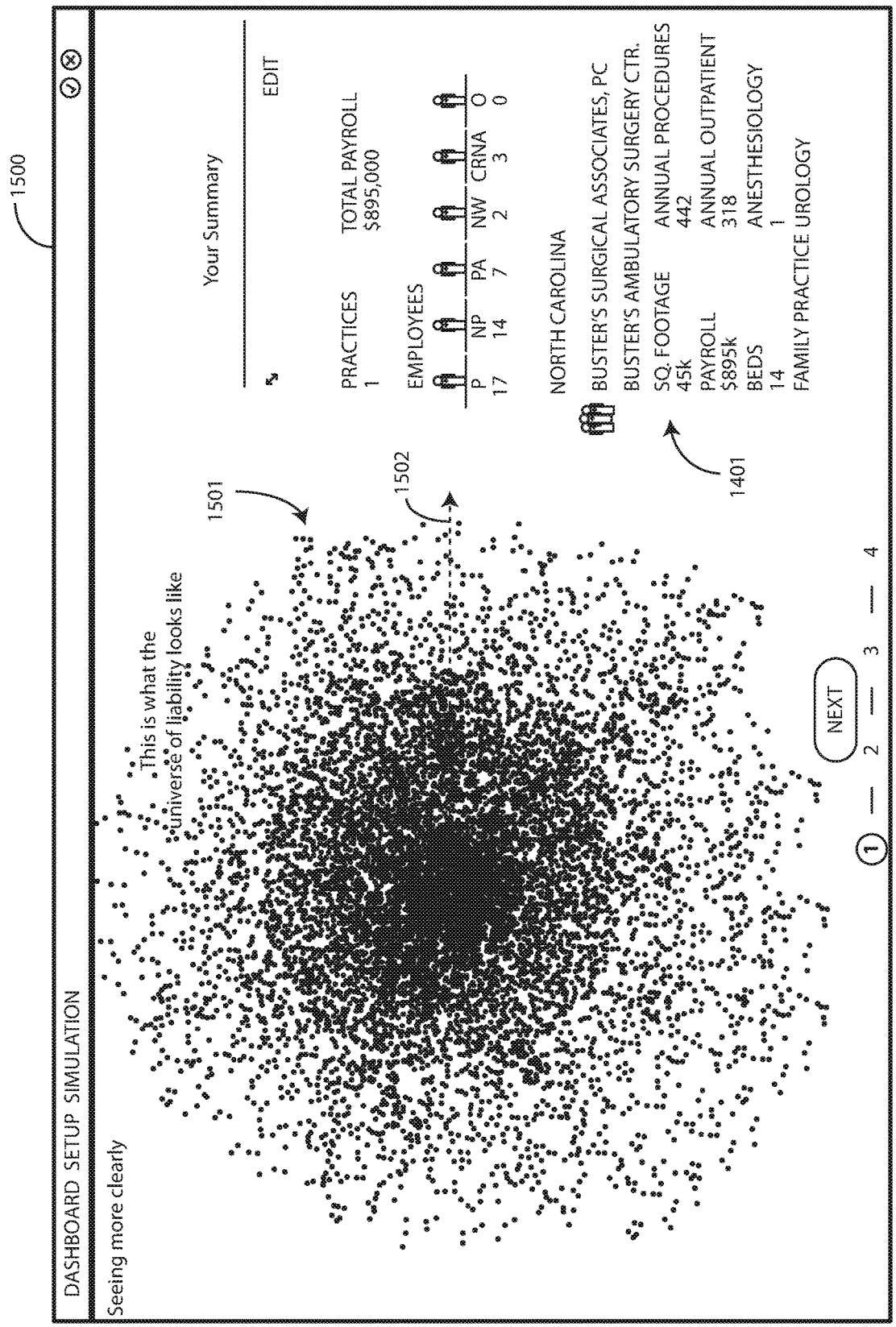
FIG. 15 illustrates another example of visualized data in accordance with one or more embodiments of the disclosure.

Turning now to FIG. 15, illustrated therein is another visualization object 1500 configured in accordance with one or more embodiments of the disclosure. The visualization object 1500 of FIG. 15, in one or more embodiments, occurs after the visualization system (100) has generated impactor graphical objects 1501, the entity type graphical object, and/or one or more impactor mitigator graphical objects for the visualization system (100). In one or more embodiments, the visualization object 1500 of FIG. 15 also occurs after the animation rule application engine has applied its animation rules to generate a visualization comprising the impactor graphical objects, the entity type graphical object, and/or the one or more impactor mitigator graphical objects.

As shown in FIG. 15, in one or more embodiments the visualization begins with a visualization object 1500 causing only the impactor graphical objects 1501 to be presented in the visualization. Accordingly, in one or more embodiments visualization object 1500 omits the presentation of either the entity type graphical object and/or the one or more impactor mitigator graphical objects. However, as shown in FIG. 15, in one or more embodiments the entity-defining information 1401 that can be received from, or presented at, the entity data visualization object (1400) of FIG. 14 is presented in the visualization object 1500 of FIG. 15, thereby providing a confirmation that the impactor graphical objects 1501 correspond to those that Buster's Surgical Associates may experience.

As shown in the illustrative embodiment of FIG. 15, in one or more embodiments the impactor graphical objects 1501 are presented in a radial pattern 1502. In one or more embodiments, the impactor graphical objects 1501 becoming denser and denser toward the center of the radial pattern, as shown in FIG. 15.

In one or more embodiments, the impactor graphical objects 1501 are animated in the visualization object 1500 of FIG. 15. For example, in one embodiment the impactor graphical objects 1501 can gently swirl clockwise. In another embodiment, the impactor graphical objects 1501 can swirl counterclockwise. In still another embodiment, the impactor graphical objects 1501 can swirl in circles about their locations, much as the way germs or other microbes may move when suspended in the air. Other animation techniques suitable for making the impactor graphical objects 1501 move in the visualization object 1500 of FIG. 15 will be obvious to those of ordinary skill in the art having the benefit of this disclosure.

Figure 16:
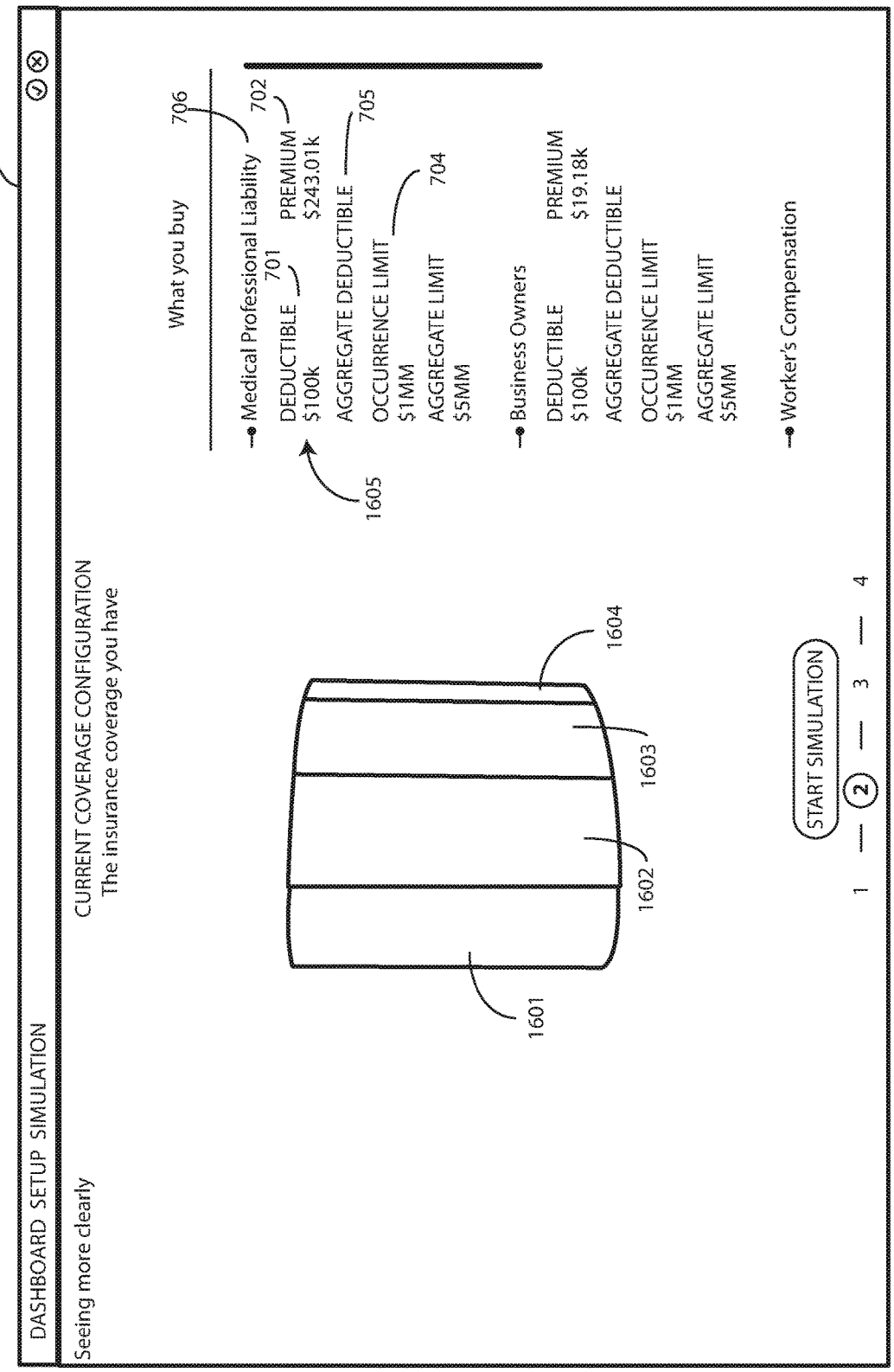
FIG. 16 illustrates still another example of visualized data in accordance with one or more embodiments of the disclosure.

Turning now to FIG. 16, illustrated therein is another visualization object 1600 in accordance with one or more embodiments of the disclosure. As shown in FIG. 16, in one or more embodiments the visualization object 1600 introduces the entity type graphical object 1601 and/or the one or more impactor mitigator graphical objects 1602,1603,1604. In one or more embodiments, the visualization object 1600 presents only the entity type graphical object 1601 and/or the one or more impactor mitigator graphical objects 1602, 1603,1604. Thus, as shown in FIG. 16, the impactor graphical objects (1501) of FIG. 15 are absent. In one or more embodiments, this allows a viewer to examine and inspect the entity type graphical object 1601 and/or the one or more impactor mitigator graphical objects 1602,1603,1604 initially without visual interference from the impactor graphical objects (1501) of FIG. 15.

In one or more embodiments, the entity-defining information (1401) from the entity data visualization object (1400) of FIG. 14 has been replaced in the visualization object 1600 of FIG. 16 with information 1605 identifying the various impactor mitigator graphical objects 1602,1603, 1604. In this illustrative embodiment, where the impactor mitigator graphical objects 1602,1603,1604 correspond to insurance policies, the information 1605 identifying the various impactor mitigator graphical objects 1602,1603, 1604 can identify information such as type of impactor the impactor mitigator mitigates, the magnitude of mitigation the impactor mitigator can provide for any one single impactor, the magnitude of mitigation the impactor mitigator can provide prior to depletion, and/or the threshold below which the impactor mitigator will be ineffective, as well as other information such the cost associated with each impactor mitigator.

In the illustrative embodiment of FIG. 16, the information 1605 identifying the various impactor mitigator graphical objects 1602,1603,1604 includes type of impactor 706 the impactor mitigator mitigates, the magnitude 704 of mitigation the impactor mitigator can provide for any one single impactor, the magnitude 705 of mitigation the impactor mitigator can provide prior to depletion, and/or the threshold 701 below which the impactor mitigator will be ineffective. The information 1605 identifying the various impactor mitigator graphical objects 1602,1603,1604 also includes the cost 702 of each impactor mitigator. In this illustrative embodiment.

Figure 17:
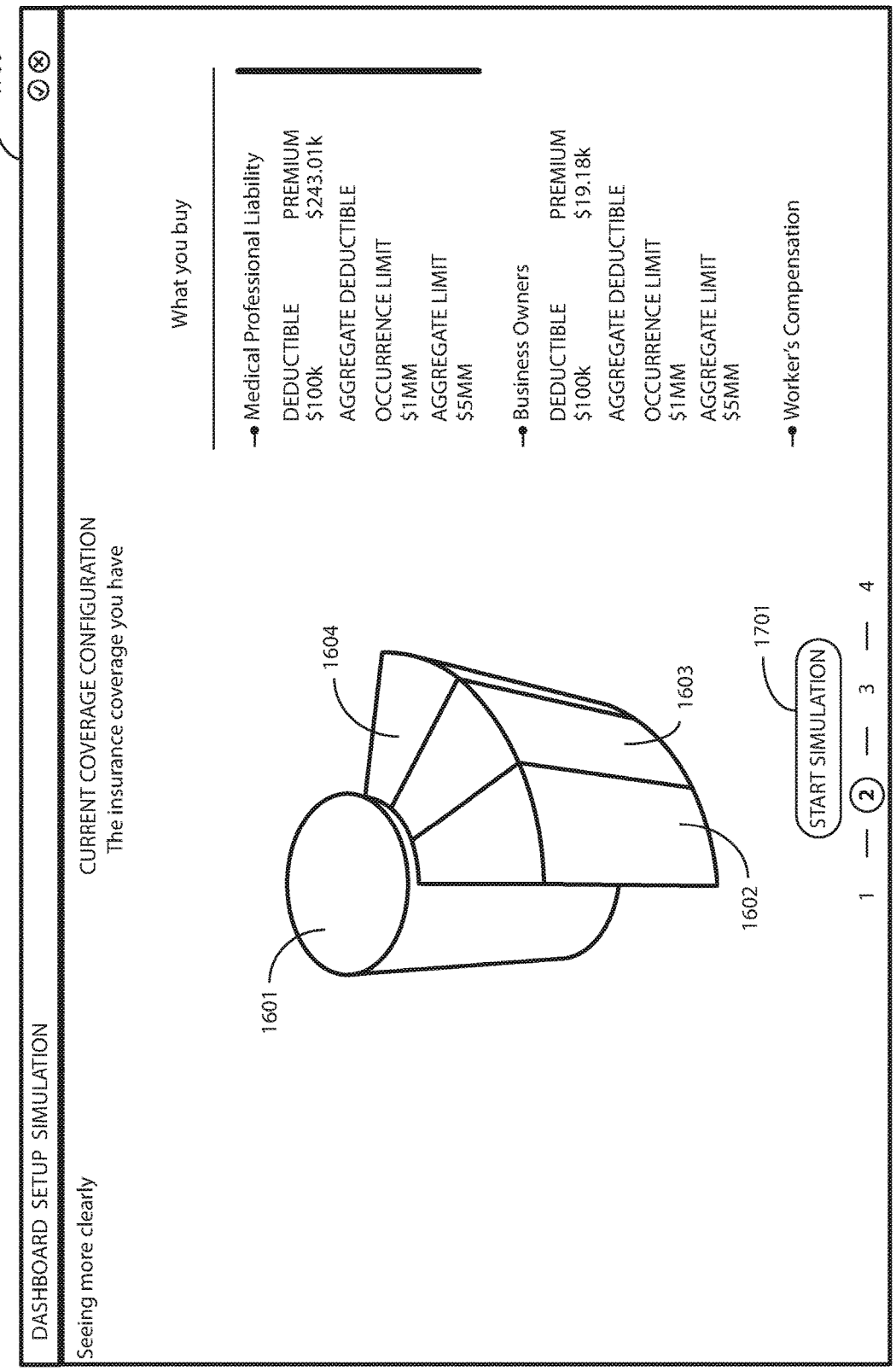
FIG. 17 illustrates yet another example of visualized data in accordance with one or more embodiments of the disclosure.

Turning now to FIG. 17, illustrated therein is another visualization object 1700 in accordance with one or more embodiments of the disclosure. As shown in FIG. 17, in one or more embodiments the visualization object 1700 embeds animation rules allowing the entity type graphical object 1601 and/or the one or more impactor mitigator graphical objects 1602,1603,1604 to be manipulated. Illustrating by example, by comparing FIG. 16 to FIG. 17, it can be seen that the entity type graphical object 1601 and/or the one or more impactor mitigator graphical objects 1602,1603,1604 have been panned and/or spun from the initial side elevation view occurring in FIG. 16 to the perspective view of FIG. 17. Advantageously, this allows a viewer interacting with the visualization object 1700 at a terminal device to "spin around" or "flip around" the entity type graphical object 1601 and/or the one or more impactor mitigator graphical objects 1602,1603,1604 for closer inspection.

Once the inspection of the entity type graphical object 1601 and/or the one or more impactor mitigator graphical objects 1602,1603,1604 is complete, in one or more embodiments the visualization object 1700 includes a user actuation target 1701 that launches a visualization of how one or more impactors represented by the various impactor graphical objects (1501) of FIG. 15 affect the entity type graphical object 1601 and/or the one or more impactor mitigator graphical objects 1602,1603,1604. To launch the visualization, in one or more embodiments a user may employ a mouse or other visualization data navigation tool to navigate to the user actuation target 1701 to interact with the user actuation target 1701.

Figure 18:
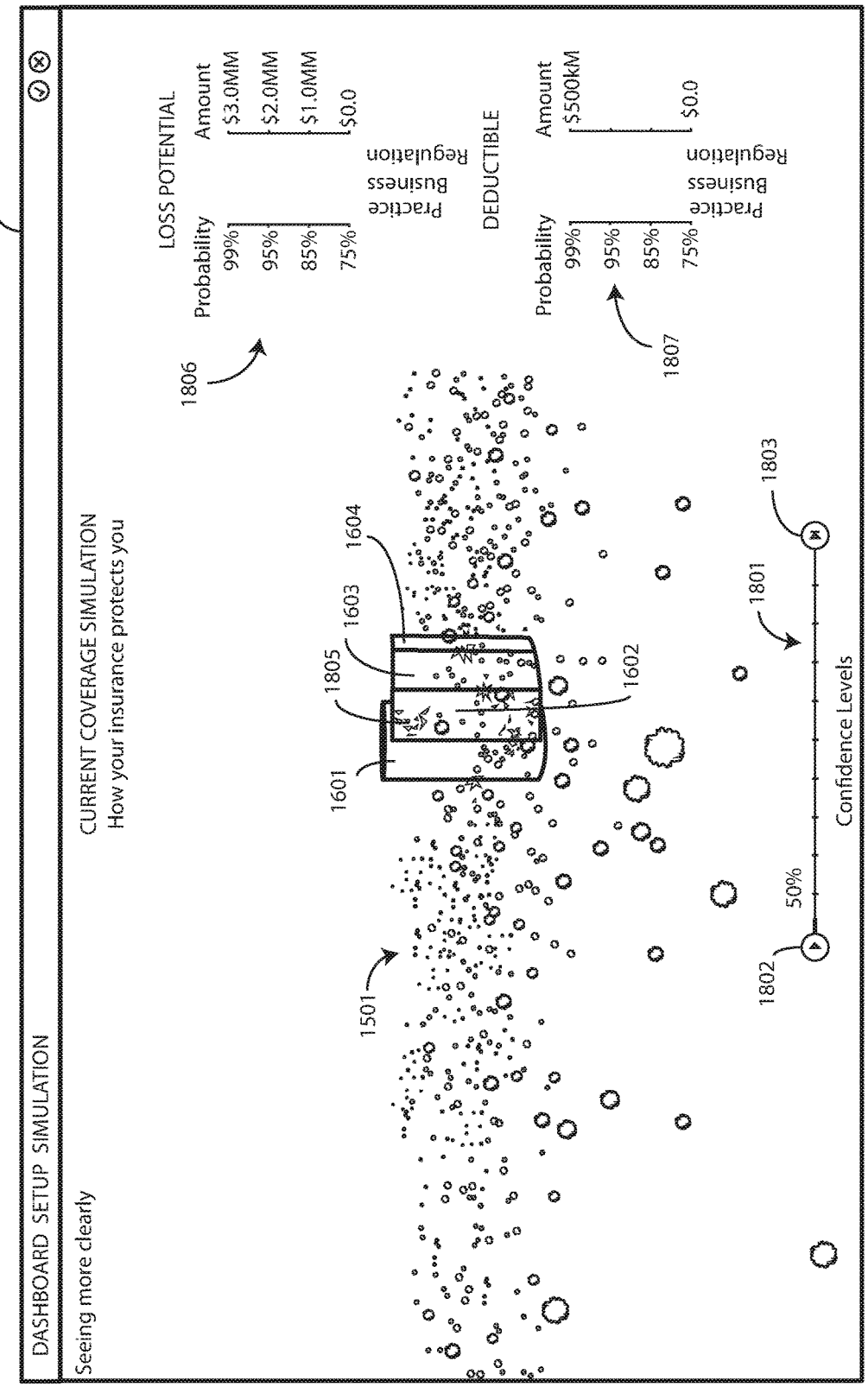
FIG. 18 illustrates still another example of visualized data in accordance with one or more embodiments of the disclosure.

Turning now to FIG. 18 illustrated therein is another visualization object 1800 in accordance with one or more embodiments of the disclosure. As shown in FIG. 18, in one or more embodiments the visualization object 1800 embeds animation rules causing the impactor graphical objects 1501 of FIG. 15 to be introduced around the entity type graphical object 1601 and/or the one or more impactor mitigator graphical objects 1602,1603,1604.

In one or more embodiments, the impactor mitigator graphical objects 1602,1603,1604 can be filtered by type so that only those impactor mitigator graphical objects 1602, 1603,1604 of a certain type are presented in the visualization object 1800. Thus, if the impactor mitigator graphical objects 1602,1603,1604 are of a first type, a second type, and a third type, in one or more embodiments they can be filtered such that only the impactor mitigator graphical objects 1602 of a first type are shown, only those of a second type, and so forth.

In one or more embodiments, the impactor graphical objects 1501 move in an animated fashion about the entity type graphical object 1601 and/or the one or more impactor mitigator graphical objects 1602,1603,1604. For example, the impactor graphical objects 1501 can move in a circular fashion about the entity type graphical object 1601 and/or the one or more impactor mitigator graphical objects 1602, 1603,1604 so as to encircle the entity type graphical object 1601 and/or the one or more impactor mitigator graphical objects 1602,1603,1604. The eeriness of these microbe or germ like impactor graphical objects 1501 swirling about the entity type graphical object 1601 and/or the one or more impactor mitigator graphical objects 1602,1603,1604 provides a visual cue that each will have an adverse impact on one or both of the entity type graphical object 1601 and/or the one or more impactor mitigator graphical objects 1602, 1603,1604 when they collide with the same.

As stated throughout this specification, one of the principal advantages of embodiments of the disclosure is that impactor graphical objects 1501 interacting with the entity type graphical object 1601 and/or the one or more impactor mitigator graphical objects 1602,1603,1604 are presented as a function of confidence level. In the illustrative embodiment of FIG. 18, a confidence level meter 1801 is presented to show at what confidence level the visualization is currently presenting. In FIG. 18, the confidence level is about fifty percent. This means that there is probability of fifty percent that impactor graphical objects 1501 having a magnitude larger than those already impacting one or both of entity type graphical object 1601 and/or the one or more impactor mitigator graphical objects 1602,1603,1604 will impact one or both of the entity type graphical object 1601 and/or the one or more impactor mitigator graphical objects 1602,1603,1604.

In one or more embodiments, as the confidence level meter 1801 is bounded by two user actuation targets 1802, 1803. A first user actuation target 1802 can be used to pause and start the visualization. When paused, the impactor graphical objects 1501 temporarily cease moving in the circular fashion about the entity type graphical object 1601 and/or the one or more impactor mitigator graphical objects 1602,1603,1604. During pauses of the visualization, or when the visualization is active, the visualization can be panned, rotated, flipped, or manipulated to better inspect the interactions of the impactor graphical objects 1501 with the entity type graphical object 1601 and/or the one or more impactor mitigator graphical objects 1602,1603,1604. A second user actuation target 1803 fast-forwards the visualization to completion.

In one or more embodiments, as a given impactor graphical object, e.g., impactor graphical object 1804, impacts either the entity type graphical object 1601 and/or the one or more impactor mitigator graphical objects 1602,1603,1604, it explodes by spewing debris 1805, thereby simulating the adverse affect the impactor graphical object 1804 had on the entity type graphical object 1601, the one or more impactor mitigator graphical objects 1602,1603,1604, or both. As will be described with more detail below with reference to FIG. 21, in one or more embodiments when an impactor graphical object 1804 impacts an impactor mitigator graphical object, e.g., impactor mitigator graphical object 1602, its height, width, or combinations thereof can be reduced to depict the reduction in one or both of the magnitude of mitigation the impactor mitigator can provide for any one single impactor and/or the magnitude of mitigation the impactor mitigator can provide prior to depletion.

In one or more embodiments, cumulative totals 1806 of the magnitudes of the adverse affects that are borne by the entity type graphical object 1601 in response to the impactor graphical objects 1501 impacting either the entity type graphical object 1601 or the one or more impactor mitigator graphical objects 1602,1603,1604 can be presented to the side of the visualization. In the illustrative embodiment of FIG. 18, these cumulative totals 1806 comprise losses beyond those mitigated by the one or more impactor mitigator graphical objects 1602,1603,1604. Other cumulative totals 1807 can comprise cumulative losses due to the accumulation of threshold losses below which the one or more impactor mitigator graphical objects 1602,1603,1604 are ineffective. Other cumulative totals for presentation to the side of the visualization will be obvious to those of ordinary skill in the art having the benefit of this disclosure.

Figure 19:
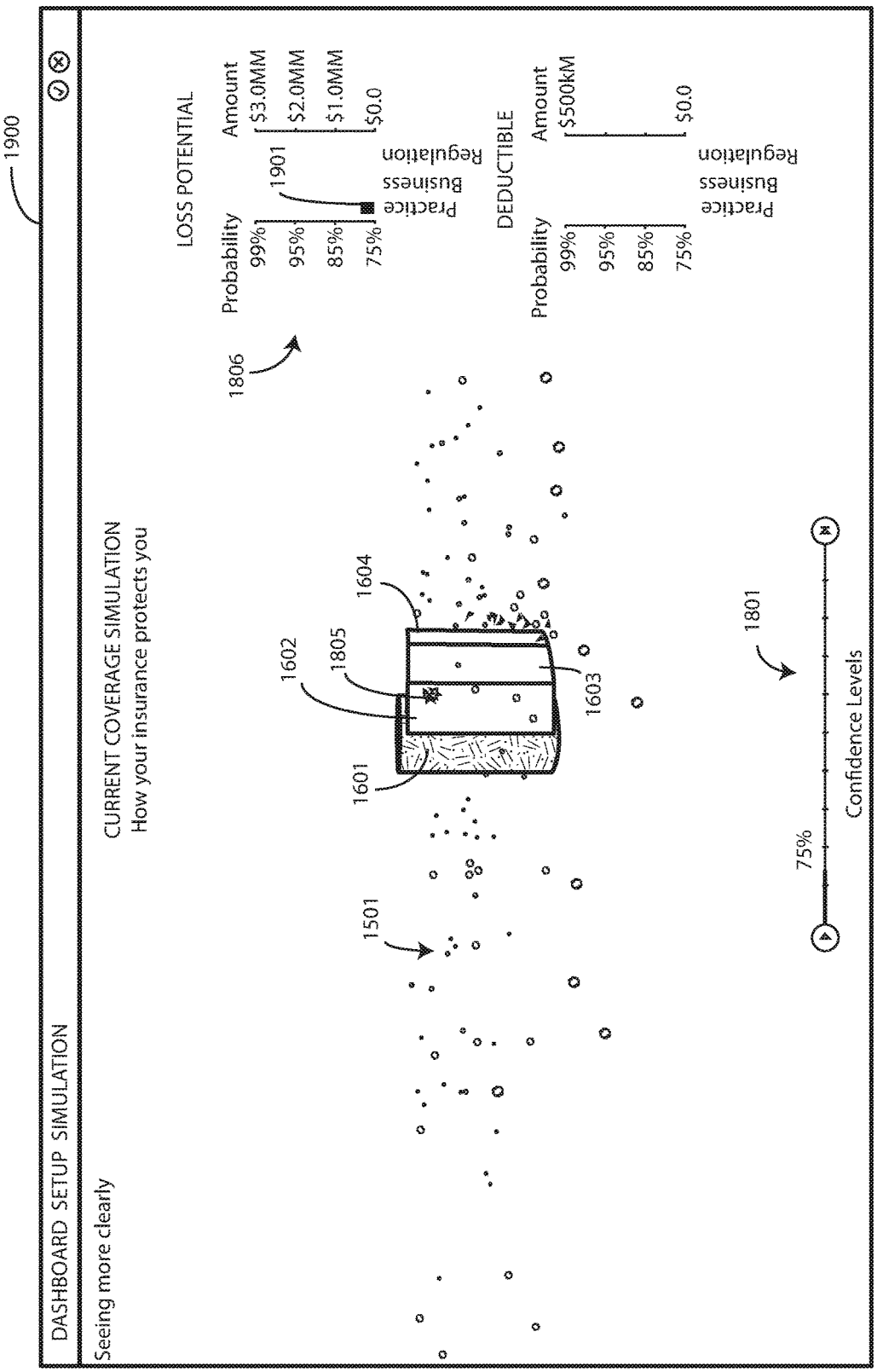
FIG. 19 illustrates another example of visualized data in accordance with one or more embodiments of the disclosure.

How these cumulative totals accrue is shown in FIG. 19. Turning now to FIG. 19, illustrated therein is another visualization object 1900 in accordance with one or more embodiments of the disclosure. As shown in FIG. 19, the confidence level, as represented by the confidence level meter 1801, as moved from the fifty percent of FIG. 18 to about seventy-five percent. Accordingly, there are now fewer impactor graphical objects 1501 left that may impact either the entity type graphical object 1601 or the one or more impactor mitigator graphical objects 1602,1603,1604. This is due to the fact that the magnitudes of the impactor graphical objects 1501 at the seventy-five percent confidence level are greater than those at the fifty-percent confidence level.

Another thing to notice in FIG. 19 is the fact that an impactor graphical object has just hit the entity type graphical object 1601. In one or more embodiments, the entity type graphical object 1601 turns a different color when sustaining adverse impacts from the impactor graphical objects. In the illustrative embodiment of FIG. 19, in addition to exploding with debris 1805, the entity type graphical object 1601 has momentarily turned from white to red, with a bit of a strobe like flash occurring. This allows stakeholders watching the visualization object 1900 to "see the pain" occurring when impactor graphical objects hit the entity type graphical object 1601. The pain is especially acute when inadequate impactor mitigator graphical objects 1602,1603,1604 were initially present and have become depleted, thereby leaving the entity type graphical object 1601 exposed.

Still another item to notice in FIG. 19 are the cumulative totals 1806 of the magnitudes of the adverse affects that are borne by the entity type graphical object 1601 in response to the impactor graphical objects 1501 impacting either the entity type graphical object 1601 or the one or more impactor mitigator graphical objects 1602,1603,1604. In the illustrative embodiment of FIG. 19, these cumulative totals 1806 have increased, illustrating the fact that the entity type graphical object 1601 has sustained about two hundred thousand units of adversity due to practice type impactors hitting the entity type graphical object 1601. As the confidence level illustrated on the confidence level meter 1801 continues to increase, these cumulative totals 1806 will tend to increase as well.

Figure 20:
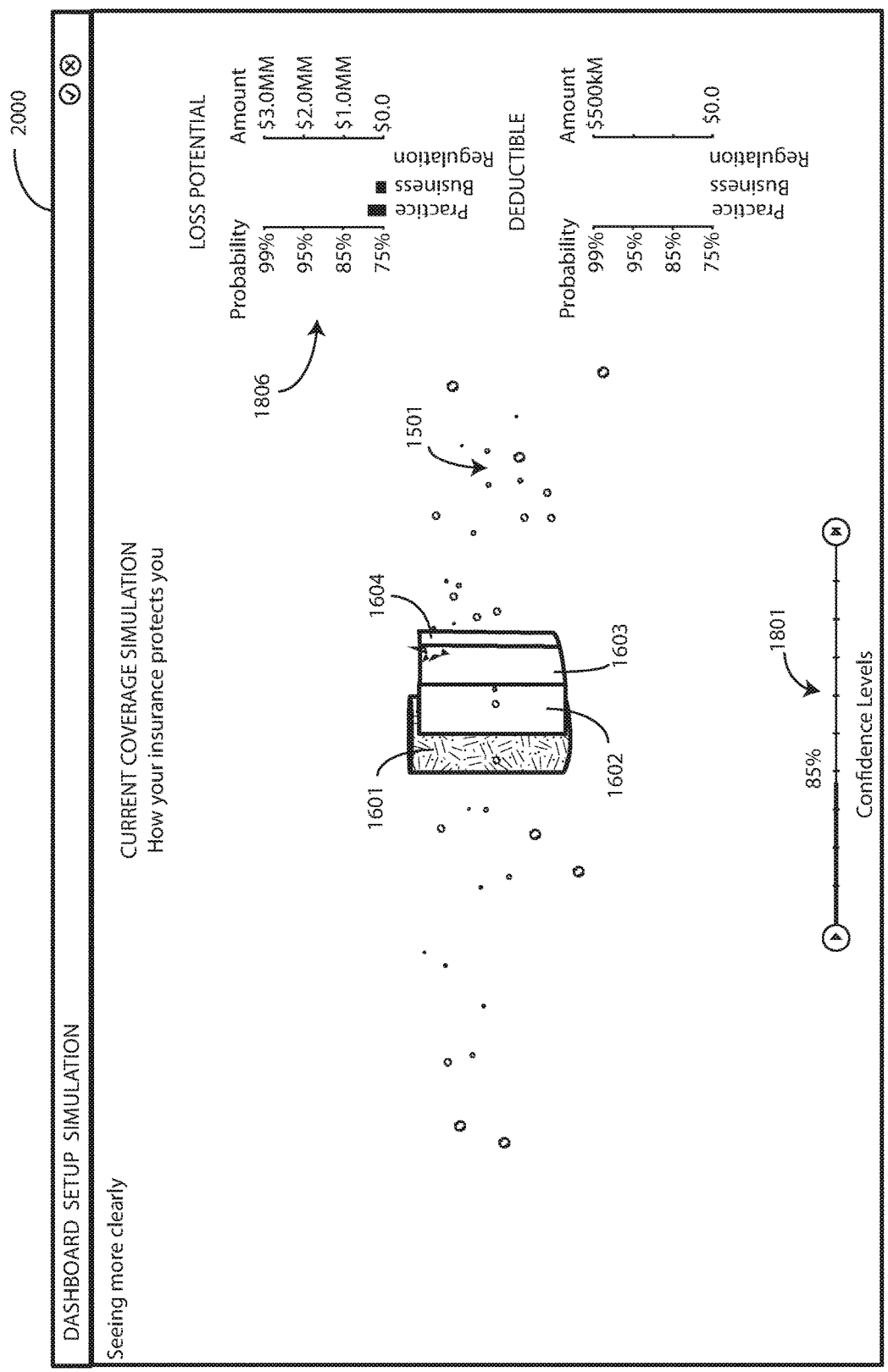
FIG. 20 illustrates another example of visualized data in accordance with one or more embodiments of the disclosure.

This is illustrated in FIG. 20. Turning now to FIG. 20, illustrated therein is another visualization object 2000 in accordance with one or more embodiments of the disclosure. As shown in FIG. 20, the confidence level, as represented by the confidence level meter 1801, as moved from the seventy-five percent of FIG. 19 to about eighty-five percent. Accordingly, there are now even fewer impactor graphical objects 1501 left that may impact either the entity type graphical object 1601 or the one or more impactor mitigator graphical objects 1602,1603,1604.

As with FIG. 19, in FIG. 20 an impactor graphical object has just hit the entity type graphical object 1601. Accordingly, the entity type graphical object 1601 has turned a different color, which is red. Further, the cumulative totals 1806 of the magnitudes of the adverse affects that are borne by the entity type graphical object 1601 in response to the impactor graphical objects 1501 impacting either the entity type graphical object 1601 or the one or more impactor mitigator graphical objects 1602,1603,1604 continue to increase. In the illustrative embodiment of FIG. 20, these cumulative totals 1806 have increased, illustrating the fact that the entity type graphical object 1601 has sustained about four hundred thousand units of adversity due to practice type impactors hitting the entity type graphical object 1601 and about two hundred thousand units of adversity due to business type impactors hitting the entity type graphical object 1601.

Figure 21:
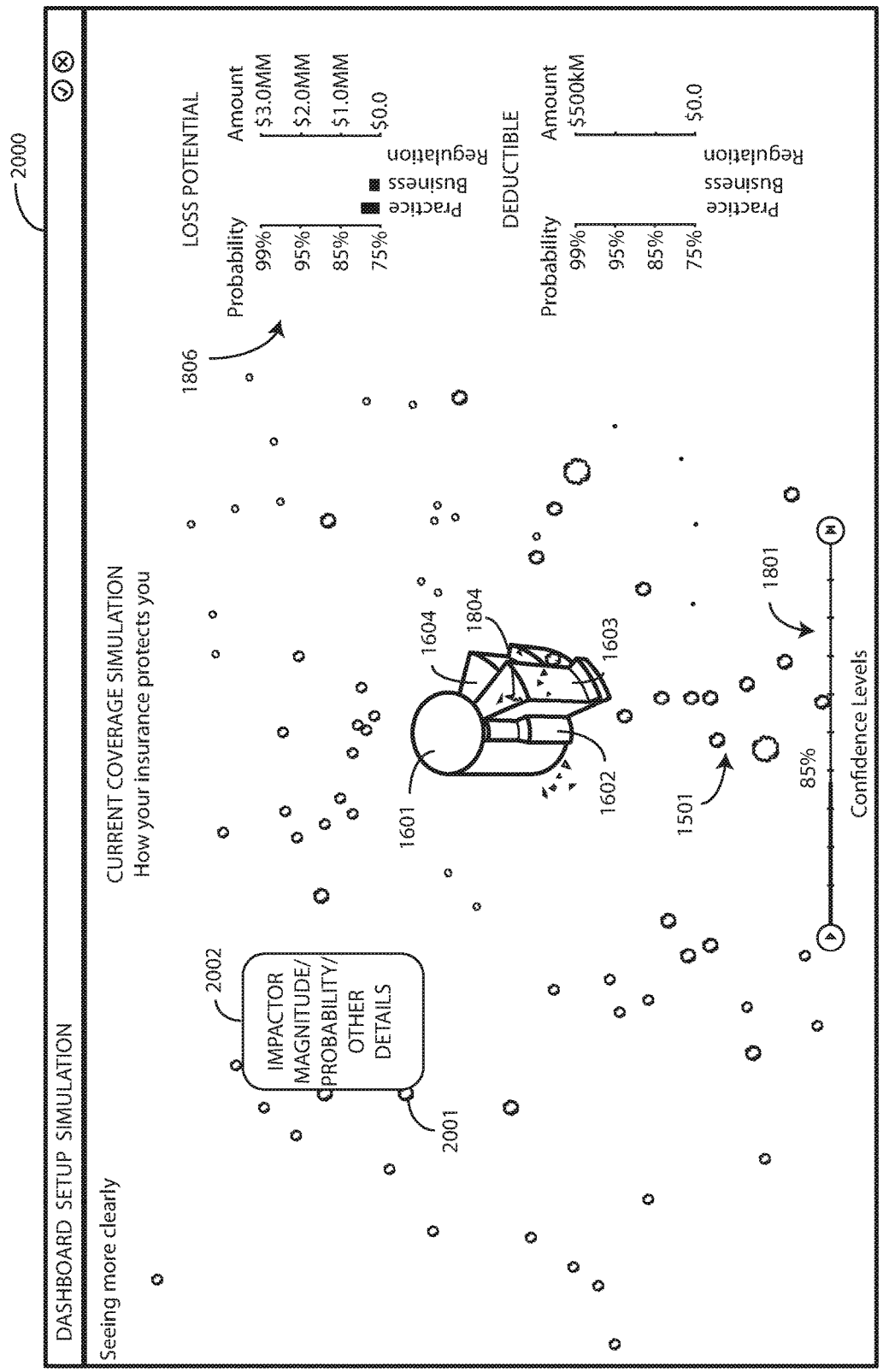
FIG. 21 illustrates still another example of visualized data in accordance with one or more embodiments of the disclosure.

Turning now to FIG. 21, illustrated therein is the visualization object 2000 of FIG. 20. However, in FIG. 21 the entity type graphical object 1601 and the one or more impactor mitigator graphical objects 1602,1603,1604 have been pivoted from the side elevation view of FIG. 20 to a perspective view in FIG. 21. This view allows the effects of impactor graphical objects 1501 impacting the impactor mitigator graphical objects 1602,1603,1604 to be seen in one or more embodiments of the disclosure.

As shown in FIG. 21, in one or more embodiments when an impactor graphical object 1804 impacts an impactor mitigator graphical object, e.g., impactor mitigator graphical object 1602, its height, width, or combinations thereof can be reduced to depict the reduction in one or both of the magnitude of mitigation the impactor mitigator graphical object 1602 can provide for any one single impactor and/or the magnitude of mitigation the impactor mitigator graphical object 1602 can provide prior to depletion. In this illustrative embodiment, both the height and width have been decreased, thereby illustrating the reduced potency of the impactor mitigator graphical object 1602. Similarly, the heights and width of impactor mitigator graphical objects 1602,1603 have been reduced due to the interactions with the impactor graphical objects 1501 that have occurred from the zero percent confidence level to the eighty-five percent confidence level.

In one or more embodiments, the animation described across FIGS. 18-21 proceeds, visually, like a temporal video. However, events in the animation described across FIGS. 18-21 do not occur as a function of time. They instead occur as a function of confidence level, as indicated by the confidence level meter 1801. In effect, during the visualization described across FIGS. 18-21, as confidence level increases, the magnitudes associated with the impactor graphical objects 1501 that interact and affect the entity type graphical object 1601 and/or the one or more impactor mitigator graphical objects 1602,1603,1604 become greater and greater. Integrated adverse effects of the impactor graphical objects 1501 interacting and affecting the entity type graphical object 1601 and/or the one or more impactor mitigator graphical objects 1602,1603,1604 can be presented in a tabular format alongside the animation as cumulative totals 1806 in one or more embodiments.

In one or more embodiments, the visualization object 2000 includes animation rules causing the impactor graphical objects 1501 to have metadata associated therewith. In one or more embodiments, this metadata comprises impactor specific information. Advantageously, the inclusion of this metadata allows a user to perform a terminal device interaction event interacting with a selected impactor graphical object with the controls of the animation to pause the animation and interact with an impactor graphical object 2001 to reveal an impactor information window 2002. In one or more embodiments, the impactor information window 2002 reveals a graphical presentation of the description of the impactor graphical object 223, e.g., its type, severity type, magnitude, probability of occurrence, and other information. Illustrating by example, if the impactor is a fire occurrence having a magnitude of twenty-five million units and occurring at the ninety-five percent confidence level, a terminal device interaction event interacting with this impactor graphical object 2001 would reveal these or other facts in the impactor information window in one or more embodiments.

Figure 22:
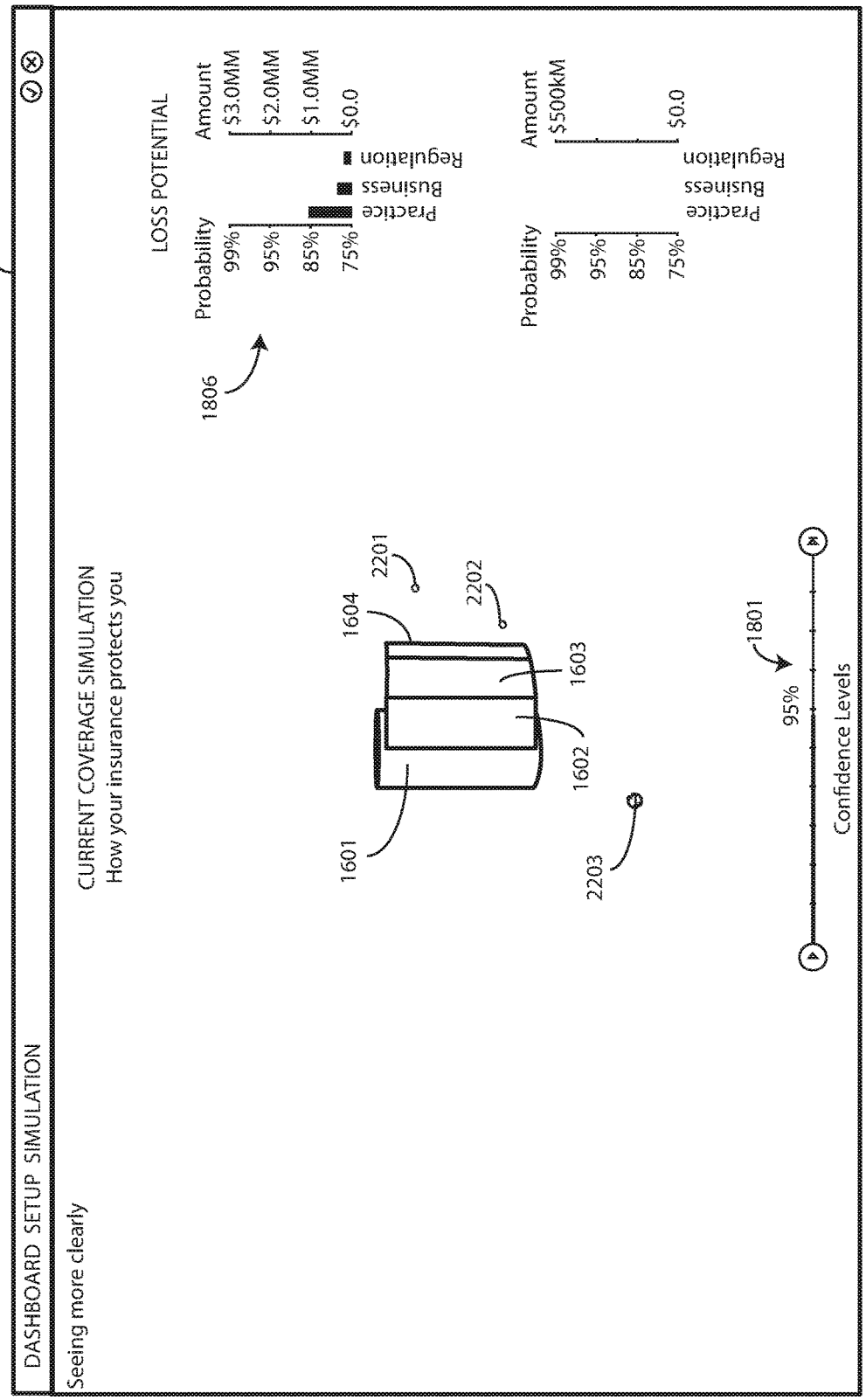
FIG. 22 illustrates still another example of visualized data in accordance with one or more embodiments of the disclosure.

In one or more embodiments, the animation proceeds until the 99.9 percent confidence level is reached. For example turning now to FIG. 22, illustrated therein is another visualization object 2200 in accordance with one or more embodiments of the disclosure. As shown in FIG. 22, the confidence level, as represented by the confidence level meter 1801, as moved from the eighty-five percent of FIG. 21 to about ninety-five percent. Accordingly, there are now only three impactor graphical objects 2201,2202,2203 left that may impact either the entity type graphical object 1601 or the one or more impactor mitigator graphical objects 1602,1603,1604.

As with FIG. 22, the cumulative totals 1806 of the magnitudes of the adverse affects that are borne by the entity type graphical object 1601 in response to the impactor graphical objects 2201,2202,2203 impacting either the entity type graphical object 1601 or the one or more impactor mitigator graphical objects 1602,1603,1604 has further increased. In the illustrative embodiment of FIG. 22, these cumulative totals 1806 illustrate the fact that the entity type graphical object 1601 has sustained about one million units of adversity due to practice type impactors hitting the entity type graphical object 1601, about four hundred thousand units of adversity due to business type impactors hitting the entity type graphical object 1601, and about two hundred thousand units of adversity due to regulatory impactors hitting the entity type graphical object 1601.

Figure 23:
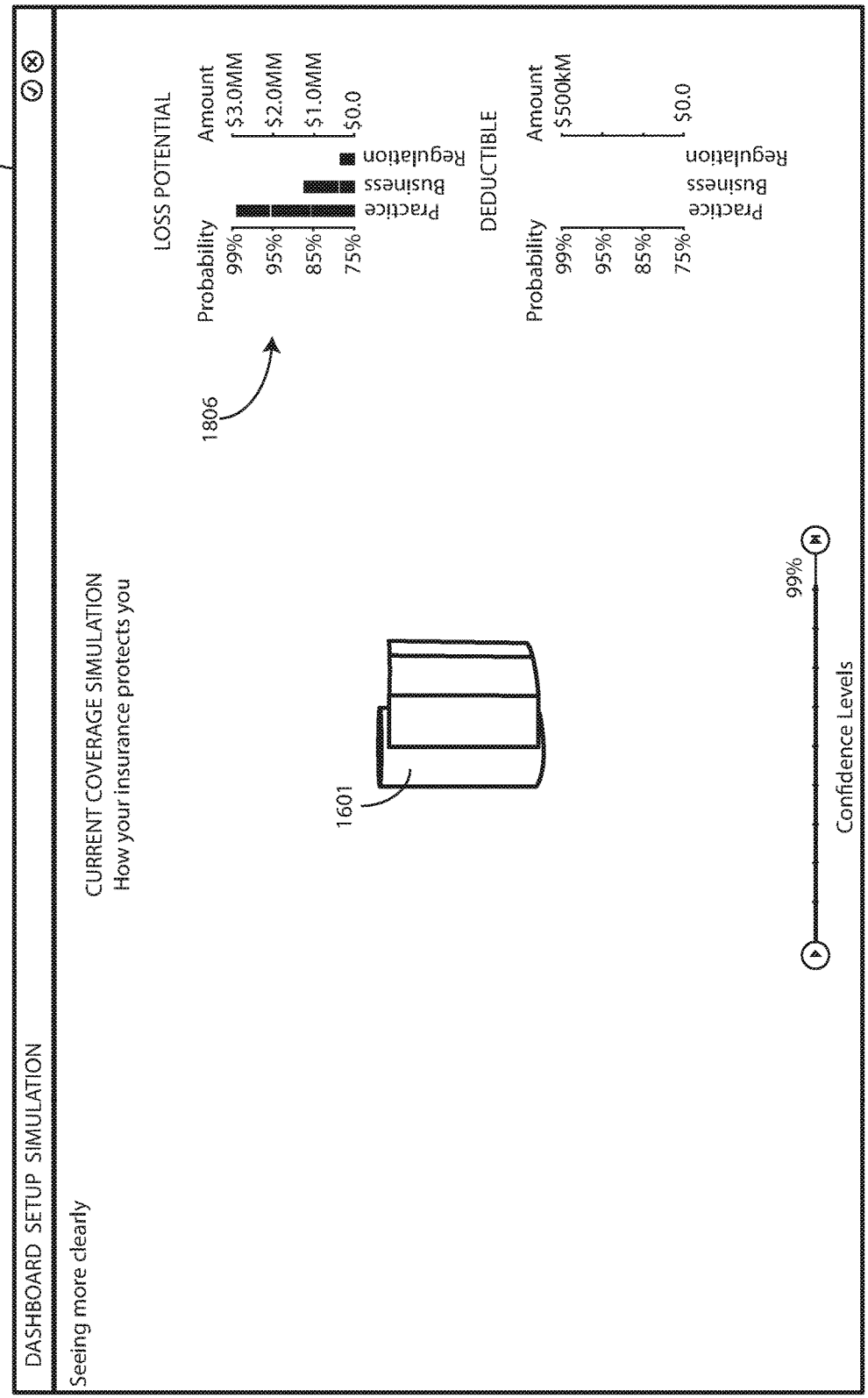
FIG. 23 illustrates another example of visualized data in accordance with one or more embodiments of the disclosure.

Turning now to FIG. 23, the 99.9 percent confidence level is reached. As illustrated by the cumulative totals, those last three impactor graphical objects 2201,2202,2203 remaining between the ninety-five percent confidence level and the 99.9 percent confidence level were real whoppers with extremely high magnitudes. As shown, these cumulative totals 1806 illustrate the fact that the entity type graphical object 1601 has sustained about 2.2 million units of adversity due to practice type impactors hitting the entity type graphical object 1601, about one million units of adversity due to business type impactors hitting the entity type graphical object 1601, and about four hundred thousand units of adversity due to regulatory impactors hitting the entity type graphical object 1601.

In the description above referring to FIGS. 4 and 14-23 has been directed at providing a visualization system that generates visualization objects representing a present state of an entity and its impactor mitigators. For example, the receipt, or retrieval, of entity-defining information such as that shown above with reference to FIG. 6 was used to generate an entity type visualization object, with this entity type visualization object representing the current state of the entity.

Similarly, impactor mitigator information was received, or retrieved, to generate an impactor mitigator graphical object. As with the entity-defining information, to this point the impactor mitigator information was received from user input indicating what impactor mitigators are accessible to the entity, which are in use, the details of how these impactor mitigators function, and so forth. In some embodiments, the current impactor mitigator information corresponding to the entity identified from the entity-defining information received and/or retrieved was retrieved from an indexed entity data structure or other persistent storage devices or memory devices.

Again, this information, which was used to generate the impactor mitigator graphical objects, was used in the visualization system to demonstrate a current state of the impactor mitigators, as well as how the entity would fare under the strain of impactors given that current impactor mitigator structure. Entity type visualization objects and one or more impactor mitigator graphical objects were generated from information corresponding to a current state of the entity.

Figure 5:
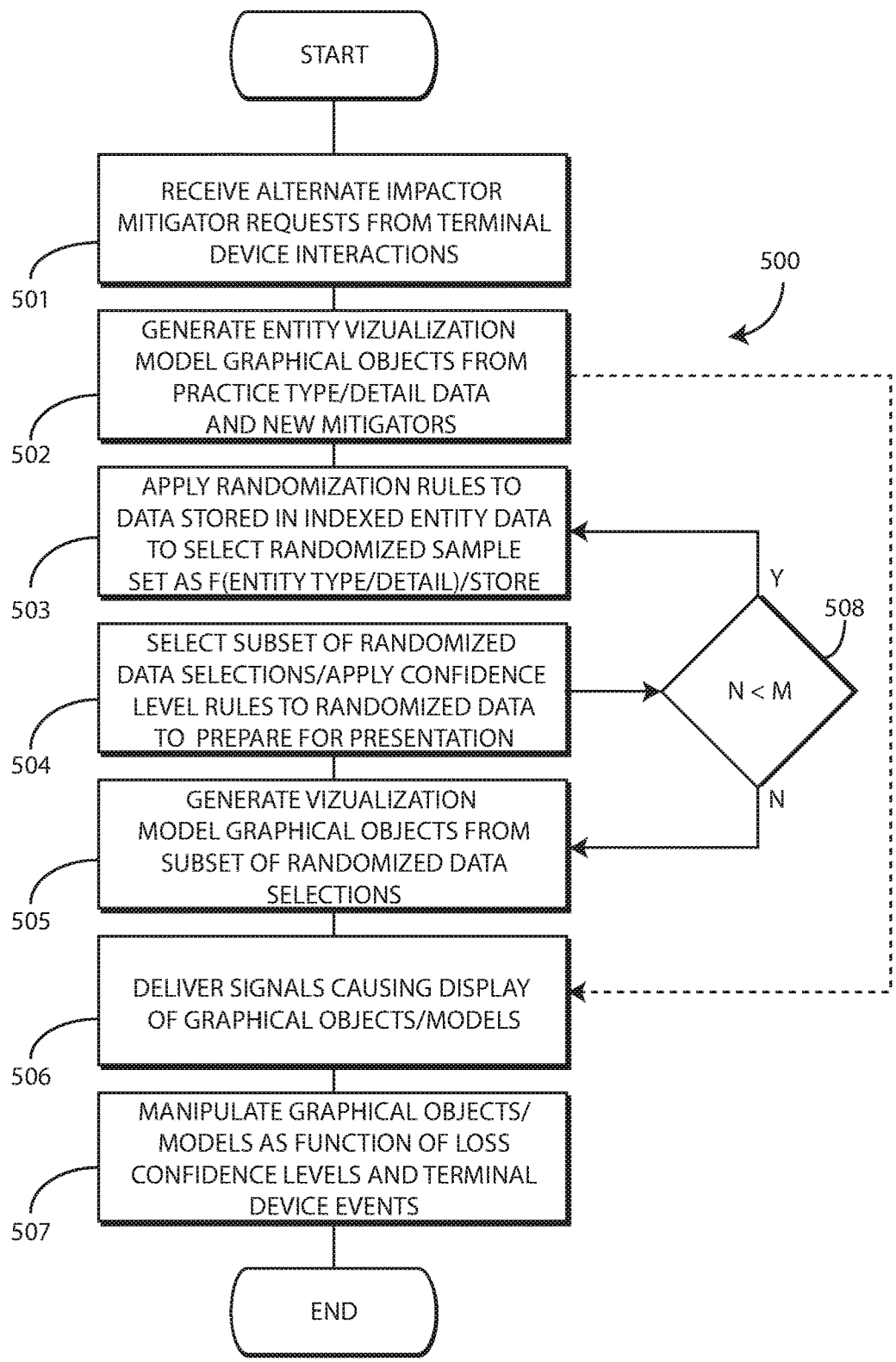
FIG. 5 illustrates another explanatory method in accordance with one or more embodiments of the disclosure.

Embodiments of the disclosure contemplate that it can be advantageous to provide visualizations that illustrate comparatively how the entity would fare with a more robust impactor mitigator schema. Accordingly, in one or more embodiments an optimized or improved impactor mitigator strategy is selected for the entity structure for use in a subsequent visualization. In one or more embodiments, the optimized or improved impactor mitigator strategy is used to generate a visualization demonstrating how much better the entity would fare under an improved impactor mitigator strategy. Turning now to FIG. 5, illustrated therein is one method 500 by which this can occur.

Beginning at step 501, the method 500 selects an optimized impactor mitigator strategy for the entity structure that mitigates affects of one or more of the impactor graphical objects interacting with the entity type graphical object in the prior visualization, which was described above with reference to FIGS. 14-23. In one or more embodiments, step 501 selects the optimized impactor mitigator strategy in response to terminal device interaction events. Accordingly, after viewing the visualization of FIGS. 14-23, user input in the form of terminal device interaction events can be converted to computer-readable signal media. In one or more embodiments, step 501 comprises receiving such computer-readable signal media at least one terminal devices.

The computer-readable signal media can indicate a variety of requests regarding the impactor mitigator performance occurring in the visualization of FIGS. 14-23. For example, in one or more embodiments the terminal device interaction events may indicate a desire to obtain new impactor mitigators in response to certain types of impactors being considered problematic during the first animation.

In other embodiments, step 501 may comprise receiving computer-readable signal media may identify terminal device interaction events identifying options for adding, removing, increasing, or decreasing impactor mitigator specifications. In one or more embodiments, these impactor mitigator specifications can include the type of impactor an existing or desired impactor mitigator mitigates, the magnitude of mitigation the impactor mitigator can provide for any one single impactor, the magnitude of mitigation the impactor mitigator can provide prior to depletion, and/or the threshold below which the impactor mitigator will be ineffective.

In one or more embodiments, the computer-readable signal media received at step 501 is received from terminal device interaction events occurring in response to insufficiencies of these metrics occurring during the initial visualization of FIGS. 14-23. In one or more embodiments, step 501 further comprises extracting requests for changes in the type of impactor an existing or desired impactor mitigator mitigates, the magnitude of mitigation the impactor mitigator can provide for any one single impactor, the magnitude of mitigation the impactor mitigator can provide prior to depletion, and/or the threshold below which the impactor mitigator will be ineffective from the received computer-readable signal media.

In one or more embodiments, step 501 then comprises selecting optimized impactor mitigator implementations that satisfy the requests for changes in the type of impactor an existing or desired impactor mitigator mitigates, the magnitude of mitigation the impactor mitigator can provide for any one single impactor, the magnitude of mitigation the impactor mitigator can provide prior to depletion, and/or the threshold below which the impactor mitigator will be ineffective. Once this occurs, the method moves to step 502.

In one or more embodiments, step 502 comprises generating one or more impactor mitigator graphical objects from the information received at step 501. Techniques for how this can be accomplished are described above with reference to FIGS. 8 and 13. Others will be obvious to those of ordinary skill in the art having the benefit of this disclosure.

In one or more embodiments, the impactor data used in the visualization of FIGS. 14-23 can simply be used again in subsequent visualizations. Where this occurs, the method 500 can optionally proceed to step 506.

However, in other embodiments, new impactor data can be selected. Some entities may prefer that a newly randomized set of impactor data be selected to ensure that there is no "curve fitting" occurring by selecting new impactor mitigators that only satisfy the impactor data occurring in the visualization of FIGS. 14-23. Accordingly, the entity may want new impactor data selected, and new visualizations run, one, two, three, or more times. Accordingly, the method 500 of FIG. 5, including steps 503-505, can be repeated as many times as necessary.

Where new impactor data is desired, the method 500 moves from step 502 to step 503. In one or more embodiments, step 503 selects impactor data that will be used in the new visualization, and with the optimized impactor mitigator information received at step 501. In one or more embodiments, step 503 comprises applying randomization rules to select a randomized impactor sample set, as previously described. In one or more embodiments, step 503 comprises selecting the impactor data solely based upon the class code received with the method (400) of FIG. 4 and used in the visualization of FIGS. 14-23. As noted above, in other embodiments, step 503 may include considering information beyond these class codes.

Thus, in one or more embodiments step 503 comprises selecting a sample set of impactor data as a function of the entity type, the class code, and/or entity-identifying information. However, in other embodiments step 503 comprises selecting a sample set of impactor data as a function of class code only. In still another embodiment, step 503 comprises selecting a sample set of impactor data as a function of the number of medical professionals working for the entity and a frequency that impactors are expected to impact each doctor working for the medical entity, as previously described.

In still other embodiments, step 503 comprises selecting a sample set of impactor data independent of any entity-identifying information. When operating in this mode, the method 500, when executed by one or more processors, improves the way that the one or more processors retrieve the impactor data by increasing the speed at which step 503 occurs. Accordingly, upon determining the number of impactors to select, in one or more embodiments step 503 comprises ignoring associations between the entity type and any of the impactors, and instead selecting impactor data independent of any entity-identifying information to provide a specific improvement in the way one or more processors executing step 503 operate.

Regardless of whether the impactors are selected at step 503 from the impactor data as a function of markers specifically identifying an entity type or structure, or by ignoring such markers, in one or more embodiments step 503 comprises selecting these impactor data so that they realistically represent impactors that a particular entity structure may experience. One technique for doing this was described above with reference to FIG. 9. Others will be obvious to those of ordinary skill in the art having the benefit of this disclosure.

Step 504 then selects a subset of the sample set of impactor data selected at step 503 for use in the subsequent visualization. One technique for performing step 504 was described above with reference to FIG. 10. Other methods will be obvious to those of ordinary skill in the art having the benefit of this disclosure.

Optional decision 508 can determine how many times step 503 and step 504 can occur. As with the method of FIG. 4, in one or more embodiments step 503 and step 504 occur multiple times such that the selection of impactor data occurring at step 504 can draw from a larger sample of impactor data.

In one or more embodiments, the number of repetitions determined at decision 508 occurs in response to the application of rules as described above with reference to FIG. 9. Thus, in one or more embodiments decision 508 employs gamma and Poisson functions, as described in FIG. 9, where an M value greater than one advantageously causes a predefined number of impactor data sets to be selected. In one or more embodiments, each iteration models impactors across a predefined time interval, with the predefined number of simulations representing a predefined number of those time intervals. In one or more embodiments, the predetermined time interval is one year. In one or more embodiments, the predefined number of years is ten years. In another embodiment, the predefined number of years is one hundred years. In still another embodiment, the predefined number of years is one thousand years. Still other numbers of years will be obvious to those of ordinary skill in the art having the benefit of this disclosure.

Step 505 optionally correlates the visualization impactor data set received from step 504 to a given entity structure. In one or more embodiments, step 505 optionally comprises correlating the visualization impactor data set received from step 504 with a given entity structure. Step 505 can comprise correlating the visualization impactor data set received from step 504 with a given entity structure as a function of many different entity identifiers, including a number of physicians, specialty type, number of procedures, number of beds, number of outpatient visits, and so forth.

In one or more embodiments, step 505 also generates impactor graphical objects from the visualization impactor data set received from step 504. In one or more embodiments, step 505 generates these impactor graphical objects by applying one or more modeling rules. One method for accomplishing this was described above with reference to FIG. 11. Others will be obvious to those of ordinary skill in the art having the benefit of this disclosure.

Step 506 comprises delivering visualization data to a terminal device and causing the visualization to run (animate) in response to one or more terminal device events. Step 507 comprises manipulating the graphical objects and visualizations in response to terminal device interactions occurring at various user controls presented at the terminal device.

Turning now to FIGS. 24-28, illustrated therein are various examples of how the subsequent visualization, which uses the optimized impactor mitigator information received at step (501) of the method (500) of FIG. 5 above, can occur. Continuing the example of FIGS. 14-23 in which the entity type was a medical practice, in the embodiment of FIGS. 24-28 the impactors will again comprise loss liability risks. Additionally, the impactor mitigators will comprise liability protection mechanisms. However, as noted above, in other embodiments, other entity types, impactors, and impactor mitigators can be substituted for those used in FIGS. 24-28 for illustration purposes.

Figure 24:
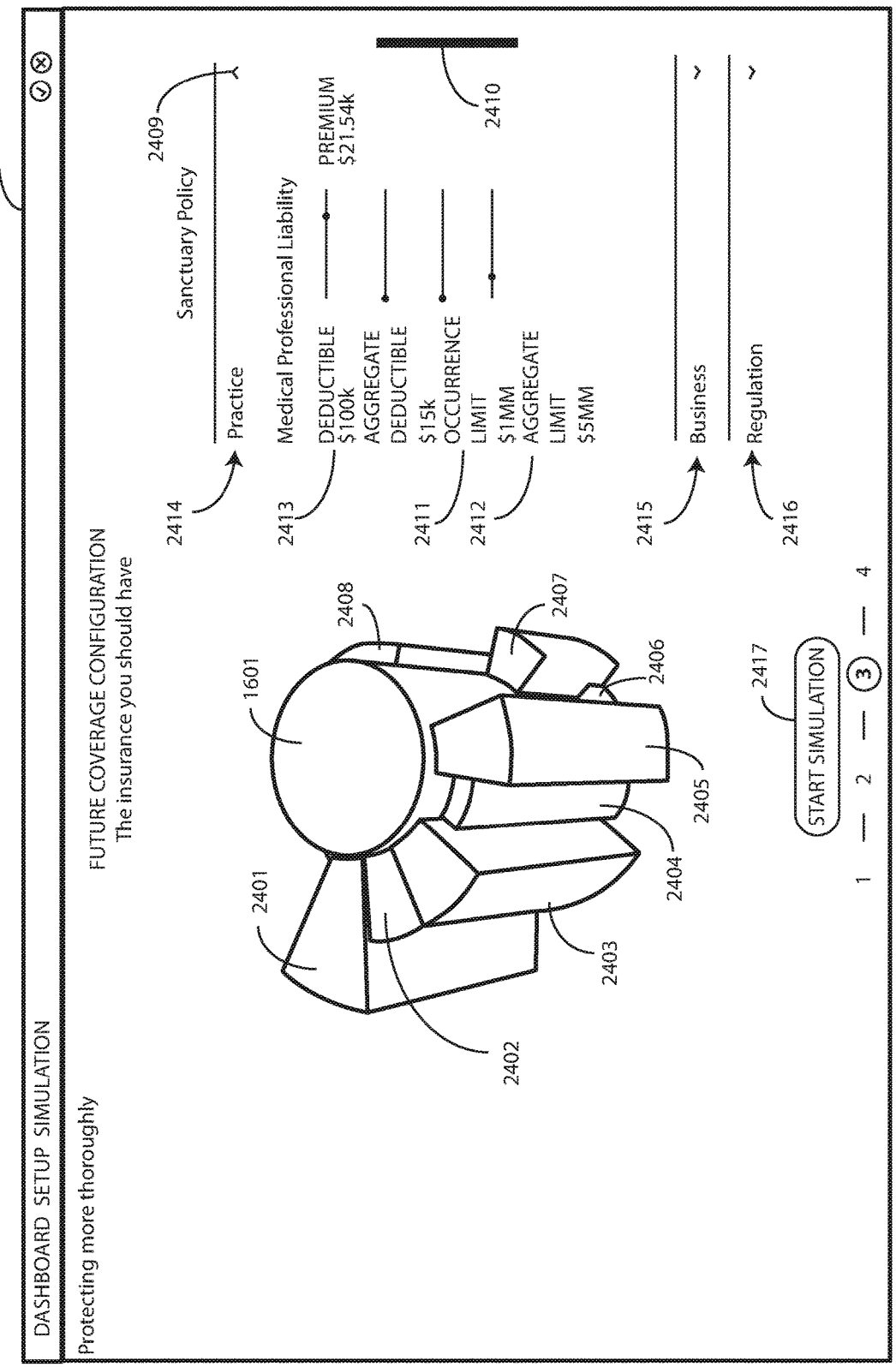
FIG. 24 illustrates another example of visualized data in accordance with one or more embodiments of the disclosure.

Beginning at FIG. 24, illustrated therein is a visualization object 2400 associated with the subsequent simulation utilizing impactor mitigator graphical objects 2401,2402,2403, 2404, 2405,2406,2407,2408 generated from the optimized impactor mitigator information received at step (501) of the method (500) of FIG. 5 above. As shown in FIG. 24, in one or more embodiments the entity type graphical object 1601 remains the same as shown above in FIGS. 14-23. However, the one or more impactor mitigator graphical objects 2401, 2402,2403,2404, 2405,2406,2407,2408 are new.

In one or more embodiments, the visualization object of FIG. 24 only presents the entity type graphical object 1601 and/or the one or more impactor mitigator graphical objects 2401,2402,2403,2404,2405,2406,2407,2408. Thus, as shown in FIG. 24, in one or more embodiments the impactor graphical objects are not yet presented.

This absence of the impactor graphical objects allows for a few things to occur: First, it allows a viewer to examine and inspect the entity type graphical object 1601 and/or the one or more impactor mitigator graphical objects 2401,2402, 2403,2404,2405,2406,2407, 2408 initially without visual interference from the impactor graphical objects.

Second, it allows for details of the one or more impactor mitigator graphical objects 2401,2402,2403,2404,2405, 2406,2407, 2408 to be inspected using one or more pull down menus 2414,2415,2416. As shown in FIG. 24, a first user actuation target 2409 has been actuated, thereby causing a first pull down menu 2414 to become active. In one or more embodiments, each pull down menu 2414,2415,2416 is associated with a different type of impactor mitigator.

Illustrating by example, in this embodiment pull down menu 2414 is associated with a first type of impactor mitigator, which is a practice type impactor mitigator. Similarly, the second pull down menu 2415 is associated with a second type of impactor mitigator, which in this example is a business type impactor mitigator. The third pull down menu 2416 is associated with a third type of impactor mitigator, which in this example is a regulation impactor mitigator. Additional pull down menus can be presented as well. A slide control 2410 can be used to navigate between the pull down menus that are shown and those that may be hidden from view in the visualization object 2400.

In one or more embodiments, actuation of the user actuation target 2409 causes information about the specific type of impactor mitigator to be presented. For example, actuation of user actuation target 2409 causes information such as the magnitude of mitigation 2411 the impactor mitigator can provide for any one single impactor, the magnitude of mitigation 2412 the impactor mitigator can provide prior to depletion, and/or the threshold 2413 below which the impactor mitigator will be ineffective. Other information is shown in FIG. 24. Still other presentable information will be obvious to those of ordinary skill in the art having the benefit of this disclosure.

Figure 25:
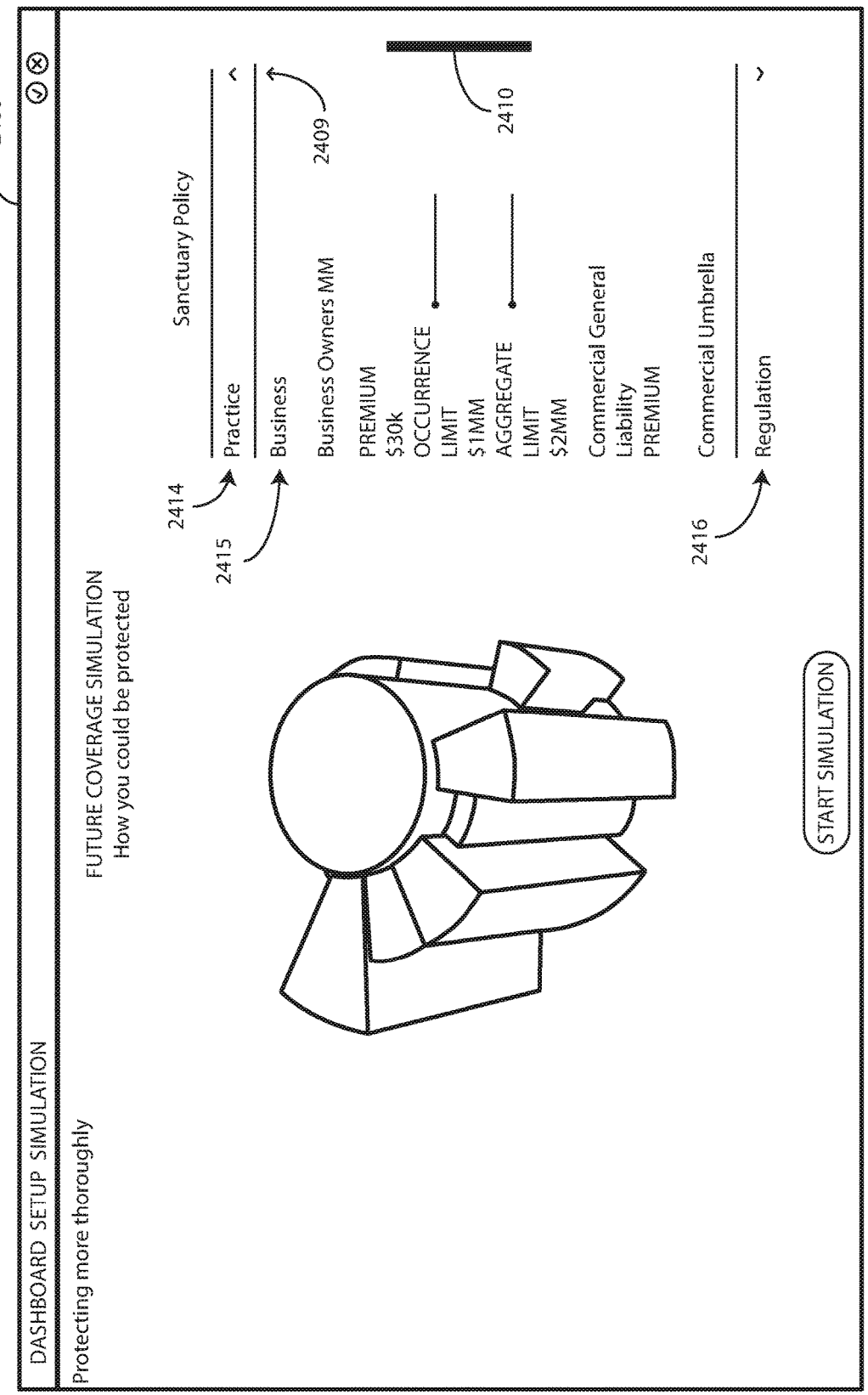
FIG. 25 illustrates another example of visualized data in accordance with one or more embodiments of the disclosure.

Actuating different user actuation targets causes information with different types of impactor mitigators to be shown. Illustrating by example, turning now to FIG. 25, illustrated therein is the visualization object 2400 of FIG. 24. However, user actuation target 2515 has been actuated, thereby causing the first pull down menu 2414 to collapse, with the information of the second pull down menu 2415 being exposed.

This process can repeat for each of the various pull down menus 2414,2415,2416, including those not shown, but which can be accessed with the slide control 2410. For example, turning now to FIG. 26, user actuation target 2604 has been actuated, thereby causing the second pull down menu 2415 to collapse, with the information of the second pull down menu 2416 being exposed.

Figure 26:
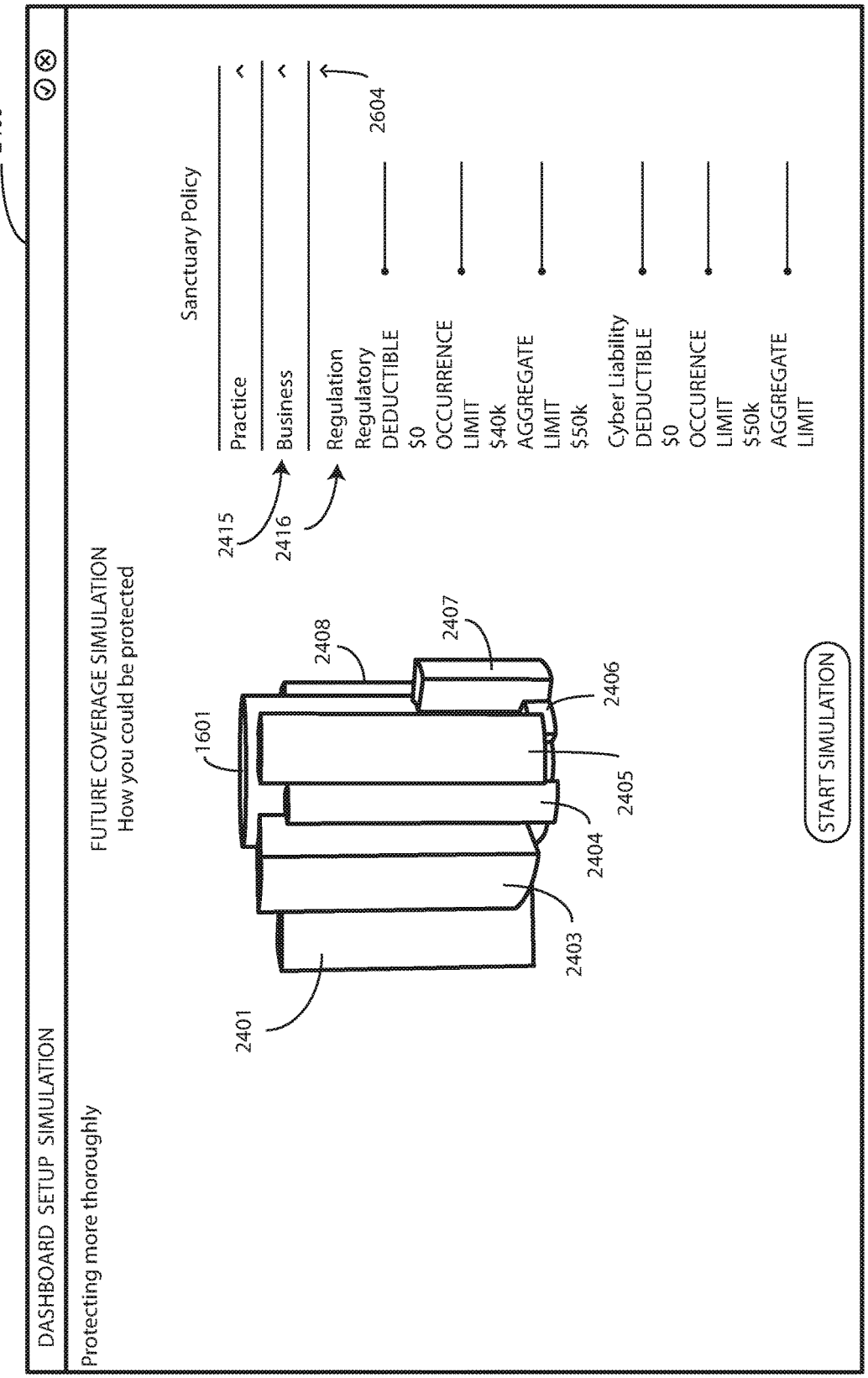
FIG. 26 illustrates another example of visualized data in accordance with one or more embodiments of the disclosure.

In one or more embodiments, the entity type graphical object 1601 and/or the one or more impactor mitigator graphical objects 2401,2403,2404,2405,2406,2407, 2408 are presented initially in a side elevation view, as shown in FIG. 26. However, in one or more embodiments visualization objects embed animation rules allowing the entity type graphical object 1601 and/or the one or more impactor mitigator graphical objects 2401, 2403,2404,2405,2406, 2407,2408 to be manipulated.

Illustrating by example, and turning now back to FIG. 24, here the entity type graphical object 1601 and/or the one or more impactor mitigator graphical objects 2401,2402,2403, 2404,2405, 2406,2407,2408 have been panned and/or spun from the initial side elevation view to a perspective view. Advantageously, this allows a viewer interacting with the visualization object 2400 at a terminal device to "spin around" or "flip around" the entity type graphical object 1601 and/or the one or more impactor mitigator graphical objects 2401,2402,2403, 2404,2405,2406,2407,2408 for closer inspection.

Once the inspection of the entity type graphical object 1601 and/or the one or more impactor mitigator graphical objects 2401,2402,2403,2404,2405,2406,2407,2408 is complete, in one or more embodiments the visualization object 2400 includes a user actuation target 2417 that launches a visualization of how one or more impactors represented by the various impactor graphical objects selected in accordance with either the method (400) of FIG. 4, and reused here, or selected in accordance with the method (500) of FIG. 5 affect the entity type graphical object 1601 and/or the one or more impactor mitigator graphical objects 2401,2402, 2403,2404,2405,2406,2407,2408. To launch the visualization, in one or more embodiments a user may employ a mouse or other visualization data navigation tool to navigate to the user actuation target 2417 to interact with the user actuation target 2417.

Figure 27:
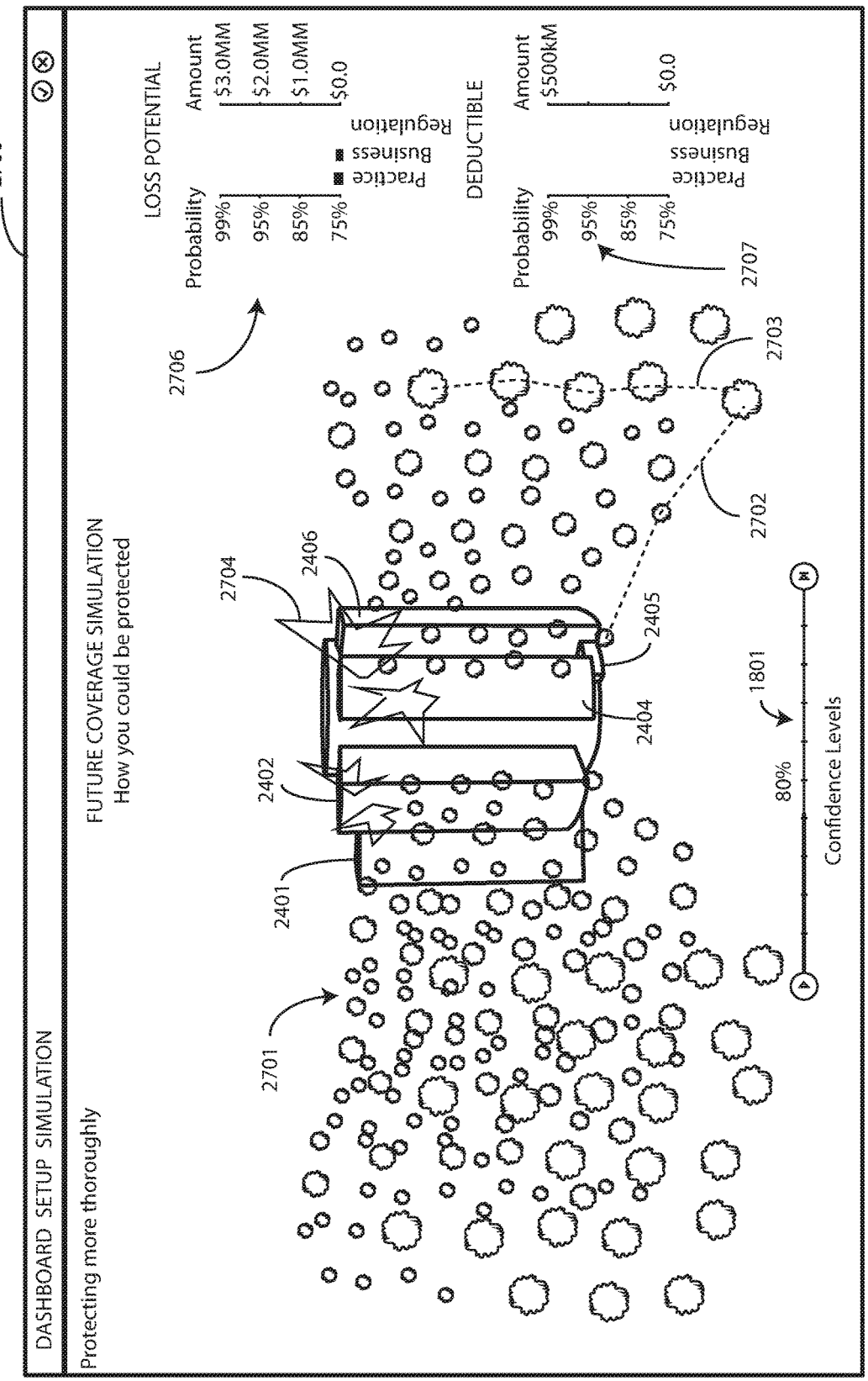
FIG. 27 illustrates another example of visualized data in accordance with one or more embodiments of the disclosure.

Turning now to FIG. 27, illustrated therein is another visualization object 2700 in accordance with one or more embodiments of the disclosure. As shown in FIG. 27, in one or more embodiments the visualization object 2700 embeds animation rules causing the impactor graphical objects 2701 selected in accordance with either the method (400) of FIG. 4, and reused, or selected in accordance with the method (500) of FIG. 5 to be introduced around the entity type graphical object 1601 and/or the one or more impactor mitigator graphical objects 2401,2402,2404,2405,2406.

In one or more embodiments, the impactor graphical objects 2701 of FIG. 27 can be configured move in an animated fashion about the entity type graphical object 1601 and/or the one or more impactor mitigator graphical objects 2401,2402,2404,2405,2406, as described above with reference to FIG. 16. For example, the impactor graphical objects 2701 can move in a circular fashion about the entity type graphical object 1601 and/or the one or more impactor mitigator graphical objects 2401,2402,2404,2405,2406 so as to encircle the entity type graphical object 1601 and/or the one or more impactor mitigator graphical objects 2401,2402, 2404,2405,2406. As noted above, this introduces a stressor into the visualization as the eeriness of these microbe or germ like impactor graphical objects 2701 swirling about the entity type graphical object 1601 and/or the one or more impactor mitigator graphical objects 2401,2402,2404,2405, 2406 provides a visual cue that each will have an adverse impact on one or both of the entity type graphical object 1601 and/or the one or more impactor mitigator graphical objects 2401,2402,2404,2405,2406 when they collide with the same.

However, in the illustrative embodiment of FIG. 27 the impactor graphical objects 2701 are presented in columns and rows extending radially out from each impactor mitigator graphical object, with the types of impactor mitigator graphical objects 2401,2402,2404,2405,2406 being aligned radially with the type of impactor graphical object 2701 the impactor mitigator graphical objects 2401,2402,2404,2405, 2406 mitigate. Illustrating by example, if impactor mitigator graphical object 2404 is a first type of impactor mitigator, in one or more embodiments a radial row 2702 that includes a plurality of columns, e.g., column 2703, of impactor graphical objects 2701 is presented in the visualization object 2700. In one or more embodiments, this allows the impactor graphical objects 2701 situated within the radial row 2702 to fly directly at the corresponding impactor mitigator graphical object 2404 along a radial path rather than circling. In one or more embodiments, this more orderly visualization arrangement and sorting of the impactor graphical objects 2701 identifies both the fact that the optimizer of the optimized impactor mitigator strategy truly understands the risks to the entity resulting from the impactor graphical objects 2701 and the fact that the optimized impactor mitigator strategy will truly manage this risk. Other configurations for the impactor graphical objects 2701 will be obvious to those of ordinary skill in the art having the benefit of this disclosure.

In the illustrative embodiment of FIG. 27, a confidence level meter 1801 is once again presented to show at what confidence level the visualization is currently presenting. In FIG. 27, the confidence level is about eighty percent. Accordingly, quite a few impactor graphical objects 2701 have hit the entity type graphical object 1601 and/or the one or more impactor mitigator graphical objects 2401,2402, 2404,2405,2406 to this point, as is evidenced by the explosions 2704 and debris 2705 occurring when the impactor graphical objects 2701 collide with the entity type graphical object 1601 and/or the one or more impactor mitigator graphical objects 2401,2402,2404,2405,2406. The confidence level of eighty percent means there is probability of only twenty percent that impactor graphical objects 2701 having a magnitude larger than those already impacting one or both of the entity type graphical object 1601 and/or the one or more impactor mitigator graphical objects 2401,2402, 2404,2405,2406 will impact one or both of the entity type graphical object 1601 and/or the one or more impactor mitigator graphical objects 2401,2402,2404,2405,2406.

Note that impactor mitigator graphical object (2403) has been depleted, and is no longer presented. This is due to the fact that in one or more embodiments, when an impactor graphical object impacts an impactor mitigator graphical object, its height, width, or combinations thereof can be reduced to depict the reduction in one or both of the magnitude of mitigation the impactor mitigator can provide for any one single impactor and/or the magnitude of mitigation the impactor mitigator can provide prior to depletion.

In one or more embodiments, cumulative totals 2706 of the magnitudes of the adverse affects that are borne by the entity type graphical object 1601 in response to the impactor graphical objects 2701 impacting either the entity type graphical object 1601 or the one or more impactor mitigator graphical objects 2401,2402,2404,2405,2406 can be presented to the side of the visualization. In the illustrative embodiment of FIG. 27, these cumulative totals 2706 comprise losses beyond those mitigated by the one or more impactor mitigator graphical objects 2401,2402,2404,2405, 2406. Other cumulative totals 2707 can comprise cumulative losses due to the accumulation of threshold losses below which the one or more impactor mitigator graphical objects 2401,2402,2404,2405,2406 are ineffective. Other cumulative totals for presentation to the side of the visualization will be obvious to those of ordinary skill in the art having the benefit of this disclosure.

Figure 28:
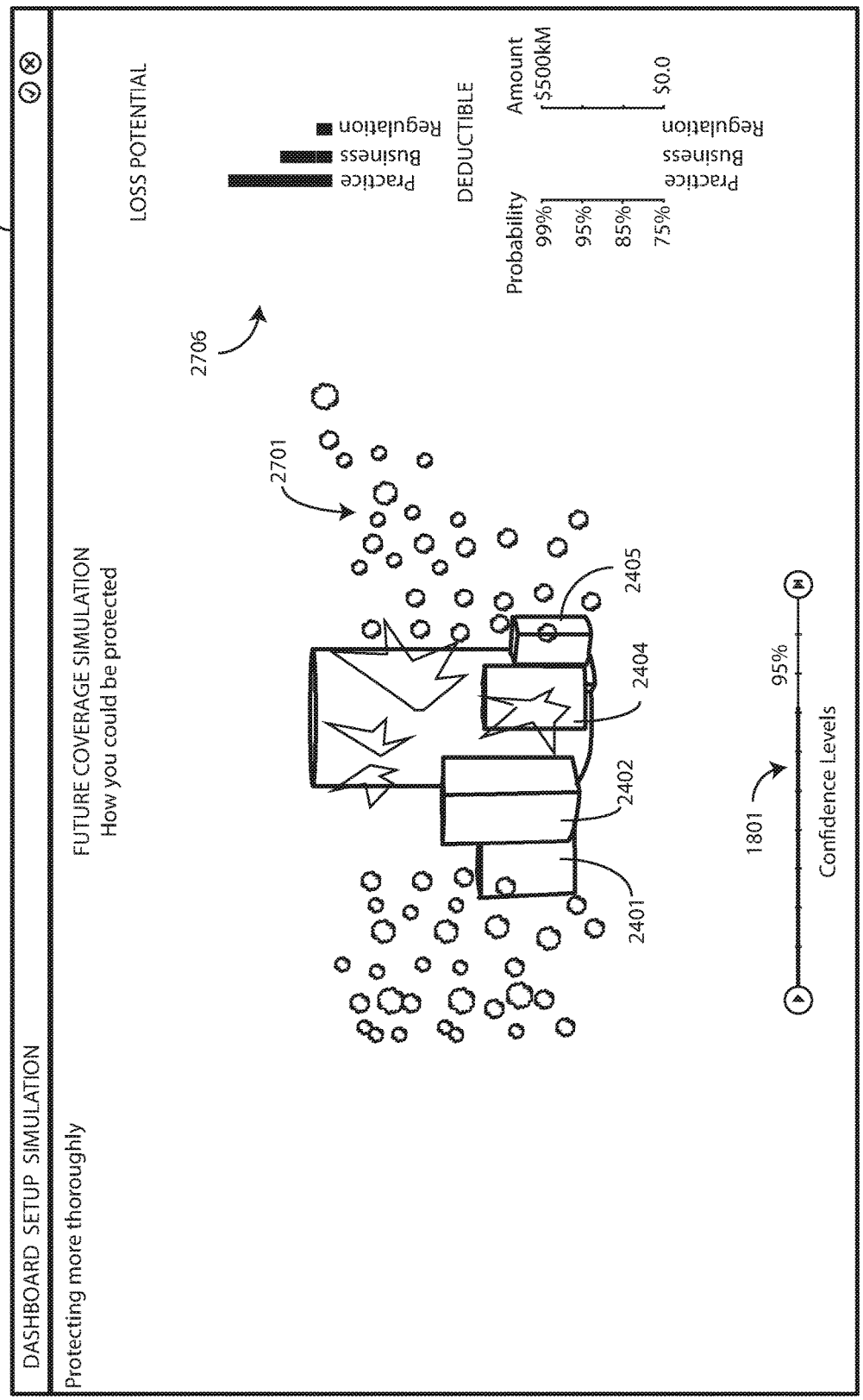
FIG. 28 illustrates another example of visualized data in accordance with one or more embodiments of the disclosure.

Turning now to FIG. 28, illustrated therein is another visualization object 2800 in accordance with one or more embodiments of the disclosure. As shown in FIG. 28, the confidence level, as represented by the confidence level meter 1801, as moved from the eighty percent of FIG. 27 to about ninety-five percent. Accordingly, there are fewer impactor graphical objects 2701 left that may impact either the entity type graphical object 1601 or the one or more impactor mitigator graphical objects 2401,2404,2404,2405. Additionally, notice that the heights and widths of the impactor mitigator graphical objects 2401,2404,2404,2405 have been reduced to depict the reduction in one or both of the magnitude of mitigation the impactor mitigator can provide for any one single impactor and/or the magnitude of mitigation the impactor mitigator can provide prior to depletion.

The cumulative totals 2706 of the magnitudes of the adverse affects that are borne by the entity type graphical object 1601 in response to the impactor graphical objects 2701 impacting either the entity type graphical object 1601 or the one or more impactor mitigator graphical objects 2401,2404,2404,2405 continue to increase. In the illustrative embodiment of FIG. 28, these cumulative totals 2706 have increased, illustrating the fact that the entity type graphical object 1601 has sustained about 2.5 million units of adversity due to practice type impactors hitting the entity type graphical object 1601, about one million units of adversity due to business type impactors hitting the entity type graphical object 1601, and about four hundred thousand units of adversity due to regulation type impactors hitting the entity type graphical object 1601.

Figure 12:
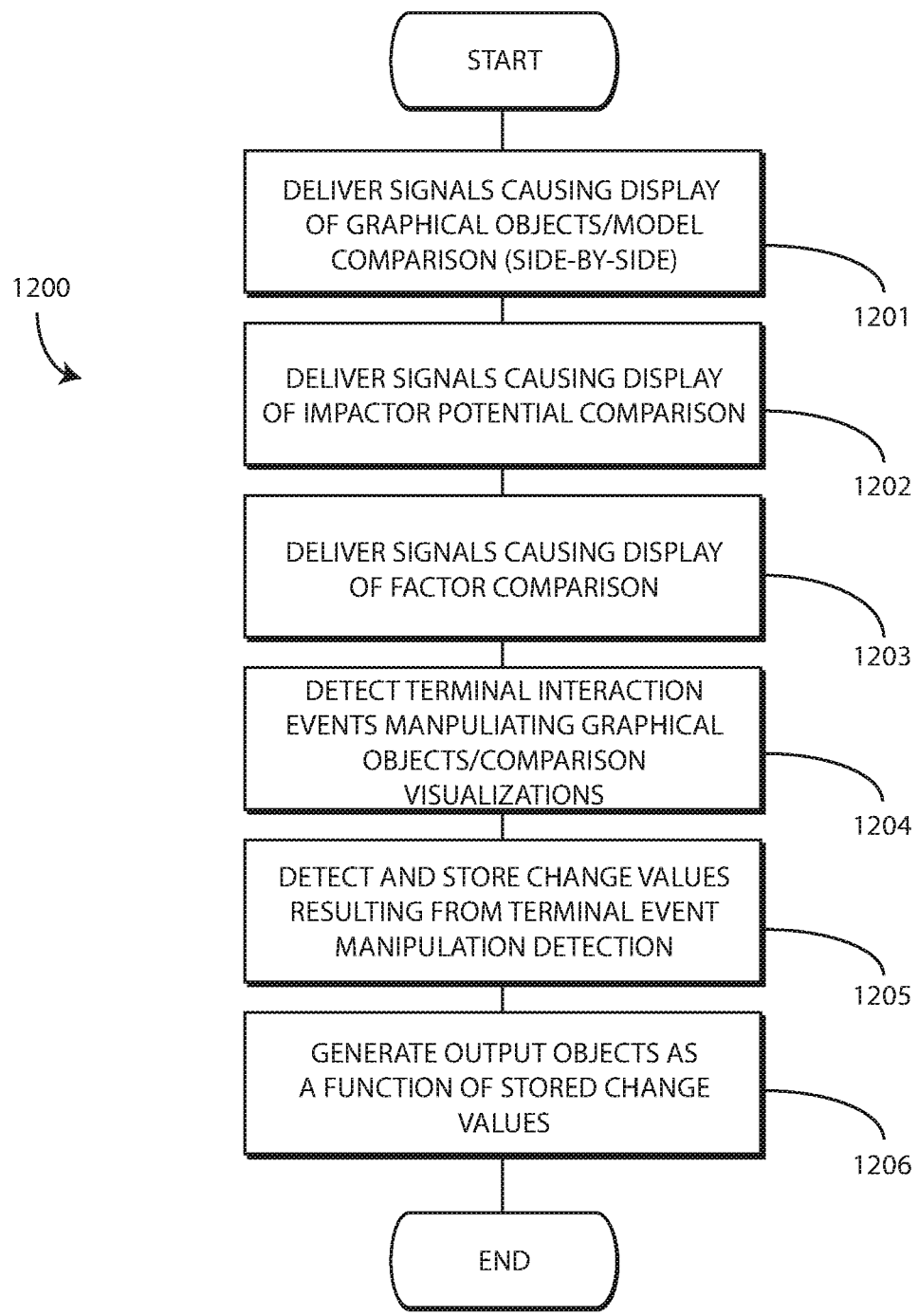
FIG. 12 illustrates one explanatory method in accordance with one or more embodiments of the disclosure.

As before, the second visualization continues until the 99.9 percent confidence level is reached. Embodiments of the disclosure contemplate that it can be advantageous to compare how the "as is" impactor mitigator strategy highlighted in the first visualization compares to the "optimized" impactor mitigator strategy highlighted in the subsequent visualization. Accordingly, in one or more embodiments the visualization system provides a comparison between the one or more impactor mitigator graphical objects presented in the initial animation and the optimized impactor mitigator graphical objects. Turning now to FIG. 12, illustrated therein is one explanatory method 1200 of how this can occur.

Beginning at step 1201, the method 1200 comprises delivering one or more computer-readable signal media causing a graphical comparison of the results of the performance of the "as is" impactor mitigator strategy highlighted in the first visualization to be simultaneously presented adjacent to the optimized impactor mitigator strategy highlighted in the subsequent visualization. At step 1202, the method 1200 comprises delivering one or more computer-readable signal media causing a graphical comparison of the cumulative totals of the first visualization to be simultaneously presented adjacent to the cumulative totals of the second visualization. At step 1203, method 1200 comprises delivering one or more computer-readable signal media causing a graphical comparison of the other cumulative totals of the first visualization to be simultaneously presented adjacent to the other cumulative totals of the second visualization. One such comparison is shown in FIG. 29.

Figure 29:
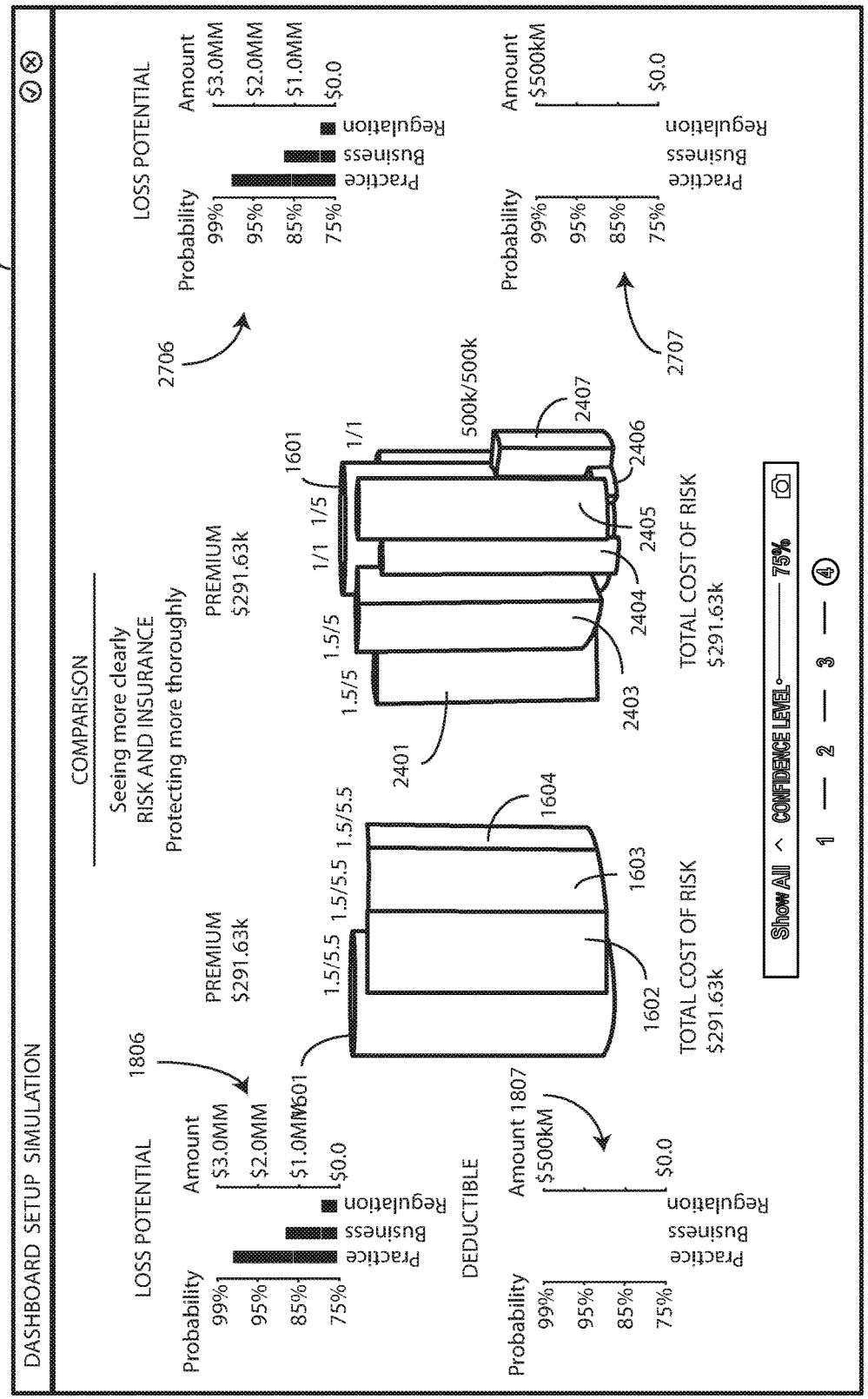
FIG. 29 illustrates another example of visualized data in accordance with one or more embodiments of the disclosure.

Turning now to FIG. 29, illustrated therein is one visualization object 2900 presenting a comparison of the results of the first visualization, illustrated above in FIGS. 14-23, which illustrated the effect of impactors on an entity structure with its "as-is" impactor mitigator strategy, and the results of the second visualization, illustrated above in FIGS. 24-28, which illustrated the effects of impactors on the entity structure with the "optimized" impactor mitigator strategy. In one or more embodiments, this comparison provides graphical object and tabular output results in a single visualization object 2900, as shown in FIG. 29.

In one or more embodiments, the entity type graphical object 1601 and the one or more impactor mitigator graphical objects 1602,1603,1604 from the first visualization are presented side-by-side and adjacent to the entity type graphical object 1601 and the one or more impactor mitigator graphical objects 2401,2403,2404,2405,2406,2407,2408 from the second visualization. Characteristics, such as information illustrating type of impactor an existing or desired impactor mitigator mitigates, the magnitude of mitigation the impactor mitigator can provide for any one single impactor, the magnitude of mitigation the impactor mitigator can provide prior to depletion, and/or the threshold below which the impactor mitigator will be ineffective, can all be presented in the visualization object 2900. In the illustrative embodiment of FIG. 9, the numbers above each impactor mitigator graphical objects 1602,1603,1604, 2401,2403, 2404,2405,2406,2407,2408 illustrate the magnitude of mitigation the impactor mitigator can provide for any one single impactor and the magnitude of mitigation the impactor mitigator can provide prior to depletion, with a slash therebetween.

In one or more embodiments, the cumulative totals 1806 from the first visualization illustrated above in FIGS. 14-23 can be presented adjacent to the cumulative totals 2706 from the second visualization illustrated above in FIGS. 24-28. In so doing, a viewer can immediately and efficiently compare the effects upon the entity when the "as-is" impactor mitigator strategy is employed, versus the corresponding impact upon the entity when the optimized impactor mitigator strategy is used. Similarly, other cumulative totals 1807, 2707 can be presented in a side-by-side arrangement as well. In this illustrative embodiment, the other cumulative totals illustrate the integration of thresholds below which the impactor mitigator will be ineffective, with other cumulative totals 1807 representing those accumulated thresholds from the first visualization illustrated above in FIGS. 14-23, and other cumulative totals 2707 representing those accumulative from the second visualization illustrated above in FIGS. 24-28.

In one or more embodiments, the visualization object 2900 embeds animation rules allowing one or both of the entity type graphical object 1601 and the one or more impactor mitigator graphical objects 1602,1603,1604 from the first visualization and/or the entity type graphical object 1601 and the one or more impactor mitigator graphical objects 2401,2403,2404,2405,2406,2407,2408 from the second visualization to be manipulated. Illustrating by example, in one or more embodiments either graphical object combination can be panned and/or spun between side elevation views, top plan views, and perspective views from various observation points. Advantageously, this allows a viewer interacting with the these graphical objects to be spun, pivoted, flipped, rotated, or otherwise repositioned to allow closer inspection of the differences between the entity type graphical object 1601 and the one or more impactor mitigator graphical objects 1602,1603,1604 from the first visualization and/or the entity type graphical object 1601 and the one or more impactor mitigator graphical objects 2401,2403, 2404,2405,2406, 2407,2408 from the second visualization.

It should be noted that the visualization object 2900 of FIG. 29 is illustrative only, and represents but one way in which the results of the first visualization and the second visualization can be compared. Numerous other ways of presenting this information will be obvious to those of ordinary skill in the art having the benefit of this disclosure.

Turning back to FIG. 12, in one or more embodiments step 1204 can comprise detecting terminal device interaction events manipulating graphical objects and/or comparison visualizations of the presented comparison. For example, in one or more embodiments terminal device interaction events can adjust information such as the presentation of optimized impactor mitigator implementations mitigated. The terminal device interaction events can also adjust the presented magnitude of mitigation the impactor mitigator can provide for any one single impactor. The terminal device interaction events can also adjust the magnitude of mitigation the impactor mitigator can provide prior to depletion. The terminal device interaction events can still further adjust the threshold below which the impactor mitigator will be ineffective.

Step 1205 can store these manipulations. In one or more embodiments, step 1205 comprises extracting desired impactor mitigator information from the manipulations detected at step 1204. For example, if the optimized impactor mitigator implementations are insurance policies, in one or more embodiments step 1205 can comprise determining a desired insurance policy or policies, desired deductibles for each policy, desired limits for each policy, and so forth.

In one or more embodiments, step 1206 then takes these extracted values from step 1205 and generates an output object. In one or more embodiments, the output object is a contract by which a person can buy insurance defined by the desired insurance policy or policies, desired deductibles for each policy, desired limits for each policy, and so forth, as identified in step 1205. In one or more embodiments, all the person needs to do is apply one or more signatures and/or initials to the output object to bind the various insurance policies identified in step 1205. Other examples of output objects will be obvious to those of ordinary skill in the art having the benefit of this disclosure.

Figure 30:
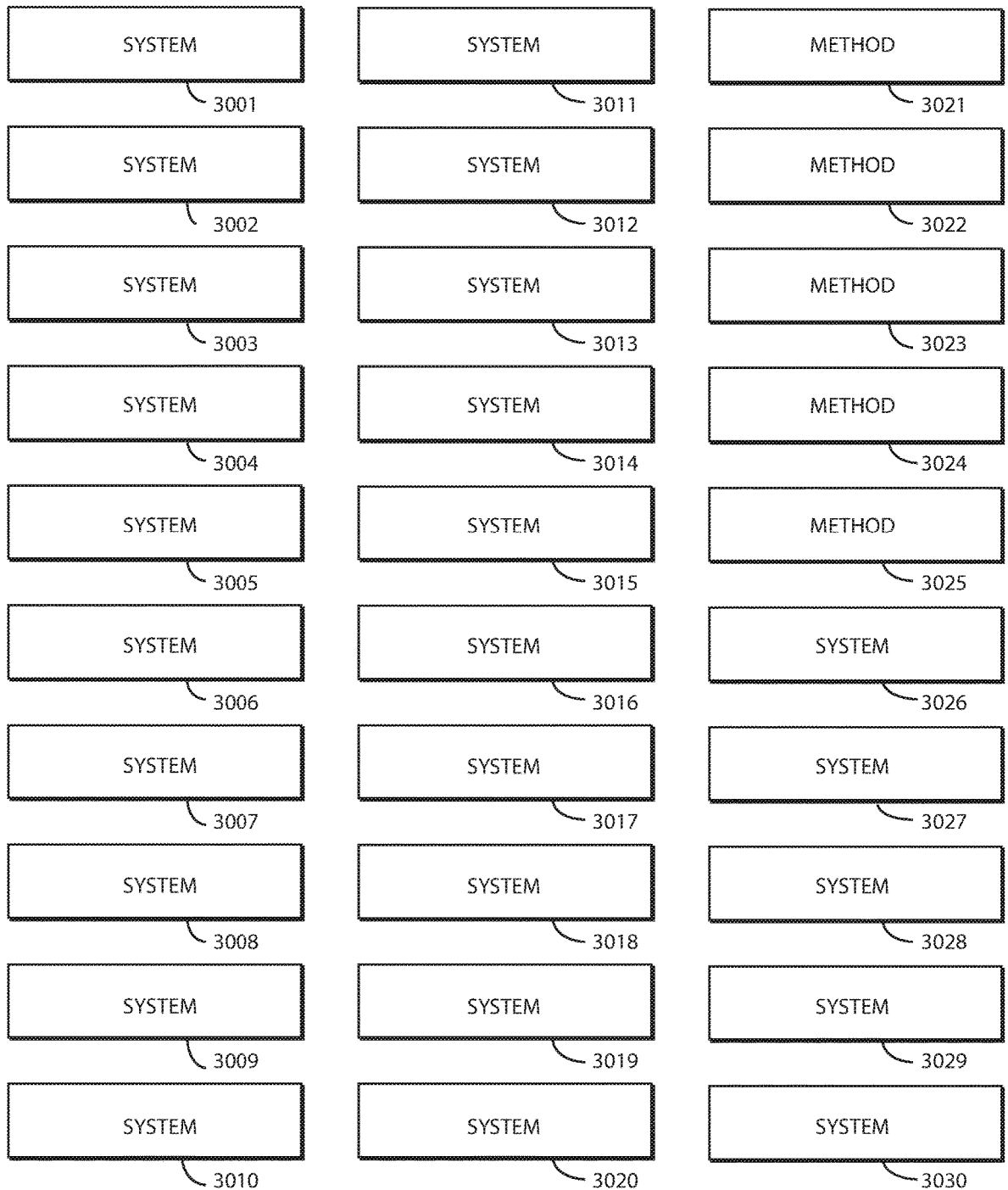
FIG. 30 illustrates various embodiments of the disclosure.

Turning now to FIG. 30, illustrated therein are various embodiments of the disclosure. Elements presented and described above with reference to other figures are not reproduced in FIG. 30 for efficiency due to the fact that they have previously been described and illustrated.

At 3001, a visualization system comprises one or more processors defining one or more process engines of the visualization system. At 3001, the visualization system comprises a communication device. At 3001, the communication device is operable with the one or more processors and in communication with one or more terminal devices.

At 3001, the visualization system comprises one or more memory devices operable with the one or more processors. At 3001, the one or more memory devices comprise an indexed entity data structure. At 3001, the one or more memory devices store computer-executable instructions that, when executed by the one or more processors, cause the one or more processors to perform operations.

At 3001, the operations comprise causing presentation of an entity type graphical object on a user interface of at least one terminal device of the one or more terminal devices. At 3001, the operations comprise causing presentation of one or more impactor graphical objects on the user interface of the at least one terminal device, with each impactor graphical object having an impactor magnitude associated therewith. At 3001, the operations comprise causing presentation of one or more impactor mitigator graphical objects on the user interface of the at least one terminal device.

At 3001, the operations comprise animating the one or more impactor graphical objects such that the one or more impactor graphical objects interact with one or both of the entity type graphical object or the one or more impactor mitigator graphical objects on the user interface of the at least one terminal device as a function of a confidence level. At 3001, the confidence level defines a probabilistic threshold that the impactor magnitude of all subsequent impactor graphical objects interacting with the one or both of the entity type graphical object or the one or more impactor mitigator graphical objects will be below a predefined impactor magnitude threshold.

At 3002, the one or more processors of 3001 further cause presentation of confidence level meter on the user interface. At 3002, the confidence level meter illustrates the confidence level increasing as animation of the one or more impactor graphical objects progresses.

At 3003, the one or more process engines of 3002 comprise a sample selection engine selecting a sample set of impactor data from the indexed entity data structure. At 3004, the one or more process engines of 3003 a sample rule set application engine applying one or more rules to the sample selection engine when selecting the sample set of impactor data to ensure that the sample set of impactor data is distributed with a randomness defined by the one or more rules.

At 3005, the one or more process engines of 3004 comprise a sample iteration generation engine causing the sample selection engine repeat selecting the sample set of impactor data for a predefined number of iterations. At 3006, the one or more process engines of 3003 comprise a sample presentation visualization data generation engine applying one or more modeling rules to the sample set of impactor data to generate the one or more impactor graphical objects.

At 3007, the sample presentation visualization data generation engine of 3006 applies a modeling rule causing the presentation of each impactor graphical object of the one or more impactor graphical objects on the user interface of the at least one terminal device to occur with a predefined color. At 3007, the predefined color indicates an impactor type of the one or more impactor graphical objects.

At 3008, the sample presentation visualization data generation engine of 3006 applies a modeling rule causing the presentation of each impactor graphical object of the one or more impactor graphical objects on the user interface of the at least one terminal device to occur with a predefined size. At 3008 the predefined size indicates the impactor magnitude associated with each impactor graphical object.

At 3009, the sample presentation visualization data generation engine of 3006 applies a modeling rule causing the presentation of each impactor graphical object of the one or more impactor graphical objects on the user interface of the at least one terminal device to occur with a predefined opacity. At 3009, the predefined opacity indicates a probability that the each impactor graphical object will interact with the one or both of the entity type graphical object or the one or more impactor mitigator graphical objects.

At 3010, the one or more process engines of 3003 comprise an entity visualization renderer applying one or more modeling rules to entity-identifying data to generate the entity type graphical object. At 3011, the entity type graphical object comprises a multi-dimensional cylindrical object presentation on the user interface of the at least one terminal device.

At 3012, the one or more process engines of 3003 comprise an entity visualization renderer applying one or more modeling rules to impactor mitigator data to generate the impactor mitigator graphical objects. At 3013, the entity visualization renderer of 3012 applies a modeling rule causing the presentation of each impactor mitigator graphical object of the one or more impactor mitigator graphical objects on the user interface of the at least one terminal device to occur with a predefined color. At 3013, the predefined color indicates an impactor type of the one or more impactor graphical objects that the each impactor mitigator graphical object mitigates.

At 3014, the entity visualization renderer of 3012 applies a modeling rule causing the presentation of each impactor mitigator graphical object of the one or more impactor mitigator graphical objects on the user interface of the at least one terminal device to occur with a predefined depth. At 3014, the predefined depth identifies a magnitude of mitigation the each impactor mitigator graphical object can provide prior to depletion.

At 3015, the entity visualization renderer of 3012 applies a modeling rule causing the presentation of each impactor mitigator graphical object of the one or more impactor mitigator graphical objects on the user interface of the at least one terminal device to occur with a predefined height. At 3015, the predefined height identifies a magnitude of mitigation the each impactor mitigator graphical object can provide for any one single impactor graphical object.

At 3016, the entity visualization renderer of 3012 applies a modeling rule causing the presentation of each impactor mitigator graphical object of the one or more impactor mitigator graphical objects on the user interface of the at least one terminal device to occur with a predefined gap. At 3016, the predefined gap identifies a threshold below which the each impactor mitigator will be ineffective.

At 3017, the one or more process engines of 3003 comprise an animation rule application engine applying one or more animation rules to create an animated visualization comprising the one or more impactor graphical objects interacting with the one or both of the entity type graphical object and/or the one or more impactor mitigator graphical objects on the user interface of the at least one terminal device as the function of the confidence level. At 3018, the animation rule application engine of 3017 causes the animated visualization to cease when the confidence level is 99.9 percent.

At 3019, the visualization system of 3018 further comprises a terminal device event detector receiving terminal device interaction events configured as computer-readable signal media transmitted from the at least one terminal device. At 3019, the terminal device interaction events comprise requests for changes to the one or more impactor mitigator graphical objects. At 3019, the one or more processors, in response to the terminal device event detector receiving the terminal device interaction events, perform additional operations.

At 3019, these additional operations comprise repeating the causing the presentation of the entity type graphical object on the user interface of the at least one terminal device. At 3019, these additional operations comprise repeating the causing the presentation of the one or more impactor graphical objects on the user interface of the at least one terminal device. At 3019, these additional operations comprise causing presentation of one or more alternate impactor mitigator graphical objects on the user interface of the at least one terminal device.

At 3019, these additional operations comprise animating the one or more impactor graphical objects such that the one or more impactor graphical objects interact with one or both of the entity type graphical object or the one or more alternate impactor mitigator graphical objects on the user interface of the at least one terminal device as the function of the confidence level. At 3020, the additional operations of 3019 further comprise causing simultaneous presentation of both the one or more impactor mitigator graphical objects and the one or more alternate impactor mitigator graphical objects on the user interface of the at least one terminal device.

At 3021, a method in an electronic device comprises retrieving, with one or more processors defining one or more process engines, a sample set of impactor data from an indexed entity data structure. At 3021, the method comprises applying, with sample rule set application engine, one or more rules to the sample set of impactor data to transform the sample set of impactor data to randomized impactor data. At 3021, the method comprises applying, with a sample presentation visualization data generation engine, one or more modeling rules to the randomized impactor data to generate one or more impactor graphical objects.

At 3021, the method comprises causing, by the one or more processors, presentation of the one or more impactor graphical objects with an entity type graphical object and one or more impactor mitigator graphical objects on a user interface of at least one terminal device in communication with the one or more processors. At 3021, the method comprises animating the one or more impactor graphical objects to create a first visualization, thereby causing each impactor graphical object to interact with one or both of the entity type graphical object or the one or more impactor mitigator graphical objects as a function of a confidence level defining a probabilistic threshold that only impactor graphical objects having an impactor magnitude below a predefined magnitude threshold will interact with the one or both of the entity type graphical object or the one or more impactor mitigator graphical objects.

At 3022, the method of 3021 further comprises receiving, with a terminal device event detector, terminal device interaction events configured as computer-readable signal media transmitted from the at least one terminal device requesting changes to the one or more impactor mitigator graphical objects. At 3022, the method of 3021 further comprises generating, with an entity visualization renderer applying one or more modeling rules to impactor mitigator data, one or more alternate impactor mitigator graphical objects.

At 3023, the method of 3022 further comprises causing, by the one or more processors, presentation of the one or more impactor graphical objects with the entity type graphical object and the one or more alternate impactor mitigator graphical objects on the user interface of at least one terminal device. At 3023, the method of 3022 further comprises animating the one or more impactor graphical objects to create a second visualization, thereby causing each impactor graphical object to interact with one or both of the entity type graphical object or the one or more alternate impactor mitigator graphical objects as a function of the confidence level.

At 3024, the one or more impactor mitigator graphical objects of 3022 are fewer in number than the one or more alternate impactor mitigator graphical objects. At 3025, the method of 3023 further comprises presenting, with the one or more processors, a comparison of a first result of the first visualization and a second result of the second visualization in a single graphical object at the user interface of the at least one terminal device.

At 3026, a visualization system comprises one or more processors defining one or more process engines of the visualization system. At 3026, the visualization system comprises a communication device that is operable with the one or more processors and in communication with at least one terminal device. At 3026, the visualization system comprises one or more memory devices operable with the one or more processors, and comprising an indexed entity data structure, the one or more memory devices storing computer-executable instructions that, when executed by the one or more processors, cause the one or more processors to perform operations.

At 3026, the operations comprise presenting, at the at least one terminal device, a first visualization comprising one or more animated impactor graphical objects interacting with one or both of an entity type graphical object or one or more impactor mitigator graphical objects as a function of a confidence level index for animation of the animated impactor graphical objects. At 3026, the operations comprise receiving, from a terminal device event detector receiving terminal device interaction events configured as computer-readable signal media transmitted from the at least one terminal device, requested changes to the one or more impactor mitigator graphical objects.

At 3026, the operations comprise generating, with an entity visualization renderer in response to the requested changes to the one or more impactor mitigator graphical objects, one or more alternate impactor mitigator graphical objects. At 3026, the operations comprise presenting, at the at least one terminal device, a second visualization comprising the one or more animated impactor graphical objects interacting with one or both of the entity type graphical object or the one or more alternate impactor mitigator graphical objects as a function of the confidence level index.

At 3027, the operations of 3026 comprise presenting, at the at least one terminal device, a comparison of a first result of the first visualization and a second result of the second visualization. At 3028, the confidence level index of 3027 defines a probabilistic threshold limiting an impactor magnitude of each impactor mitigator graphical object interacting with the entity type graphical object.

At 3029, the operations of 3026 comprise causing the entity type graphical object to transition from a side elevation view to a perspective view in response to other terminal device interaction events received by the terminal device event detector. At 3030, the operations of 3026 comprise presenting, prior to presenting the first visualization, only the impactor graphical objects while omitting presentation of either the entity type graphical object or the one or more impactor mitigator graphical objects.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

For example, the visualization system and corresponding methods described above may be embodied as a computer method, computer system, or computer program product. In one or more embodiments, such visualization systems and methods can be configured entirely in a hardware implementation. Alternatively, in other embodiments may be configured entirely in software implementations. Still other embodiments can be configured in a combination of hardware implementations and software implementations, all of which may generally be referred to herein as a "module" or "system." In still other embodiments, the visualization system and corresponding methods may be configured as a computer program product embodied in a non-transitory computer-readable medium (or media) having computer-readable program code/instructions embodied thereon.

Moreover, any combination of computer-readable media may be utilized, including but not limited to, a computer-readable signal medium and/or a computer-readable storage medium. In the context of this disclosure, a computer-readable storage medium may include any suitable tangible medium that can contain or store a program for use by or in connection with an instruction execution system, apparatus, or device.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. A visualization system, comprising:
one or more processors defining one or more process engines of the visualization system;
a communication device, operable with the one or more processors and in communication with one or more terminal devices; and
one or more memory devices operable with the one or more processors, and comprising an indexed entity data structure, the one or more memory devices storing computer-executable instructions that, when executed by the one or more processors, cause the one or more processors to perform operations comprising:
causing presentation of an entity type graphical object on a user interface of at least one terminal device of the one or more terminal devices;

causing presentation of one or more impactor graphical objects in a radial pattern with the one or more impactor graphical objects becoming denser toward a center of the radial pattern on the user interface of the at least one terminal device, with each impactor graphical object having an impactor magnitude identified by a size of each impactor graphical object;

causing presentation of one or more impactor mitigator graphical objects on the user interface of the at least one terminal device; and animating the one or more impactor graphical objects such that the one or more impactor graphical objects interact with one or both of the entity type graphical object or the one or more impactor mitigator graphical objects on the user interface of the at least one terminal device as a function of a confidence level defining a probabilistic threshold that the impactor magnitude of all subsequent impactor graphical objects interacting with the one or both of the entity type graphical object or the one or more impactor mitigator graphical objects will be below a predefined impactor magnitude threshold.

2. The visualization system of claim 1, the one or more processors further causing presentation of confidence level meter on the user interface, the confidence level meter illustrating the confidence level increasing as animation of the one or more impactor graphical objects progresses.

3. The visualization system of claim 2, the one or more process engines of the visualization system comprising a sample selection engine selecting a sample set of impactor data from the indexed entity data structure.

4. The visualization system of claim 3, the one or more process engines of the visualization system further comprising a sample rule set application engine applying one or more rules to the sample selection engine when selecting the sample set of impactor data to ensure that the sample set of impactor data is distributed with a randomness defined by the one or more rules.

5. The visualization system of claim 4, the one or more process engines of the visualization system further comprising a sample iteration generation engine causing the sample selection engine repeat selecting the sample set of impactor data for a predefined number of iterations.

6. The visualization system of claim 3, the one or more process engines of the visualization system comprising a sample presentation visualization data generation engine applying one or more modeling rules to the sample set of impactor data to generate the one or more impactor graphical objects.

7. The visualization system of claim 6, the sample presentation visualization data generation engine applying a modeling rule causing the presentation of the each impactor graphical object of the one or more impactor graphical objects on the user interface of the at least one terminal device to occur with a predefined color indicating an impactor type of the one or more impactor graphical objects.

8. The visualization system of claim 6, the sample presentation visualization data generation engine applying a modeling rule causing the presentation of the each impactor graphical object of the one or more impactor graphical objects on the user interface of the at least one terminal device to occur with a predefined size indicating the impactor magnitude associated with the each impactor graphical object.

9. The visualization system of claim 6, the sample presentation visualization data generation engine applying a modeling rule causing the presentation of the each impactor graphical object of the one or more impactor graphical objects on the user interface of the at least one terminal device to occur with a predefined opacity indicating a probability that the each impactor graphical object will interact with the one or both of the entity type graphical object or the one or more impactor mitigator graphical objects.

10. The visualization system of claim 3, the one or more process engines of the visualization system comprising an entity visualization renderer applying one or more modeling rules to entity-identifying data to generate the entity type graphical object.

11. The visualization system of claim 10, the entity type graphical object comprising a multi-dimensional cylindrical object presentation on the user interface of the at least one terminal device.

12. The visualization system of claim 3, the one or more process engines of the visualization system comprising an entity visualization renderer applying one or more modeling rules to impactor mitigator data to generate the impactor mitigator graphical objects.

13. The visualization system of claim 12, the entity visualization renderer applying a modeling rule causing the presentation of each impactor mitigator graphical object of the one or more impactor mitigator graphical objects on the user interface of the at least one terminal device to occur with a predefined color indicating an impactor type of the one or more impactor graphical objects that the each impactor mitigator graphical object mitigates.

14. The visualization system of claim 12, the entity visualization renderer applying a modeling rule causing the presentation of each impactor mitigator graphical object of the one or more impactor mitigator graphical objects on the user interface of the at least one terminal device to occur with a predefined depth identifying a magnitude of mitigation the each impactor mitigator graphical object can provide prior to depletion.

15. The visualization system of claim 12, the entity visualization renderer applying a modeling rule causing the presentation of each impactor mitigator graphical object of the one or more impactor mitigator graphical objects on the user interface of the at least one terminal device to occur with a predefined height identifying a magnitude of mitigation the each impactor mitigator graphical object can provide for any one single impactor graphical object.

16. The visualization system of claim 12, the entity visualization renderer applying a modeling rule causing the presentation of each impactor mitigator graphical object of the one or more impactor mitigator graphical objects on the user interface of the at least one terminal device to occur with a predefined gap identifying a threshold below which the each impactor mitigator will be ineffective.

17. The visualization system of claim 3, the one or more process engines of the visualization system comprising an animation rule application engine applying one or more animation rules to create an animated visualization comprising the one or more impactor graphical objects interacting with the one or both of the entity type graphical object and/or the one or more impactor mitigator graphical objects on the user interface of the at least one terminal device as the function of the confidence level.

18. The visualization system of claim 17, the animation rule application engine applying an animation rule causing the animated visualization to cease when the confidence level is 99.9 percent.

19. The visualization system of claim 18, further comprising a terminal device event detector receiving terminal device interaction events configured as computer-readable signal media transmitted from the at least one terminal device, the terminal device interaction events comprising requests for changes to the one or more impactor mitigator graphical objects, the one or more processors, in response to the terminal device event detector receiving the terminal device interaction events, performing additional operations comprising:
   repeating the causing the presentation of the entity type graphical object on the user interface of the at least one terminal device;
   repeating the causing the presentation of the one or more impactor graphical objects on the user interface of the at least one terminal device;
   causing presentation of one or more alternate impactor mitigator graphical objects on the user interface of the at least one terminal device; and
   animating the one or more impactor graphical objects such that the one or more impactor graphical objects interact with one or both of the entity type graphical object or the one or more alternate impactor mitigator graphical objects on the user interface of the at least one terminal device as the function of the confidence level.

20. The visualization system of claim 19, the additional operations further comprising causing simultaneous presentation of both the one or more impactor mitigator graphical objects and the one or more alternate impactor mitigator graphical objects on the user interface of the at least one terminal device.

21. A method in an electronic device, the method comprising:
   retrieving, with one or more processors defining one or more process engines, a sample set of impactor data from an indexed entity data structure;
   applying, with sample rule set application engine, one or more rules to the sample set of impactor data to transform the sample set of impactor data to randomized impactor data;
   applying, with a sample presentation visualization data generation engine, one or more modeling rules to the randomized impactor data to generate one or more impactor graphical objects;
   causing, by the one or more processors, presentation of the one or more impactor graphical objects with an entity type graphical object and one or more impactor mitigator graphical objects on a user interface of at least one terminal device in communication with the one or more processors, with each impactor mitigator graphical object having a depth identifying a magnitude of mitigation the each impactor mitigator graphical object can provide prior to depletion; and
   animating the one or more impactor graphical objects to create a first visualization, thereby causing each impactor graphical object to interact with one or both of the entity type graphical object or the one or more impactor mitigator graphical objects as a function of a confidence level defining a probabilistic threshold that only impactor graphical objects having an impactor magnitude below a predefined magnitude threshold will interact with the one or both of the entity type graphical object or the one or more impactor mitigator graphical objects.

22. The method of claim 21, further comprising:
   receiving, with a terminal device event detector, terminal device interaction events configured as computer-readable signal media transmitted from the at least one terminal device requesting changes to the one or more impactor mitigator graphical objects; and
   generating, with an entity visualization renderer applying one or more other modeling rules to impactor mitigator data, one or more alternate impactor mitigator graphical objects.

23. The method of claim 22, further comprising:
   causing, by the one or more processors, presentation of the one or more impactor graphical objects with the entity type graphical object and the one or more alternate impactor mitigator graphical objects on the user interface of at least one terminal device, with the each impactor mitigator graphical object having a height identifying a magnitude of mitigation the each impactor mitigator graphical object can provide for any one impactor graphical object interaction; and
   animating the one or more impactor graphical objects to create a second visualization, thereby causing each impactor graphical object to interact with one or both of the entity type graphical object or the one or more alternate impactor mitigator graphical objects as a function of the confidence level.

24. The method of claim 23, wherein the one or more impactor mitigator graphical objects are fewer in number than the one or more alternate impactor mitigator graphical objects and the one or more impactor mitigator graphical objects are depicted wedges attached to a major face of the entity type graphical object.

25. The method of claim 23, further comprising presenting, with the one or more processors, a comparison of a first result of the first visualization and a second result of the second visualization in a single graphical object at the user interface of the at least one terminal device.

26. A visualization system, comprising:
   one or more processors defining one or more process engines of the visualization system;
   a communication device, operable with the one or more processors and in communication with at least one terminal device; and
   one or more memory devices operable with the one or more processors, and comprising an indexed entity data structure, the one or more memory devices storing computer-executable instructions that, when executed by the one or more processors, cause the one or more processors to perform operations comprising:
     presenting, at the at least one terminal device, a first visualization comprising one or more animated impactor graphical objects interacting with one or both of an entity type graphical object or one or more impactor mitigator graphical objects as a function of a confidence level index for animation of the animated impactor graphical objects, thereby reducing a height of each impactor mitigator graphical object, width of the each impactor mitigator graphical object, or combinations thereof with each interaction between an animated impactor graphical object and the each impactor mitigator graphical object;
     receiving, from a terminal device event detector receiving terminal device interaction events configured as computer-readable signal media transmitted from the at least one terminal device, requested changes to the one or more impactor mitigator graphical objects;
     generating, with an entity visualization renderer in response to the requested changes to the one or more impactor mitigator graphical objects, one or more alternate impactor mitigator graphical objects; and presenting, at the at least one terminal device, a second visualization comprising the one or more animated impactor graphical objects interacting with one or both of the entity type graphical object or the one or more alternate impactor mitigator graphical objects as a function of the confidence level index.

27. The visualization system of claim 26, the operations further comprising presenting, at the at least one terminal device, a comparison of a first result of the first visualization and a second result of the second visualization.

28. The visualization system of claim 27, the confidence level index defining a probabilistic threshold limiting an impactor magnitude of each impactor mitigator graphical object interacting with the entity type graphical object.

29. The visualization system of claim 26, the operations further comprising causing the entity type graphical object to transition from a side elevation view to a perspective view in response to other terminal device interaction events received by the terminal device event detector.

30. The visualization system of claim 26, the operations further comprising presenting, prior to presenting the first visualization, only the one or more animated impactor graphical objects while omitting presentation of either the entity type graphical object or the one or more impactor mitigator graphical objects.

* * * * *